US012755407B2

(12) United States Patent
Fan

(10) Patent No.: US 12,755,407 B2
(45) Date of Patent: Oct. 6, 2026

(54) METHOD, DEVICE, AND COMPUTER PROGRAM PRODUCT FOR ROOM LAYOUT

(71) Applicant: Beijing Zitiao Network Technology Co., Ltd., Beijing (CN)

(72) Inventor: Dikai Fan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 282 days.

(21) Appl. No.: 18/509,101

(22) Filed: Nov. 14, 2023

(65) Prior Publication Data

US 2024/0169568 A1 May 23, 2024

(30) Foreign Application Priority Data

Nov. 14, 2022 (CN) ........................ 202211427357.9
Nov. 29, 2022 (CN) ........................ 202211514772.8
(Continued)

(51) Int. Cl.
*G06K 9/00* (2022.01)
*G02B 27/01* (2006.01)
(Continued)

(52) U.S. Cl.
CPC ................ *G06T 7/50* (2017.01); *G02B 27/01* (2013.01); *G07F 7/122* (2013.01); *G06T 2207/10028* (2013.01)

(58) Field of Classification Search
CPC ........................ G06T 7/50; G06T 2207/10028
See application file for complete search history.

(56) References Cited

U.S. PATENT DOCUMENTS 11,657,531 B1 * 5/2023 Ebrahimi Afrouzi .. G06V 10/44 382/284
12,033,355 B2 * 7/2024 Gunkel .................. G06F 3/012
(Continued)

FOREIGN PATENT DOCUMENTS

CN 102540464 A * 7/2012 .......... G02B 27/017
CN 108335332 A 7/2018
(Continued)

OTHER PUBLICATIONS

Visual Map Construction Using RGB-D Sensors for Image-Based Localization in Indoor Environments, Guanyuan Feng et al., Hindawi, 2012, pp. 1-18 (Year: 2012).*
(Continued)

*Primary Examiner* — Jayesh A Patel
(74) *Attorney, Agent, or Firm* — Alleman Hall LLP

(57) ABSTRACT

The embodiments of the present disclosure relates to a method of room layout, an electronic device and a computer readable storage medium. The method includes: collecting a current frame RGB image, and acquiring a depth map corresponding to the current frame RGB image and pose information of a head mounted device; detecting and determining at least one object in the collected current frame RGB image; and associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image.

17 Claims, 16 Drawing Sheets

(30) Foreign Application Priority Data

| | | | |
|---|---|---|---|
| Dec. 20, 2022 | (CN) | .......................... | 202211644436.5 |
| Jan. 29, 2023 | (CN) | .......................... | 202310102336.8 |

(51) Int. Cl.

| | |
|---|---|
| ***G06T 7/50*** | (2017.01) |
| ***G07F 7/12*** | (2006.01) |

(56) References Cited

U.S. PATENT DOCUMENTS

| | | | | |
|---|---|---|---|---|
| 12,361,677 | B2 * | 7/2025 | Keefe | G06V 10/25 |
| 2007/0273610 | A1 * | 11/2007 | Baillot | G06F 3/0325 345/8 |
| 2018/0181593 | A1 * | 6/2018 | Ranzinger | G06F 16/538 |
| 2020/0409161 | A1 | 12/2020 | Cui et al. | |
| 2021/0279950 | A1 * | 9/2021 | Phalak | G06F 18/231 |
| 2022/0206291 | A1 | 6/2022 | Liao et al. | |
| 2022/0414973 | A1 * | 12/2022 | Daly | G06F 3/016 |
| 2023/0042968 | A1 * | 2/2023 | Ding | G06T 7/70 |
| 2023/0106339 | A1 * | 4/2023 | Goyal | G06T 7/13 345/634 |
| 2024/0062387 | A1 * | 2/2024 | Frantz | G02B 27/0172 |
| 2024/0161418 | A1 * | 5/2024 | Durnil | G06T 19/006 |

FOREIGN PATENT DOCUMENTS

| | | | | | |
|---|---|---|---|---|---|
| CN | 108986223 | A | * | 12/2018 | G06T 17/00 |
| CN | 109115173 | A | | 1/2019 | |
| CN | 109341718 | A | | 2/2019 | |
| WO | WO-2004113991 | A2 | * | 12/2004 | G06F 3/012 |

OTHER PUBLICATIONS

Expandable Yolo: 3D Object Detection from RGB-D Images, Masahiro Takahashi et al., ResearchGate, Oct. 2020, pp. 1-6 (Year: 2020).*

Manhattan Room Layout Reconstruction from a Single 360 ○ image: A Comparative Study of State-of-the-art Methods, Chuhang Zou et al., arXiv, Dec. 2020, pp. 1-20 (Year: 2020).*

Chen, X. et al., “Research and Application of Parallel Binocular Vision Algorithm,” Suzhou Bozhong Precision Industry Co., Ltd., Nov. 25, 2016, 5 pages.

* cited by examiner

METHOD, DEVICE, AND COMPUTER PROGRAM PRODUCT FOR ROOM LAYOUT

CROSS-REFERENCE OF RELATED APPLICATIONS

The present application claims priority to Chinese patent application No. 202211644436.5, filed on Dec. 20, 2022, entitled as "METHOD, DEVICE, AND COMPUTER PROGRAM PRODUCT FOR ROOM LAYOUT", Chinese patent application No. 202211514772.8, filed on Nov. 29, 2022, entitled as "THREE-DIMENSIONAL SCENE RECONSTRUCTION METHOD, APPARATUS, DEVICE AND MEDIUM", Chinese patent application No. 202211427357.9, filed on Nov. 14, 2022, entitled as "METHOD AND DEVICE FOR CALIBRATION IN MIXED REALITY SPACE, ELECTRONIC DEVICE, MEDIUM, AND PRODUCT", and Chinese patent application No. 202310102336.8, filed on Jan. 29, 2023, entitled as "METHOD AND APPARATUS FOR GENERATING SPATIAL LAYOUT, DEVICE, MEDIUM, AND PROGRAM PRODUCT", which are incorporated herein by reference as if reproduced in their entirety.

FIELD

The present disclosure generally relates to the technical field of room layout, in particular a room layout method and apparatus, a device, a storage medium and a computer program product.

BACKGROUND

With the development of Virtual Reality (VR) technology, VR head mount-based Mediated Reality (MR) applications attract more and more attention. In order to implement the MR function, it is required to first implement the modeling function for an environment. Since mobile devices, such as MR head mounts and the like, have limited computing power, it is difficult to implement the three-dimensional reconstruction function on a head mounted sensor (even though such function can be implemented, a large amount of resources will be occupied, due to the restrictions in power consumption and computing resource). Therefore, the room plan-based technology is of critical importance in the MR technology.

Nowadays, the room plan solution is mainly for real-time reconstruction, which relies on a heavyweight (a great number of network layers, and a large-scale model) deep learning network. Such method causes great power consumption.

Therefore, the existing room layout method incurs high overheads in terms of computing power and power consumption.

SUMMARY

The present disclosure provides a room layout method and apparatus, a device, a storage medium and a computer program product, to implement room layout construction using relatively low computing power and reduced power consumption, and thus achieve a better interaction between a user and a head mounted device.

In a first aspect, the embodiments of the present disclosure provide a method for room layout, comprising: collecting a current frame RGB image, and acquiring a depth map corresponding to the current frame RGB image and pose information of a head mounted device; detecting and determining at least one object in the collected current frame RGB image; and associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image.

In a second aspect, embodiments of the present disclosure provide a room layout apparatus, comprising: an acquisition module for collecting a current frame RGB image, and acquiring a depth map corresponding to the current frame RGB image and pose information of a head mounted device; a detection module for detecting the collected current frame RGB image and determining at least one object; and a room layout constructing module for associating the at least one object in the current frame RGB image, the depth image and the pose information with a room layout map corresponding to a previous frame RGB image, and generating a room layout map corresponding to the current frame RGB image, for enabling a user to calibrate and create a rendering based on the room layout map corresponding to the current frame RGB image.

In a third aspect, embodiments of the present disclosure provide a head mounted device for implementing the method for room layout of any one of items of the first aspect.

In a fourth aspect, embodiments of the present disclosure provide an electronic device comprising: a processor and a memory; the memory for storing computer execution instructions; the processor executing the computer execution instructions stored in the memory to cause the processor to implement the method for room layout of any one of items of the first aspect.

In a fifth aspect, embodiments of the present disclosure provide a computer readable storage medium, wherein the computer readable storage medium has computer execution instructions stored therein, and a processor, when executing the computer execution instructions, implements the method for room layout of any one of items of the first aspect.

In a sixth aspect, embodiments of the present disclosure provide a computer program product comprising a computer program, wherein the computer program, when executed by a processor, implements the method for room layout of any one of items of the first aspect.

The embodiments of the present disclosure provide a room layout method and apparatus, a device, a storage medium and a computer program product. The method includes: collecting a current frame RGB image, and acquiring a depth map corresponding to the current frame RGB image and pose information of a head mounted device; detecting and determining at least one object in the collected current frame RGB image; and associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image. Hence, it can reduce the computing force and lower the expenses in power consumption while ensuring a better rendering, by: detecting the collected current frame RGB image and obtaining a bounding box of at least one object; then associating the room layout map obtained by updating the previous RGB image based on each object in conjunction with a depth value of a corresponding position in the depth map and the pose of the camera; and updating the room layout map for the current frame RGB image by performing fusion, without real-time reconstruction.

BRIEF DESCRIPTION OF THE DRAWINGS

In order to make the technical solution according to embodiments of the present disclosure or the prior technologies more apparent, brief introduction will be provided on the drawings necessary for the embodiments or the prior technologies. Obviously, the drawings described below only illustrate some embodiments of the present disclosure, based on which the ordinary skilled in the art could obtain other drawings, without doing creative work.

DETAILED DESCRIPTION OF EMBODIMENTS

Figure 1:
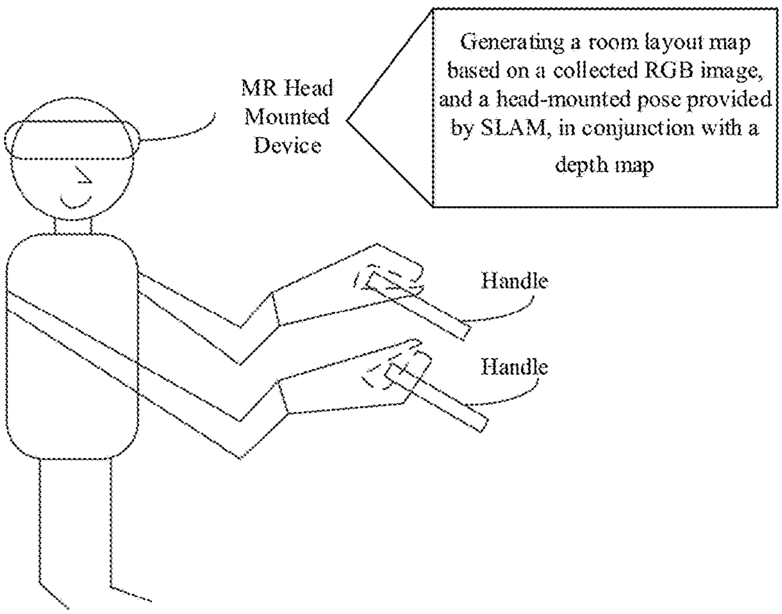
FIG. 1 illustrates a schematic diagram of a scene of a room layout method provided by an embodiment of the present disclosure.

Reference will now be made to the drawings to describe in detail the embodiments of the present disclosure. Although some embodiments of the present disclosure are shown in the drawings, it would be appreciated that the present disclosure could be implemented in various forms, and should not be construed as being limited to the embodiments described here. Rather, those embodiments are provided for understanding the present disclosure thoroughly and completely. It would also be appreciated that the drawings and the embodiments of the present disclosure are provided only as an example, rather than suggesting limitation to the protection scope of the present disclosure.

It would be appreciated that the respective steps included in the method implementation of the present disclosure may be performed in a different order, and/or performed in parallel. In addition, the method implementation may include additional steps and/or omit the shown steps.

The scope of the present disclosure is not limited in the aspect.

As used herein, the term "includes" and its variants are to be read as open terms than mean "includes, but is not limited to." The term "based on" is to be read as "based at least in part on." The term "an embodiment" is to be read as "at least one embodiment;" the term "a further embodiment" is to be read as "at least one further embodiment;" the term "some embodiments" is to be read as "at least some embodiments." Definitions of other terms will be given in the following description.

It is to be noted that the concepts "first," "second," and the like, as mentioned here, are only used to distinguish devices, modules or units, rather than defining the sequence or interdependence of the functions executed by those devices, modules or units.

It is to be further noted that "one" or "a plurality of" as mentioned above is provided for illustration, without limitation, which should be understood by those skilled in the art as "one or more," unless indicated otherwise in the context.

The terms for messages or information exchanged between a plurality of devices or modules in the implementations of the present disclosure are provided only for illustration, without suggesting limitation to the range of those messages or information.

Nowadays, the room plan solution is mainly used for real-time reconstruction, which relies on a heavyweight (a great number of network layers, and a large-scale model) deep learning network. Such method also causes high power consumption. Therefore, the existing room layout method incurs great expenses in terms of computing power and power consumption.

In order to solve the above-mentioned method, the technical idea of the present disclosure includes: detecting the collected current frame RGB image and obtaining a bounding box of at least one object; and then associating the room layout map obtained by updating the previous RGB image based on each object in conjunction with a depth value of a corresponding position in the depth map and the pose of the camera, and updating the room layout map for the current frame RGB image by performing fusion, without real-time reconstruction. In this way, the present disclosure can reduce the computing force and lower the expense in power consumption while ensuring a better rendering.

In practice, the execution body of the embodiments of the present disclosure may be an electronic device. The electronic device used herein may be a head mounted device, for example, an MR head mounted device. The MR head mounted device used herein may include a handle. A user can achieve interaction via the handle of the MR head mounted device, and can create a virtual reality effect on common objects. For example, in order to present a created room layout via the MR head mounted device, the user may perform room layout calibration based on the handle, and then create a rendering (e.g. various occlusion effects) to ultimately present the real scene, thus providing the user with better interaction experience.

By means of example, FIG. 1 illustrates a schematic diagram of a scene of a room layout method provided by an embodiment of the present disclosure. The MR head mounted device may be configured with a simultaneous localization and mapping construction device, i.e., a slam; the RGB image can be collected via the sensor, and a room layout map can be generated based on the collected RGB image and the head mounted pose provided by the slam, in conjunction with the depth map.

Figure 2:
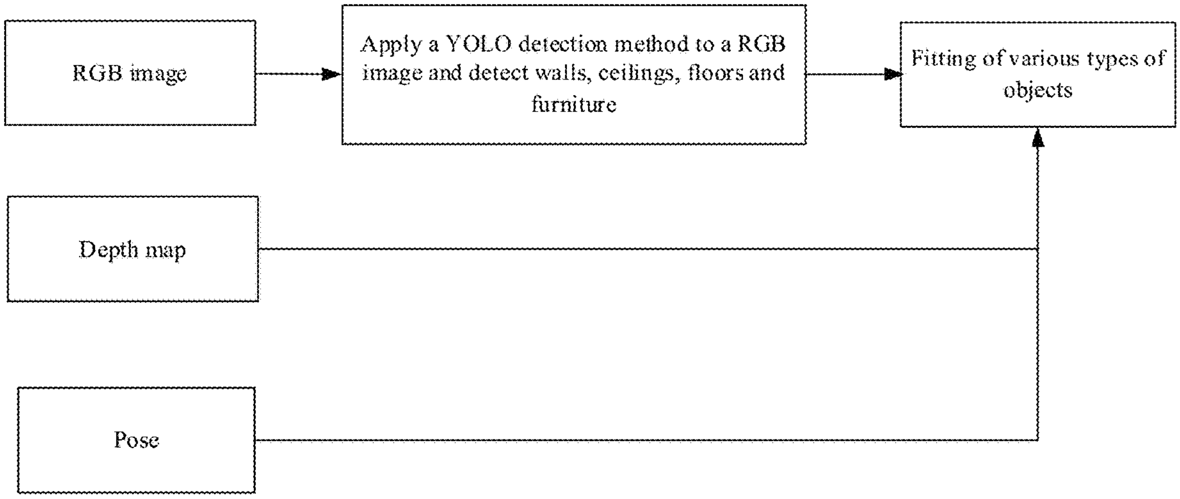
FIG. 2 illustrates a schematic flowchart of a room layout method provided by an embodiment of the present disclosure.

FIG. 2 illustrates a schematic flowchart of a room layout method provided by an embodiment of the present disclosure. First of all, a lightweight yolo (i.e., real-time fast object detection) network is used to detect a RGB image, to obtain bounding boxes of some objects (or articles, such as wall, ceiling, floor, furniture, and the like); and then, the RGB map, the depth map and the pose (or pose information) given by the head mount slam are used as inputs, and a room layout map is generated by fitting various types of objects.

Therefore, the present disclosure can reduce the computing force and lower the expenses in power consumption while ensuring a better rendering, by: detecting the collected current frame RGB image and obtaining a bounding box of at least one object; and then associating the room layout map obtained by updating the previous RGB image based on each object in conjunction with a depth value of a corresponding position in the depth map and the pose of the camera, and updating the room layout map for the current frame RGB image by performing fusion, without real-time reconstruction.

Hereinafter, reference will be made to specific embodiments to describe in detail the technical solution of the present disclosure. The specific embodiments, as will be described later, may be combined with one another, and details on the same or similar concepts or processes may be omitted in some embodiments.

Figure 3:
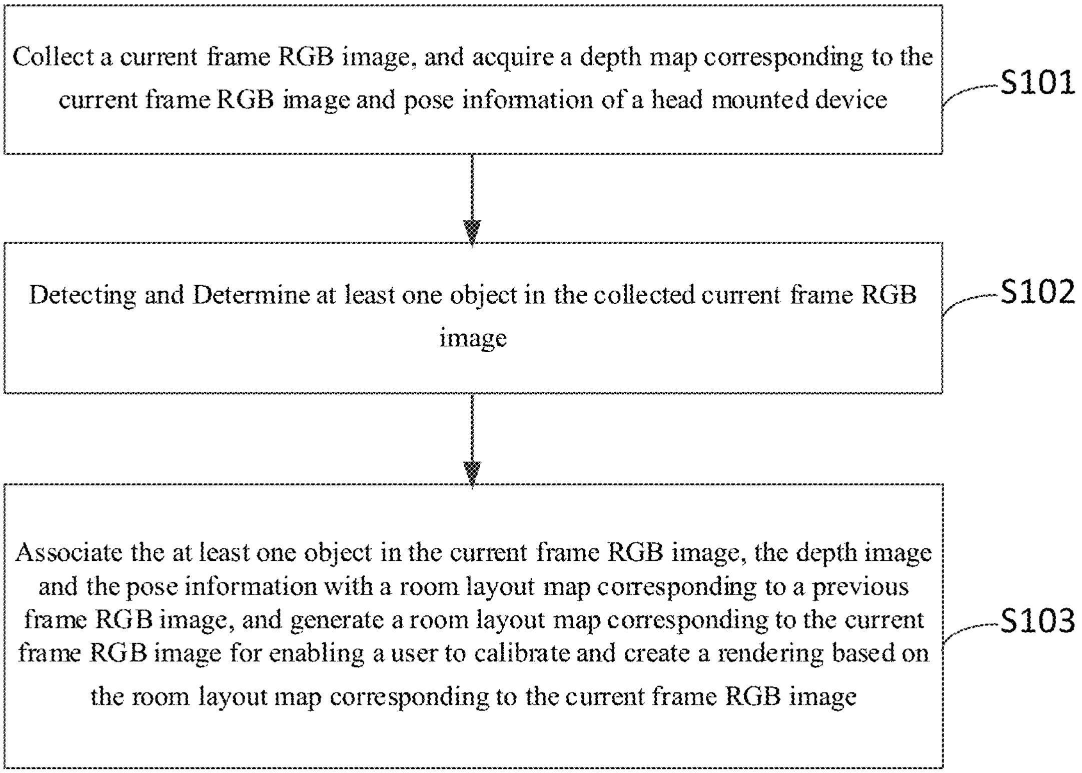
FIG. 3 illustrates a schematic flowchart of a room layout method provided by a further embodiment of the present disclosure.

In an embodiment, the room layout method may be implemented in the follow way:

FIG. 3 illustrates a schematic flowchart of a room layout method provided by a further embodiment of the present disclosure. The room layout method may include:

S101: collecting a current frame RGB image, and acquiring a depth map corresponding to the current frame RGB image and pose information of a head mounted device.

The method according to the embodiment of the present disclosure can be applied to an electronic device. The electronic device as used herein may be a head mounted device, for example, an MR head mounted device. The MR head mounted device can collect images, where the images may be RMB images. Specifically, it can be detected based on the current frame RGB image; then, in conjunction with the detected bounding boxes, the depth map, the pose, and the room layout map corresponding to the previous frame RGB image, a rendering is generated based on the room layout map calibration corresponding to the current frame RGB image.

S102: detecting and determining at least one object in the collected current frame RGB image.

In the embodiment of the present disclosure, objects for room layout calibration in the current frame RGB image are detected, and objects of at least one type are obtained, where one type of objects corresponds to at least one object. There is a scene where no object exists in the RGB image. In the circumstance, a next frame RGB image is directly acquired, without processing the room layout map corresponding to the current frame RGB image and the previous frame RGB image.

In an embodiment of the present disclosure, detecting and determining at least one object in the collected current frame RGB image may be implemented through the following step:

detecting and obtaining a bounding box of at least one object in the current frame RBG image using a real-time fast target detecting method;

wherein the same object corresponds to at least one bounding box, and each of the at least one object is of a plane type or a cuboid type.

Figure 4:
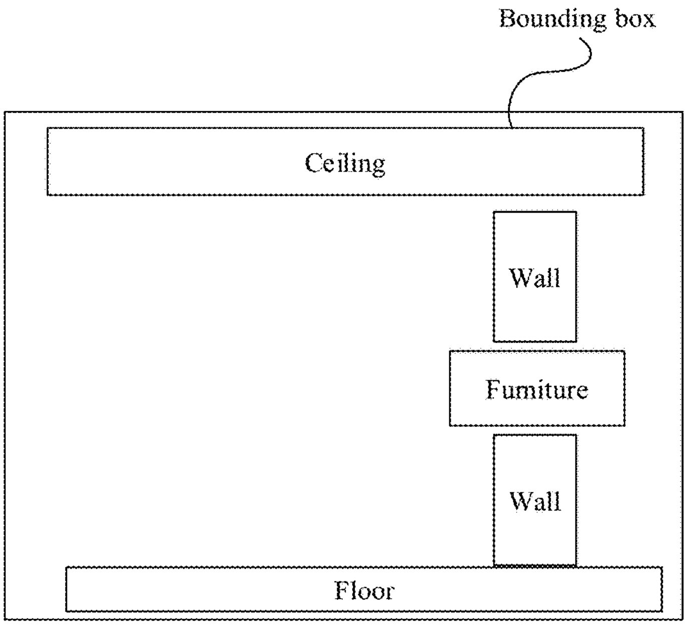
FIG. 4 illustrates a schematic diagram of a scene of a room layout method provided by a still further embodiment of the present disclosure.

In the embodiment of the present disclosure, referring to FIG. 4, a lightweight yolo network is used to detect the RGB image, and bounding boxes of some objects (or articles) are obtained. Those objects may be divided into two types (4 sub-types): 1. plane objects (e.g. walls, the ceiling, and the floor): a plane type; 2. cuboid bounding boxes (e.g. furniture); a cuboid type.

By using a lightweight real-time fast target detection network, the present disclosure can achieve a high accuracy while implementing fast detection, thus making the room layout construction more accurate and attaining a better rendering.

S103: associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image.

In the embodiment of the present disclosure, those detection results, as well as the RGB image, the depth map and the pose given by the head mount slam, are used as inputs for generation of room layout. Specifically, it is required to first obtain whether the detected type and the generated object (the existing type) in the previous map are the same object. If they are the same object, it is required to perform information fusion; if they are not, it is required to newly create an object in the room layout. For the two types of objects, respective processing should be performed, and the user finally creates a rendering based on room layout map calibration. In this way, a better interaction experience can be attained.

The room layout method provided by the embodiment of the present disclosure includes: collecting a current frame RGB image, and acquiring a depth map corresponding to the current frame RGB image and pose information of a head mounted device; detecting and determining at least one object in the collected current frame RGB image; and associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image.

Therefore, it can reduce the computing force and lower the expense in power consumption while ensuring a better rendering, by: detecting the collected current frame RGB image and obtaining a bounding box of at least one object; then associating the room layout map obtained by updating the previous RGB image based on each object in conjunction with a depth value of a corresponding position in the depth map and the pose of the camera; and updating the room layout map for the current frame RGB image by performing fusion, without real-time reconstruction.

In an embodiment of the present disclosure, associating the at least one object in the current frame RGB image, the depth image and the pose information with the room layout map corresponding to the previous frame RGB image, and generating the room layout map corresponding to the current frame RGB image, can be implemented through the following steps: for each of the at least one object, step a1: in case that the object is of a plane type, determining a valid box corresponding to the object, and obtaining, based on the valid box, the depth map and the pose information, an updated first room layout map by associating the object with the room layout map corresponding to the previous frame RGB image;

wherein, in case that the object is of a plane type, determining a valid box corresponding to the object, can be implemented through the following steps:

Step a11: in case that in case that the object is of the plane type, determining a bounding box with the largest area in at least one bounding box corresponding o the detected object; and Step a12: using the bounding box with the largest area as the valid box. In the embodiments, for the plane type, since various types in the room may occlude the room, the same object (wall or floor) may include a plurality of detected boxes (which refer to bounding boxes here). For each type of object of the plane type, the box having the largest area is used as the valid box of the valid box, to reduce computing power while ensuring the accuracy of the subsequent fusion. Then, based on the object in the valid box, in conjunction with the depth map and the pose, the room layout map corresponding to the previous frame RGB image is associated, and association information is fused, to update the room layout map.

Step a2: in case that the object is of a cuboid type, projecting, based on points of respective objects of the cuboid type in a world coordinate system in the room layout map corresponding to the previous frame RGB image, 3D bounding boxes of the respective objects of the cuboid type in the room layout map corresponding to the previous frame RGB image into the detected current frame RGB image, and obtaining, based on the bounding boxes of the respective objects of the cuboid type in the at least one object, the projected 3D bounding boxes and the depth map, an updated second room layout map by associating the object with the room layout map corresponding to the previous frame RGB image;

Step a3: fusing the first room layout map and the second room layout map, to generate the room layout map corresponding to the current frame RGB image.

The embodiment of the present disclosure includes, for the cuboid type: first projecting the 3D bounding boxes of the objects of the cuboid type in the room layout map corresponding to the previous frame RGB image into the detected current frame RGB image; then determining whether any bounding box intersects with the detected bounding box in the current frame RGB image; in case that there is an intersecting box, fusing it with the room layout map corresponding to the previous RGB image, based on the point within the intersecting box, to update the room layout map; subsequently, generating a new room layout map based on the updated room layout maps of different types, as the room layout map corresponding to the current frame RGB image.

Accordingly, by associating different types in different manners, the simultaneous association (i.e., fusing) process has a higher construction speed and incurs low construction overheads as being only related to processing of line and surface data.

In an embodiment of the present disclosure, obtaining, based on the valid box, the depth map and the pose information, the updated first room layout map by associating with the room layout map corresponding to the previous frame RGB image, can be implemented through the following steps:

Step b1: obtaining, based on the depth map, a point of the object in the valid box in a camera coordinate system, converting, through the pose information, the point of the object in the valid box in the camera coordinate system into a point in the world coordinate system, and perform plane-fitting for the point of the object in the valid box in the world coordinate system, to obtain a position of a fitted plane;

Step b2: determining, based on the position of the fitted plane, at least one target plane matching a position of the object from the room plane map corresponding to the previous frame RGB image; and Step b3: for each of the target planes, fusing, based on the position of the fitted plane and a plane position of each of the target planes, the fitted plane and a plane of each of the target planes, to obtain the updated first room plane map.

The embodiment of the present disclosure includes: first converting the point of the object in the valid box in the camera coordinate system into the world coordinate system, and then performing plane-fitting for the point of the object in the valid box in the world coordinate system, to obtain a fitted plane which is marked as plane i; after completing fitting, computing the midpoint of all internal points (internal points here refer to points falling on the plane after fitting) as a point for determining the plane position, and storing all points (including internal points and external points which refer to other points than internal points during fitting) in a plane set.

Based on the position of the fitted plane, a plane (which refer to at least one target object) close to the fitted plane is obtained from the room layout map corresponding to the previous frame RGB image, which is marked as plane j. The room layout map is in the world coordinate system. Thereafter, information fusion is performed based on the plane i and the plane j, to update the room layout map corresponding to the previous frame RGB image, i.e., to generate a first room layout map.

Specifically, prior to obtaining the fitted plane, converting the respective point corresponding to the object in the valid box in the current frame RGB image into the world coordinate system includes:

Step b11: projecting, based on the depth map, the object in the valid box into a normalized plane, to obtain a three-dimensional point of the object in the valid box in the camera coordinate system;

Step b12: obtaining, based on the three-dimensional point of the object in the valid box in the camera coordinate system and the pose information, coordinates of the object in the valid box in the world coordinate system.

Step b13: obtaining the fitted plane based on the coordinates of the object in the valid box in the world coordinate system, through the least squares fitting plane.

The plane position corresponding to the target plane in the world coordinate system, i.e., the plane position of the target plane, can be directly acquired from the room layout map, or the target plane can be projected onto the normalized plane based on the depth map, and the three-dimensional point of the target plane in the camera coordinate system can be obtained; based on the three-dimensional point of the target plane in the camera coordinate system and the pose information, coordinates corresponding to the target plane in the world coordinate system are obtained; wherein, the respective coordinates corresponding to the target plane in the world coordinate system represent the plane position corresponding to the target plane in the world coordinate system.

Specifically, the three-dimensional point (which refers to a point in the camera coordinate system) can be acquired through the depth map:

$$P_c = \pi^{-1}(p)D(p)$$

wherein, $\pi^{-1}$ is inverse mapping of the camera projection mapping, to project coordinates of a pixel into the normalized plane (the plane of z=1), and D(p) is a depth value (z value) of the pixel in the depth map, which has the coordinates of p.

After obtaining the plane, converting, based on the pose of slam, the plane into the world coordinate system is implemented through:

For a plane normal vector (which refers to a plane normal vector in the world coordinate system):

$$n_w = Rn_c$$

herein, $n_c$ is the plane normal vector in the camera coordinate system.

For the plane position (a point on the plane, which refers to a point in the world coordinate system):

$$P_w = RP_c + t$$

Thus, associating the plane types includes: first converting two planes to be used into planes in the same coordinate system, associating them, fusing valid information, and further implementing updating and reconstruction of the room layout.

In an embodiment of the present disclosure, fusing, based on the position of the fitted plane and the plane position of each of the target planes, the fitted plane and each of the target planes, to obtain the updated first room plane map, can be implemented through the following steps:

Step c1: for each of the target planes, comparing, based on the position of the fitted plane and the plane position of the target plane, a normal vector of the fitted plane with a normal vector of the target plane;

Step c2: in case that a normal vector comparison result is determined to be that the plane normal vectors are consistent, comparing the position of the fitted plane and the plane position of the target plane;

Step c3: in case that a position comparison result is determined to be that the positions are consistent, merging the point on the fitted plane with the point on the target plane, to obtain a fused plane, and updating, based on the fused plane, the room plane map corresponding to the previous frame RGB image, to obtain the updated first room layout map; and Step c4: in case that the fitted plane is not consistent with each of the target planes, creating a new plane, and using the created new plane as the updated first room layout map.

In the embodiment of the present disclosure, associating the plane types includes: first determining consistency of the normal vector of the fitted plane and the normal vector of the plane where the object at the similar position in the world coordinate system is located; in case that the normal vectors are consistent, determining the plane position consistency; finally, determining whether the two plane are the same plane. In this way, it can ensure the fusion validity and achieve accurate room layout reconstruction.

Specifically, the planes consistent in normal vectors are extracted, and determining position consistency is performed.

Determining normal vector consistency: if $|n_i - n_j| < \delta_n$, it can be considered that those normal vectors with a modulus of a normal vector difference being less than $\delta_n$ are consistent.

Determining position consistency: the points of the plane set including the plane i and the plane j are merged; a center is computed; respective distances from the center to the two planes are computed; the two distances are averaged; if the average distance is less than $\delta_p$, the two planes are consistent in position.

If the two planes meet the two conditions listed above, it is considered that the two planes are the same plane; all points of the two planes can be merged, and plane-fitting can be performed, to obtain a fused plane.

If a plane is not consistent with any other plane, a new plane is created.

In an embodiment of the present disclosure, projecting, based on the points of the respective objects of the cuboid type in the world coordinate system in the room layout map corresponding to the previous frame RGB image, 3D bounding boxes of the respective objects of the cuboid type in the room layout map corresponding to the previous frame RGB image into the detected current frame RGB image, can be implemented through the following steps:

Step d1: projecting, based on the points of the objects of the cuboid type in the room layout map corresponding to the previous RGB image in the world coordinate system and the pose information, the 3D bounding boxes into the detected current frame RGB image, obtaining 3D points of the objects of the cuboid type in the room layout map corresponding to the previous frame RGB image in the camera coordinate system, and forming a preset number of bounding boxes; and Step d2: using the preset number of bounding boxes as projected bounding boxes.

Wherein, the 3D bounding box here represents a cuboid, and the projected bounding box is six 2D bounding boxes after projecting the 3D bounding box, i.e., a preset number of bounding boxes.

In the embodiment of the present disclosure, projecting the bounding box of the cuboid type may include: projecting an existing cuboid on the map (which refers to a room layout map corresponding to the previous frame RGB image, i.e., a room layout map having been maintained) into an image, and obtaining a bounding box (which refers to a 2D bounding box). The projection equation is provided below:

$$p = \pi(RP_w + t)$$

wherein, $P_w$ is a point in the world coordinate system, R, t are the rotation and the translation of the point from the world coordinate system to the camera coordinate system, and $\pi(\cdot)$ is projecting the three-dimensional point in the camera coordinate system into pixel coordinates.

The above equation is used to project each point in the world coordinate system. Since the (3D) bounding box in the map is a cuboid, 8 vertices of the cuboid are projected onto the image through the above equation. As the connections between points of the cuboid are known and there are 6 faces, it is projected into six (2D) bounding boxes.

In an embodiment of the present disclosure, obtaining, based on the bounding boxes of the respective objects of the cuboid type in the at least one object, the projected 3D bounding boxes and the depth map, the updated second room layout map by associating with the room layout map corresponding to the previous frame RGB image, can be implemented through the following steps:

Step e1: for each object of the cuboid type in the at least one object, in case that the projected bounding box intersects with the bounding box of the object of the cuboid type in the at least one object, performing feature point matching between a point in the intersecting bounding box and a point of the 3D bounding box of the object of the cuboid type in the at least one object;

Step e2: in case that there exists a matched feature point, converting a point corresponding to the matched feature point in the world coordinate system into a point in the camera coordinate system; in case that a z coordinate value of the point, in the camera coordinate system, corresponding to the matched feature point is consistent with a depth value corresponding to the matched feature point with respect to depth, determining that matching succeeds, merging the point in the intersecting bounding box with a point, in the room layout map, corresponding to the previous frame RGB image, and generating the updated second room layout map;

Step e3: in case that there does not exist a matched feature point or there is no depth consistency, determining that matching fails, generating a new bounding box based on the point in the intersecting bounding box, updating, based on the new bounding box, the room layout map corresponding to the previous frame RGB map, and obtaining the updated second room layout map.

In the embodiment of the present disclosure, the updating process based on the room layout map of the cuboid type includes: performing feature point matching; determining depth consistency for the matched feature points, and if it is in a preset threshold range, indicating the matching succeeds, i.e., the matched feature point and the point on the room layout map can be merged; and updating the room layout map. Therefore, by associating different types in different manners, the simultaneous associating (i.e., fusing) process has a high construction speed and incurs low construction overheads as being only related to processing of line and surface data.

Specifically, in case that there exist a (2D) bounding box and a detected (2D) bounding box (which refers to a bounding box of the cuboid type obtained by detecting the current frame RGB image, i.e., a detected box) that intersect with each other, feature point matching is performed for the point in the cuboid and the point in the detected box; if they are matched, the point in the current box and the point in the original map (which refers to the room layout map having been maintained) are merged; PCA is performed to update the original bounding box (which refers to the bounding box in the original map).

If there is no bounding box in the map that matches the bounding box in the image, PCA is performed for those points, and a new bounding box is created.

Wherein, feature point detection and matching include: extracting feature points and a descriptor from the image in the detected box (2D), and storing those feature points and descriptor in the 3D bounding box for matching. When a new frame is arriving, the descriptor of the image in the detected box is extracted; matching is performed for a descriptor in a candidate 3D bounding box and the descriptor in the detected box, and if matching succeeds, depth consistency can be detected. If there is depth consistency, it is considered that the matching is correct.

The depth consistency detection includes: converting the 3D point corresponding to the matched feature point in the 3D bounding box in the camera coordinate system through $P_C=RP_w+t$; comparing the value of z coordinate of the tested $P_C$ with a depth value corresponding to the matched pixel in the 2D detected box, and if the difference is less than $\delta_d$, considering that depth consistency is present.

PCA bounding box construction includes: first, computing a mean value (center) of those points:

$$\overline{P} = \frac{1}{n}\sum_{i=1}^{n} P_i$$

Wherein, $P_i$ is a candidate point for constructing a bounding box.

Then, computing a structure matrix:

$$H = \frac{1}{n}\sum_{i=1}^{n}(P_i - \overline{P})(P_i - \overline{P})^T$$

As $P_i$ is a column vector, H here is a 3×3d symmetric matrix. Subsequently, decomposing the structure matrix H:

$$H = Q^T \Lambda Q = (LQ)^T(LQ)$$

Wherein, Q is an orthogonal matrix indicating an orientation of a bounding box enclosing those three-dimensional points (on the furniture), and L is a symmetric matrix, where three values on the diagonal indicate the length, width and height of the bounding box, respectively.

With the above process, a bounding box in a three-dimensional space can be generated to represent furniture; planes in the three-dimensional space are used to represent the wall, the ceiling and the floor, to thus obtain room layout. Therefore, the present disclosure provides a solution of generating room layout at a low cost based on a lightweight environment monitoring network and a depth camera, in conjunction with a head mounted slam. Since real-time reconstruction is not required, the present disclosure can reduce computing power and lower the expenses in power consumption while ensuring a better rendering.

Figure 5:
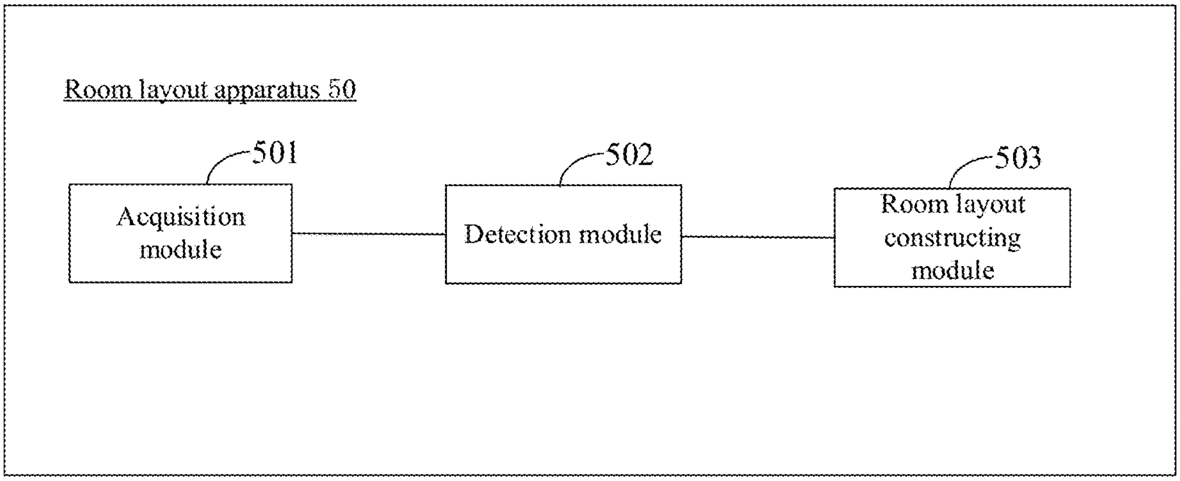
FIG. 5 illustrates a block diagram of a structure of a room layout apparatus provided by an embodiment of the present disclosure.

Corresponding to the room layout method according to the above embodiment of the present disclosure, FIG. 5 illustrates a block diagram of a structure of a room layout apparatus provided by an embodiment of the present disclosure. The room layout apparatus may be configured in an electronic device, for example, an MR head mounted device. For ease of description, only components related to the embodiment of the present disclosure are shown. Referring to FIG. 5, the room layout apparatus 50 may include:

an acquisition module 501 for collecting a current frame RGB image, and acquiring a depth map corresponding to the current frame RGB image and pose information of a head mounted device a detection module 502 for detecting the collected current frame RGB image and determining at least one object; and a room layout constructing module 503 for associating the at least one object in the current frame RGB image, the depth image and the pose information with a room layout map corresponding to a previous frame RGB image, and generating a room layout map corresponding to the current frame RGB image, for enabling a user to calibrate and create a rendering based on the room layout map corresponding to the current frame RGB image.

The acquisition module 501, the detection module 502 and the room layout constructing module provided by embodiments of the present disclosure perform operations of: collecting a current frame RGB image, and acquiring a depth map corresponding to the current frame RGB image and pose information of a head mounted device; detecting and determining at least one object in the collected current frame RGB image; and associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image. Therefore, the present disclosure can reduce the computing force and lower the expense in power consumption while ensuring a better rendering, by: detecting the collected current frame RGB image and obtaining a bounding box of at least one object; then associating the room layout map obtained by updating the previous RGB image based on each object in conjunction with a depth value of a corresponding position in the depth map and the pose of the camera; and updating the room layout map for the current frame RGB image by performing fusion, without real-time reconstruction.

The apparatus provided by the embodiment of the present disclosure can be used to implement the technical solution according to any one room layout method embodiment of the first aspect, and the principle and the technical effect thereof are similar, details of which are omitted here for brevity.

In an embodiment of the present disclosure, the detection module is specifically configured to: detect and obtain a bounding box of at least one object in the current frame RBG image using a real-time fast target detecting method; wherein the same object corresponds to at least one bounding box, and each of the at least one object is of a plane type or a cuboid type.

In an embodiment of the present disclosure, the room layout constructing module includes a first processing unit, a second processing unit and a generating unit, specifically:

the first processing unit is configured to, for each of the at least one object, in case that the object is of a plane type, determine a valid box corresponding to the object, and obtain, based on the valid box, the depth map and the pose information, an updated first room layout map by associating the object with the room layout map corresponding to the previous frame RGB image;

the second processing unit is configured to, for each of the at least one object, in case that the object is of a cuboid type, project, based on points of respective objects of the cuboid type in a world coordinate system in the room layout map corresponding to the previous frame RGB image, 3D bounding boxes of the respective objects of the cuboid type in the room layout map corresponding to the previous frame RGB image into the detected current frame RGB image, and obtain, based on the bounding boxes of the respective objects of the cuboid type in the at least one object, the projected 3D bounding boxes and the depth map, an updated second room layout map by associating the object with the room layout map corresponding to the previous frame RGB image; and the generating unit is configured to fuse the first room layout map and the second room layout map, to generate the room layout map corresponding to the current frame RGB image.

In an embodiment of the present disclosure, the first processing unit is specifically configured to: in case that the object is of the plane type, determine a bounding box with the largest area in at least one bounding box corresponding to the detected object; and use the bounding box with the largest area as the valid box; and correspondingly, the first processing unit is further specifically configured to:

obtain, based on the depth map, a point of the object in the valid box in a camera coordinate system, convert, through the pose information, the point of the object in the valid box in the camera coordinate system into a point in the world coordinate system, and perform plane-fitting for the point of the object in the valid box in the world coordinate system, to obtain a position of a fitted plane;

determine, based on the position of the fitted plane, at least one target plane matching a position of the object from the room plane map corresponding to the previous frame RGB image; and for each of the target planes, fuse, based on the position of the fitted plane and a plane position of each of the target planes, the fitted plane and a plane of each of the target planes, to obtain the updated first room plane map.

In an embodiment of the present disclosure, the first processing unit is further specifically configured to:

for each of the target planes, compare, based on the position of the fitted plane and the plane position of the target plane, a normal vector of the fitted plane with a normal vector of the target plane;

in case that a normal vector comparison result is determined to be that the plane normal vectors are consistent, compare the position of the fitted plane and the plane position of the target plane;

in case that a position comparison result is determined to be that the positions are consistent, merge the point on the fitted plane with the point on the target plane, to obtain a fused plane, and updating, based on the fused plane, the room plane map corresponding to the previous frame RGB image, to obtain the updated first room layout map; and in case that the fitted plane is not consistent with each of the target planes, create a new plane, and use the created new plane as the updated first room layout map.

In an embodiment of the present disclosure, the second processing unit is specifically configured to:

project, based on the points of the objects of the cuboid type in the room layout map corresponding to the previous RGB image in the world coordinate system and the pose information, the 3D bounding boxes into the detected current frame RGB image, obtain 3D points of the objects of the cuboid type in the room layout map corresponding to the previous frame RGB image in the camera coordinate system, and form a preset number of bounding boxes; and use the preset number of bounding boxes as projected bounding boxes.

In an embodiment of the present disclosure, the second processing unit is specifically configured to:

for each object of the cuboid type in the at least one object, in case that the projected bounding box intersects with the bounding box of the object of the cuboid type in the at least one object, perform feature point matching between a point in the intersecting bounding box and a point of the 3D bounding box of the object of the cuboid type in the at least one object;

in case that there exists a matched feature point, convert a point corresponding to the matched feature point in the world coordinate system into a point in the camera coordinate system; in case that a z coordinate value of the point, in the camera coordinate system, corresponding to the matched feature point is consistent with a depth value corresponding to the matched feature point with respect to depth, determine that matching succeeds, merge the point in the intersecting bounding box with a point, in the room layout map, corresponding to the previous frame RGB image, and generate the updated second room layout map;

in case that there does not exist a matched feature point or there is no depth consistency, determining that matching fails, generating a new bounding box based on the point in the intersecting bounding box, update, based on the new bounding box, the room layout map corresponding to the previous frame RGB map, and obtain the updated second room layout map.

The aforementioned modules may be implemented as software components executable on one or more general-purpose processors, or may be implemented as hardware such as a programmable logical device and/or a dedicated integrated circuit for executing, for example, some functions or a combination thereof. In some embodiments, those modules may be embodied in the form of a software product that can be stored in non-volatile storage media. Those non-volatile storage media include a program product that causes a computing device (e.g., a personal computer, server, network device, mobile terminal, and the like) to implement the method as described herein. In an embodiment, those modules as mentioned above can be implemented in a single device, or may be distributed over a plurality of devices. The functions of those modules can be merged into one another, or those modules may be further partitioned into a plurality of sub-modules.

Those skilled in the art would clearly learn that, for ease and brevity of description, reference may be made to the corresponding process described in the above method embodiment for the specific working process of the modules of the above apparatus, details of which are omitted here for brevity.

Based on the same invention idea as proposed for the method, the embodiments of the present disclosure further provide a head mounted device for implementing the method of any one of the items of the first aspect.

Based on the same invention idea as proposed for the method, the embodiments of the present disclosure further provide an electronic device comprising a processor and a memory; the memory for storing computer execution instructions; the processor executing the computer execution instructions stored in the memory to cause the processor to implement the method of any one of the items of the first aspect.

Figure 6:
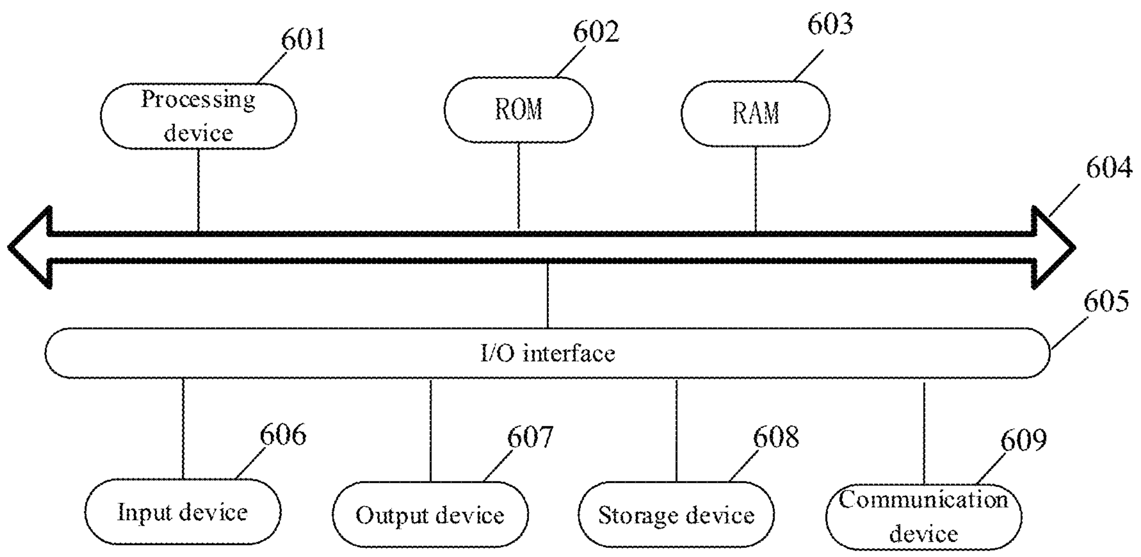
FIG. 6 illustrates a schematic diagram of a structure of an electronic device provided by an embodiment of the present disclosure.

FIG. 6 illustrates a schematic diagram of a structure of an electronic device provided by an embodiment of the present disclosure, where the electronic device may be a terminal device. The electronic device includes a processor and a memory, where the memory for storing computer execution instructions, and the processor executing the computer execution instructions stored in the memory. The processor may include a Central Processing Unit (CPU), or a processing unit in other forms having a room layout capability and/or an instruction executing capability, and can control other components in the electronic device to perform desired functions. The memory may include one or more computer program products each of which may include a computer readable storage medium in various forms, for example, a volatile memory and/or a non-volatile memory. The volatile memory may include, for example, a Random Access Memory (RAM) and/or cache. The non-volatile memory may include, for example, a Read-Only Memory (ROM), a hard disk, a flash memory, or the like. The computer readable storage medium may have one or more computer program instructions stored thereon, and the processor can run the computer program instructions to implement the functions and/or other desired functions according to embodiments of the present disclosure.

The terminal device may include, but is not limited to, for example, a mobile terminal such as a mobile phone, a laptop computer, a digital broadcast receiver, a Personal Digital Assistance (PDA), a Portable Android Device (PAD), a Portable Media Player (PMP), an on-vehicle terminal (e.g. vehicle navigation terminal), a wearable electronic device and the like, or a fixed terminal such as a digital TV, a desktop computer and the like. The electronic device as shown in FIG. 6 is provided only as an example, without suggesting any limitation to the functionality and the application range of the embodiments of the present disclosure.

As shown in FIG. 6, the electronic device may include a processing device (e.g. a central processor, a graphics processor or the like) 601 that can execute various appropriate actions and process based on programs stored in a Read Only Memory (ROM) 602 or programs loaded from a storage device 608 into a Random Access Memory (RAM) 603. The RAM 603 further stores various programs and data required for operations of the electronic device. The processing device 601, the ROM 602 and the RAM 603 are connected via bus 604. An input/output (I/O) interface 605 is also connected to the bus 604.

In general, the following devices may be connected to the I/O interface 605: an input device 606 such as a touch screen, a touch pad, a keyboard, a mouse, a camera, a microphone, an accelerometer, a gyroscope and the like; an output device 607 such as a Liquid Crystal Display (LCD), a loudspeaker, a vibrator and the like; a storage device 608 such as a magnetic tape, a hard drive and the like; and a communication device 609. The communication device 609 can allow the electronic device to be in wired or wireless communication with a further device for data exchange. Although FIG. 6 shows an electronic device including various components, it is not required that all the components as shown be implemented or included. Alternatively, more or fewer components may be implemented or included.

In particular, according to embodiments of the present disclosure, the process described above with reference to the flowchart can be implemented as a computer software program. For example, the embodiments of the present disclosure include a computer program product that includes a computer program carried on a computer readable medium, where the computer program includes program code for executing the method as shown in the flowchart. In those embodiments, the computer program can be loaded from the network via the communication device 609 and installed, or installed from the storage device 608, or installed from the ROM 602. When executed by the processing device 601, the computer program implements the above functionalities defined in the method according to the embodiment of the present disclosure.

It is worth noting that the computer readable medium as described above may be a computer readable signal medium, a computer readable storage medium or any combination thereof. The computer readable storage medium may include, but is not limited to, an electronic, magnetic, optical, electromagnetic, infrared, or semiconductor system, apparatus or device, or any combination of the foregoing. More specific examples of the computer readable storage medium may include, but is not limited to, electrical connection with one or more wires, portable computer diskette, hard disk, Random Access Memory (RAM), Read Only Memory (ROM), Erasable Programmable Read Only Memory (EPROM or flash memory), optical fiber, portable Compact Disc Read Only Memory (CD-ROM), light storage device, magnetic memory device or any appropriate combination thereof. In the context of this disclosure, a computer readable storage medium may be any tangible medium that can contain, or store a program for use by or in connection with an instruction execution system, apparatus, or device. In present disclosure, a computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wire, optical fiber cable, RF and the like, or any suitable combination of the foregoing.

The computer readable medium may be included in the electronic device as describe above; it may be provided alone, without being assembled in the electronic device.

The computer readable medium may carry one or more programs that cause, when executed by an electronic device, the electronic device to implement the method according to the embodiments of the present disclosure.

Computer program code for carrying out operations for the present disclosure can be written in any combination of one or more programming language, including an object oriented programming language, such as Java, Smalltalk, C++ or the like and conventional procedural programming language, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units as described in the embodiments of the present disclosure may be implemented in the form of software, or may be implemented in the form of hardware. A term for a unit does not formulate a limitation to the unit per se, in some circumstances. For example, the first acquisition unit may be described as "a unit for acquiring at least two Internet Protocol addresses.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a Random Access Memory (RAM), a Read Only Memory (ROM), an Erasable Programmable Read Only Memory (EPROM or flash memory), an optical fiber, a portable Compact Disc Read Only Memory (CD-ROM), an optical storage device, a magnetic storage device, or any suitable combination of the foregoing.

The embodiments of the present disclosure provide a computer program product including a computer program that implements the room layout method according to the first aspect when executed by the processor.

In the first aspect, the embodiments of the present disclosure provide a method for room layout, comprising:

collecting a current frame RGB image, and acquiring a depth map corresponding to the current frame RGB image and pose information of a head mounted device;

detecting and determining at least one object in the collected current frame RGB image; and associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image.

According to one or more embodiments of the present disclosure, detecting and determining at least one object in the collected current frame RGB image comprises: detecting and obtaining a bounding box of at least one object in the current frame RBG image using a real-time fast target detecting method; wherein the same object corresponds to at least one bounding box, and each of the at least one object is of a plane type or a cuboid type.

According to one or more embodiments of the present disclosure, associating the at least one object in the current frame RGB image, the depth image and the pose information with the room layout map corresponding to the previous frame RGB image, and generating the room layout map corresponding to the current frame RGB image, comprise:

for each of the at least one object, performing the following steps:

in case that the object is of a plane type, determining a valid box corresponding to the object, and obtaining, based on the valid box, the depth map and the pose information, an updated first room layout map by associating the object with the room layout map corresponding to the previous frame RGB image;

in case that the object is of a cuboid type, projecting, based on points of respective objects of the cuboid type in a world coordinate system in the room layout map corresponding to the previous frame RGB image, 3D bounding boxes of the respective objects of the cuboid type in the room layout map corresponding to the previous frame RGB image into the detected current frame RGB image, and obtaining, based on the bounding boxes of the respective objects of the cuboid type in the at least one object, the projected 3D bounding boxes and the depth map, an updated second room layout map by associating the object with the room layout map corresponding to the previous frame RGB image; and fusing the first room layout map and the second room layout map, to generate the room layout map corresponding to the current frame RGB image According to one or more embodiments of the present disclosure, in case that the object is of the plane type, determining a valid box corresponding to the object, comprises:

in case that the object is of the plane type, determining a bounding box with the largest area in at least one bounding box corresponding to the detected object; and using the bounding box with the largest area as the valid box; and correspondingly, obtaining, based on the valid box, the depth map and the pose information, the updated first room layout map by associating with the room layout map corresponding to the previous frame RGB image, comprises:

obtaining, based on the depth map, a point of the object in the valid box in a camera coordinate system, converting, through the pose information, the point of the object in the valid box in the camera coordinate system into a point in the world coordinate system, and performing plane-fitting for the point of the object in the valid box in the world coordinate system, to obtain a position of a fitted plane;

determining, based on the position of the fitted plane, at least one target plane matching a position of the object from the room plane map corresponding to the previous frame RGB image; and for each of the target planes, fusing, based on the position of the fitted plane and a plane position of each of the target planes, the fitted plane and a plane of each of the target planes, to obtain the updated first room plane map.

According to one or more embodiments of the present disclosure, fusing, based on the position of the fitted plane and the plane position of each of the target planes, the fitted plane and each of the target planes, to obtain the updated first room plane map, comprises:

for each of the target planes, comparing, based on the position of the fitted plane and the plane position of the target plane, a normal vector of the fitted plane with a normal vector of the target plane;

in case that a normal vector comparison result is determined to be that the plane normal vectors are consistent, comparing the position of the fitted plane and the plane position of the target plane;

in case that a position comparison result is determined to be that the positions are consistent, merging the point on the fitted plane with the point on the target plane, to obtain a fused plane, and updating, based on the fused plane, the room plane map corresponding to the previous frame RGB image, to obtain the updated first room layout map; and in case that the fitted plane is not consistent with each of the target planes, creating a new plane, and using the created new plane as the updated first room layout map.

According to one or more embodiments of the present disclosure, projecting, based on the points of the respective objects of the cuboid type in the world coordinate system in the room layout map corresponding to the previous frame RGB image, 3D bounding boxes of the respective objects of the cuboid type in the room layout map corresponding to the previous frame RGB image into the detected current frame RGB image, comprises:

projecting, based on the points of the objects of the cuboid type in the room layout map corresponding to the previous RGB image in the world coordinate system and the pose information, the 3D bounding boxes into the detected current frame RGB image, obtaining 3D points of the objects of the cuboid type in the room layout map corresponding to the previous frame RGB image in the camera coordinate system, and forming a preset number of bounding boxes; and using the preset number of bounding boxes as projected bounding boxes.

According to one or more embodiments of the present disclosure, obtaining, based on the bounding boxes of the respective objects of the cuboid type in the at least one object, the projected 3D bounding boxes and the depth map, the updated second room layout map by associating with the room layout map corresponding to the previous frame RGB image, comprises:

for each object of the cuboid type in the at least one object, in case that the projected bounding box intersects with the bounding box of the object of the cuboid type in the at least one object, performing feature point matching between a point in the intersecting bounding box and a point of the 3D bounding box of the object of the cuboid type in the at least one object;

in case that there exists a matched feature point, converting a point corresponding to the matched feature point in the world coordinate system into a point in the camera coordinate system; in case that a z coordinate value of the point, in the camera coordinate system, corresponding to the matched feature point is consistent with a depth value corresponding to the matched feature point with respect to depth, determining that matching succeeds, merging the point in the intersecting bounding box with a point, in the room layout map, corresponding to the previous frame RGB image, and generating the updated second room layout map;

in case that there does not exist a matched feature point or there is no depth consistency, determining that matching fails, generating a new bounding box based on the point in the intersecting bounding box, updating, based on the new bounding box, the room layout map corresponding to the previous frame RGB map, and obtaining the updated second room layout map.

In a second aspect, the embodiments of the present disclosure provide a room layout apparatus, comprising:

an acquisition module for collecting a current frame RGB image, and acquiring a depth map corresponding to the current frame RGB image and pose information of a head mounted device a detection module for detecting the collected current frame RGB image and determining at least one object; and a room layout constructing module for associating the at least one object in the current frame RGB image, the depth image and the pose information with a room layout map corresponding to a previous frame RGB image, and generating a room layout map corresponding to the current frame RGB image, for enabling a user to calibrate and create a rendering based on the room layout map corresponding to the current frame RGB image.

According to one or more embodiments of the present disclosure, the detection module is specifically configured to:

detect and obtain a bounding box of at least one object in the current frame RBG image using a real-time fast target detecting method;

wherein the same object corresponds to at least one bounding box, and each of the at least one object is of a plane type or a cuboid type.

According to one or more embodiments of the present disclosure, the room layout constructing module comprises a first processing unit, a second processing unit and a generating unit, where:

the first processing unit is configured to, for each of the at least one object, in case that the object is of a plane type, determine a valid box corresponding to the object, and obtain, based on the valid box, the depth map and the pose information, an updated first room layout map by associating the object with the room layout map corresponding to the previous frame RGB image;

the second processing unit is configured to, for each of the at least one object, in case that the object is of a cuboid type, project, based on points of respective objects of the cuboid type in a world coordinate system in the room layout map corresponding to the previous frame RGB image, 3D bounding boxes of the respective objects of the cuboid type in the room layout map corresponding to the previous frame RGB image into the detected current frame RGB image, and obtain, based on the bounding boxes of the respective objects of the cuboid type in the at least one object, the projected 3D bounding boxes and the depth map, an updated second room layout map by associating the object with the room layout map corresponding to the previous frame RGB image; and the generating unit is configured to fuse the first room layout map and the second room layout map, to generate the room layout map corresponding to the current frame RGB image.

According to one or more embodiments of the present disclosure, the first processing unit is specifically configured to:

in case that the object is of the plane type, determine abounding box with the largest area in at least one bounding box corresponding to the detected object; and use the bounding box with the largest area as the valid box; and correspondingly, the first processing unit is further specifically configured to:

obtain, based on the depth map, a point of the object in the valid box in a camera coordinate system, converting, through the pose information, the point of the object in the valid box in the camera coordinate system into a point in the world coordinate system, and perform plane-fitting for the point of the object in the valid box in the world coordinate system, to obtain a position of a fitted plane;

determine, based on the position of the fitted plane, at least one target plane matching a position of the object from the room plane map corresponding to the previous frame RGB image; and for each of the target planes, fuse, based on the position of the fitted plane and a plane position of each of the target planes, the fitted plane and a plane of each of the target planes, to obtain the updated first room plane map.

According to one or more embodiments of the present disclosure, the first processing unit is specifically configured to:

for each of the target planes, compare, based on the position of the fitted plane and the plane position of the target plane, a normal vector of the fitted plane with a normal vector of the target plane;

in case that a normal vector comparison result is determined to be that the plane normal vectors are consistent, compare the position of the fitted plane and the plane position of the target plane;

in case that a position comparison result is determined to be that the positions are consistent, merge the point on the fitted plane with the point on the target plane, to obtain a fused plane, and update, based on the fused plane, the room plane map corresponding to the previous frame RGB image, to obtain the updated first room layout map; and in case that the fitted plane is not consistent with each of the target planes, create a new plane, and using the created new plane as the updated first room layout map.

According to one or more embodiments, the second processing unit is specifically configured to:

project, based on the points of the objects of the cuboid type in the room layout map corresponding to the previous RGB image in the world coordinate system and the pose information, the 3D bounding boxes into the detected current frame RGB image, obtain 3D points of the objects of the cuboid type in the room layout map corresponding to the previous frame RGB image in the camera coordinate system, and form a preset number of bounding boxes; and use the preset number of bounding boxes as projected bounding boxes.

According to one or more embodiments of the present disclosure, the second processing unit is specifically configured to:

for each object of the cuboid type in the at least one object, in case that the projected bounding box intersects with the bounding box of the object of the cuboid type in the at least one object, perform feature point matching between a point in the intersecting bounding box and a point of the 3D bounding box of the object of the cuboid type in the at least one object;

in case that there exists a matched feature point, convert a point corresponding to the matched feature point in the world coordinate system into a point in the camera coordinate system; in case that a z coordinate value of the point, in the camera coordinate system, corresponding to the matched feature point is consistent with a depth value corresponding to the matched feature point with respect to depth, determine that matching succeeds, merge the point in the intersecting bounding box with a point, in the room layout map, corresponding to the previous frame RGB image, and generate the updated second room layout map;

in case that there does not exist a matched feature point or there is no depth consistency, determining that matching fails, generate a new bounding box based on the point in the intersecting bounding box, update, based on the new bounding box, the room layout map corresponding to the previous frame RGB map, and obtain the updated second room layout map.

In a third aspect, embodiments of the present disclosure provide a head mounted device for implementing the room layout method of any one of items of the first aspect.

In a fourth aspect, embodiments of the present disclosure provide an electronic device comprising a processor and a memory; the memory for storing computer execution instructions; the processor executing the computer execution instructions stored in the memory to cause the processor to implement the room layout method of any one of items of the first aspect.

In a fifth aspect, embodiments of the present disclosure provide a computer readable storage medium, where the computer readable storage medium has computer execution instructions stored therein, and a processor, when executing the computer execution instructions, implements the room layout method of any one of items of the first aspect.

In a sixth aspect, embodiments of the present disclosure provide a computer program product comprising a computer program, wherein the computer program, when executed by a processor, implements the room layout method of any one of items of the first aspect.

The above description is only a preferred embodiment of the present disclosure and is illustrative of the principles of the technology employed. It will be appreciated by those skilled in the art that the scope of the present disclosure is not limited to the embodiments with a specific combination of the above-mentioned features, but also covers other embodiments with any combination of the above-mentioned features or their equivalents without departing from the invention idea disclosed herein. For example, the above features may be replaced with (but not limited to) technical features having similar functions disclosed herein.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the present disclosure has been described in language specific to structural features and/or methodological acts, it would be appreciated that the present disclosure defined in the appended claims is not necessarily limited to the specific features or acts described above.

Rather, the specific features and acts described above are disclosed as example forms of implementing the claims.

Three-Dimensional Scene Reconstruction Method, Apparatus, Device and Medium

The present disclosure further relates to the field of computer vision technologies, in particular a method and an apparatus for three-dimensional scene reconstruction, a device and a medium.

According to the room plan, a scheme computed for a room layout, a 3D floor plan of a room (also referred to as 3D room map, or room map) can be created. An Extended Reality (XR) device can acquire a room map using a room plan, to enable a user to interact, based on the room map, with a virtual object such as decorations on a table or a wall, or the like.

Nowadays, with the widespread use of XR devices, there are growing demands for using Mixed Reality (MR) application on the XR devices. In the case, a see through function is required to apply MR applications to the XR devices. The see through function is to enable a user to see a real space with three-dimensional scene information reconstructed by an XR device, by reconstructing in real time three-dimensional information of a real scene based on images collected by cameras on the XR device, and projecting the reconstructed three-dimensional scene information to the human eye coordinate system.

After the XR device obtains a 3D room map based on the room created by the room plan, if the user desires to see the 3D room map provided by the room plan via the see through function on the XR device, the XR device needs to perform high-precision real time three-dimensional reconstruction based on images collected by cameras, and obtain a three-dimensional model aligned with the 3D room map. However, this high-precision real time three-dimensional reconstruction requires a large amount of computing power, resulting in high power consumption of the XR device.

The present disclosure provides a method and an apparatus for three-dimensional scene reconstruction, a device and a medium, to achieve high-precision real time three-dimensional reconstruction while reducing computing power and power consumption required during three-dimensional reconstruction.

In a first aspect, the embodiments of the present disclosure provide a method for three-dimensional scene reconstruction, comprising: determining a first depth map based on a room map; determining a second depth map based on a binocular environment image collected by a binocular camera; determining a target depth map based on the first depth map and the second depth map; and rendering and displaying a three-dimensional scene image based on the target depth map and a target environment image; wherein the target environment image is determined based on pose information corresponding to the target depth map.

In a second aspect, embodiments of the present disclosure provide an apparatus for three-dimensional scene reconstruction, comprising: a first determining module for determining a first depth map based on a room map; a second determining module for determining a second depth map based on a binocular environment image collected by a binocular camera; a third determining module for determining a target depth map based on the first depth map and the second depth map; and an image display module for rendering and displaying a three-dimensional scene image based on the target depth map and a target environment image; wherein the target environment image is determined based on pose information corresponding to the target depth map.

In a third aspect, the embodiments of the present disclosure provide an electronic device, comprising: a processor and a memory for storing a computer program, wherein the processor is configured to execute the computer program stored in the memory to implement the method for three-dimensional scene reconstruction according to the embodiments of the first aspect or various implementations thereof.

In a fourth aspect, the embodiments of the present disclosure provide a computer readable storage medium for storing a computer program which causes a computer to implement the method for three-dimensional scene reconstruction according to the embodiments of the first aspect or various implementations thereof.

In a fifth aspect, the embodiments of the present disclosure provide a computer program product comprising program instructions, wherein the program instructions, when running on an electronic device, cause the electronic device to implement the method for three-dimensional scene reconstruction according to the embodiments of the first aspect or various implementations thereof.

The technical solution disclosed here at least has the following advantages of: determining a target depth map based on a first depth map determined based on a room map, and a second depth map determined based on a binocular environment image collected by a binocular camera, and rendering and displaying a three-dimensional scene image based on the target depth image, and a target environment image determined based on pose information corresponding to the target depth image. The present disclosure can obtain a high-precision three-dimensional scene image by fusing the environment image collected by the binocular camera and the room map, to thus achieve high-precision real time three-dimensional reconstruction while reducing the computing power and power consumption required during three-dimensional reconstruction.

Reference now will be made to the drawings of the embodiments of the present disclosure, clear and complete description will be provided on the technical solution of the embodiments of the present disclosure. Obviously, the embodiments described here are only a part of embodiments of the present disclosure, rather than all of them. Based on the embodiments described here, the ordinary skilled in the art could acquire all of the other embodiments falling into the scope of protection of the present disclosure, without doing creative work.

It is worth noting that the terms "first," "second," and the like in the description and the claims of the present disclosure, as well as the drawings mentioned above, are used for distinguishing similar elements, but not necessarily for describing a particular sequential or chronological order. It is to be understood that the data used in this way are interchangeable under appropriate circumstances such that the embodiments of the present disclosure described here can be implemented in other sequences than those illustrated or described here. Furthermore, the terms "comprise," "include," and any variations thereof, are intended to be a non-exclusive inclusion. For example, a process, method, system, product, or apparatus that comprises a collection of steps or elements is not necessarily limited to those steps or elements expressly listed, but may include other steps or elements not expressly listed or inherent to the process, method, product, or apparatus.

The present disclosure can be applied to a three-dimensional reconstruction scene. Nowadays, a user can create a 3D floor plan of a room using a room plan of an XR device. When the user views the 3D room map provided by the room plan through the see-through function on the XR device, the XR device needs to perform high-precision real time 3D reconstruction based on images collected by the cameras, to obtain a 3D model aligned with the 3D room map. However, such high-precision real time 3D reconstruction requires a large amount of computing power, causing an increase in power consumption of the XR device. Accordingly, in view of the above problem, the present disclosure designs a method for three-dimensional scene reconstruction, to reduce the computing power and power consumption required during three-dimensional reconstruction.

For ease of understanding on embodiments of the present disclosure, some concepts used in all of the embodiments of the present disclosure are properly explained and described before the respective embodiments of the present disclosure are described, specifically:

1) Virtual Reality (VR) is a technology for creating and exploring a virtual world, with which a virtual environment is computed and generated, and which is multi-source information (the virtual reality as mentioned here at least includes virtual perception, or may further include audial perception, tactile perception, motion perception, even taste perception and smell perception, and like), to simulate an integrated and interactive 3D dynamic vision of a virtual environment and entity behaviors such that a user can be immersed in the simulated virtual reality environment, and to implement applications in various virtual environments such as maps, games, videos, education, medical care, simulation, assistance in manufacturing, maintenance and repairmen, and the like.

2) Virtual Reality Device (VR device) is a terminal that can achieve a virtual reality effect, which is typically implemented in the form of glasses, a Head Mount Display (TIMID), or contact lenses, to implement virtual perception and other perceptions, where the form of implementing the VR device can be further miniaturized or scaled up, rather than being limited to the above examples.

Alternatively, the VR device described in embodiments of the present disclosure may include, but is not limited to, the following types:

2.1) Personal Computer Virtual Reality (PCVR) device which performs computing and data output related to the virtual reality function using a PC, such that an external PCVR device can use the data output by the PC to implement the effect of the virtual reality.

2.2) Mobile virtual reality device which supports setting of a mobile terminal (e.g. a smart phone) in various ways (e.g., through a Head Mount Display with dedicated card slots), and is connected to a mobile terminal in a wired or wireless manner, which performs computing related to the virtual reality function and outputs data to the mobile virtual reality device, to enable virtual reality videos to be watched, for example, through an APP on the mobile terminal.

2.3) All-In-One VR device that includes a processor configured to perform computing related to the virtual function, and therefore has an independent virtual reality input and output function, without being connected to a PC or mobile terminal, having more flexibility in use.

3) Augmented Reality (AR) is a technology including: in a camera image acquisition process, computing a camera pose parameter of a camera in a reality world (also referred to as 3D world, or real world) in real time, and adding a virtual element to the image collected by the camera based on the camera pose parameter. The virtual element includes, but is not limited to: an image, a video, and a 3D model. The objective of the AR technology is to integrate the virtual world with the real world on the screen for interaction.

4) Mixed Reality (MR) that is a simulated scene integrated from a perception input (e.g. a virtual object) created by a computer, and a perception input from a physical scene or its representation. In some MR scenes, the perception input created by the computer may be adapted to a change of the perception input from the physical scene. In addition, some electronic systems for rendering a MR scene can monitor an orientation and/or position relative to the physical scene, such that the virtual object can interact with a real object (i.e., a physical element or a representation thereof from the physical scene). For example, the systems can monitor movement, to cause virtual plants to seem stationary relative to physical buildings.

5) Extended Reality (XR) refers to all real and virtual combined environment and human-computer interactions generated with the computer technologies and wearable devices, including Virtual Reality (VR), Augmented Reality (XR), Mixed Reality, and the like.

Following the introduction on some concepts involved in embodiments of the present disclosure, detailed description will be provided below on a method for three-dimensional scene reconstruction provided by embodiments of the present disclosure with reference to the drawings.

Figure 7:
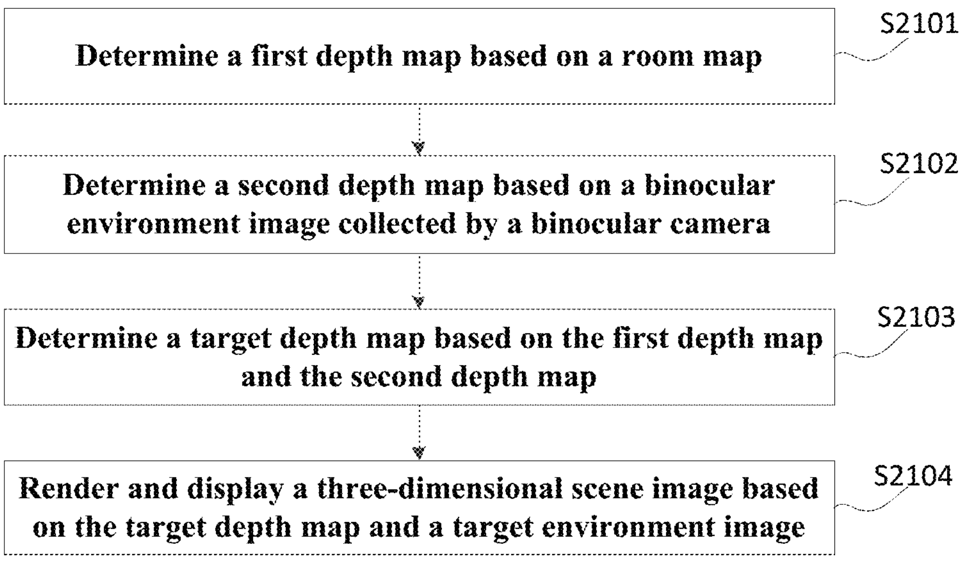
FIG. 7 illustrates a schematic flowchart of a method for three-dimensional reconstruction provided by embodiments of the present disclosure.

FIG. 7 illustrates a schematic flowchart of a method for three-dimensional reconstruction provided by embodiments of the present disclosure. The method for three-dimensional reconstruction provided by embodiments of the present disclosure may be executed by a three-dimensional reconstruction apparatus. The three-dimensional reconstruction apparatus may be formed by hardware and/or software, and may be integrated in an electronic device. In the embodiments of the present application, the electronic device may be an XR device, or any other hardware device that can provide a virtual space and a see through function. The XR device may be a VR device, AR device, MR device, or the like, which is not specifically limited in the present disclosure.

For ease of illustrating the present disclosure, description below will be made with an electronic device as the XR device.

As shown in FIG. 7, the method includes steps of:

S2101, determining a first depth map based on a room map.

It would be appreciated that the room map is a 3D floor plan created based on a room plan.

Alternatively, when designing an XR device, the user may enable the room plan design function on the XR device. Then, the room plan design function displays movement prompt information to the user through the XR device screen, and the user therefore can move in the room based on the movement prompt information, to cause acquisition means on the XR device, for example, a camera and the like, to collect various types of information, for example, images within the room, to create a room map. Thereafter, the XR device stores the room map.

If the user desires to view the room map provided by the room plan using the see through function on the XR device, an enable instruction is sent to the XR device in any way, to enable the see through function. The XR device controls the binocular camera to collect environmental images based on the enabled see through function. Then, real time three-dimensional reconstruction is performed based on the room map provided by the room plan and the environmental images collected by the camera.

Considering that the see through function is typically used in an MR space, the present disclosure sends an enable instruction to the XR device, to enable the see through function, in one of the following modes:

Mode I

When the XR device has an eye tracking function, a user can stare at any one of MR applications on the display interface, and when determining that the duration of the user staring at the MR application reaches a preset duration, the XR device determines that the user intends to enable the application. At this time, the XR device enables the MR application and the see through function, to wake up the application and enter the MR space. Wherein, the preset duration can be flexibly adjusted based on the identification precision of the eye tracking function, which may be 3 seconds (s), 3.5s, or the like, and which is not specifically limited here.

Mode II

A user may send an MR space waking up instruction to the XR device through voice, to cause the XR device to wake up the MR space and enable the see through function based on the MR space waking up instruction.

Exemplarily, assumed that the voice information sent by the user is: opening an MR space. Upon receiving the voice information, the XR device determines that the user requires to wake up the MR space, by performing voice recognition on the voice information. In the case, the XR device wakes up the MR space in a concealed state, and enters the MR space while enabling the see through function.

By means of example, assumed that the voice information sent by the user is: enabling MR application XX. Upon receiving the voice information and performing voice recognition on the voice information, the XR device determines that the user intends to open the XR application XX. At this time, the XR device enables the MR application XX and the see through function, to wake up them and enter the MR space provided by the MR application XX.

Mode III

A user can control a corresponding cursor to linger on any one of MR applications on the display interface using an external device such as a handle, a hand controller, or the like, and press a "confirm" button such as a trigger button or the like, to send the MR application enable instruction to the XR device. Then, upon detecting the enable instruction on the above MR application, the XR device enables the MR application and the see through function, to wake up them and enter the MR space.

It should be noted that the modes of sending an enable instruction as described above are provided only for exemplarily describing the embodiments of the present disclosure, without suggesting any specific limitation thereto. That is, other modes than the two described above, for example, using a gesture or the like, may be employed to send a see through function enable instruction to the XR device, details of which are omitted here for brevity.

After enabling the see through function, the XR device can control the binocular camera to collect a binocular image in each perspective. In the meantime, the XR device can acquire pose information in each perspective, i.e., position information and pose information of the binocular camera.

In the embodiments of the present disclosure, when acquiring the pose information of the binocular camera, the XR device may use an inertial measurement unit (IMU), or other sensor such as a nine-axis sensor or the like, which is not specifically limited here.

Considering that the indoor area that a user can see is varied with the perspective, the present disclosure proposes to, when acquiring the pose information of the binocular camera, rasterize the room map based on the pose information of the binocular camera, to thus obtain a first depth map corresponding to each perspective.

In actual use, in order to reduce the data processing amount, the stored room map may be a triangular mesh model, i.e., all of the rectangles (blocks) in the created room map are represented using two triangles and stored as a triangle mesh model, respectively.

Therefore, rasterizing the room map includes first determining whether the room map is a triangle mesh model. If it is a triangle mesh model, the triangle mesh model is rasterized based on the pose information of the binocular camera, to obtain a first depth map. If it is not a triangle mesh model, the room map is first converted into a triangular mesh model, and the triangular mesh model is then rasterized based on the pose information of the binocular camera, to obtain a first depth map.

When determining whether the room map is a triangular mesh model, a room map identifier of the room can be determined by looking up a data list. Then, whether the room map is a triangular mesh model is determined based on the room map identifier. The room map identifier used here is used to characterize whether the room map is a triangular mesh model.

By way of example, it is assumed that the room map identifier is "1" for identifying a triangular mesh model, and "0" for identifying a non-triangular mesh model. In the case, when determining that the room map identifier is "1," it can be determined that the room map is a triangular mesh model. In turn, when determining that the room map identifier is "0," it can be determined that the room map is a non-triangular mesh model.

Alternatively, when determining that the room map is a non-triangular mesh model, the room map is converted into a triangular mesh model, which may be implemented by representing each of the blocks in the room map with two triangles, for conversion into a triangular mesh model. The specific conversion process may include calling an existing triangle mesh conversion interface or conversion algorithm, to convert the room map into a triangular mesh model, which is not specifically limited here.

In the present disclosure, the following equations (1) to (3) may be employed to rasterize the triangular mesh model based on the pose information of the binocular camera, to thus obtain a first depth map:

$$P_c = RP_w + t$$

Wherein, $P_c$ is three-dimensional coordinates of a vertex in the human eye coordinate system, R and t are a rotation and a translation from a mesh to the human eye coordinate system, and $P_w$ is coordinates of a triangle vertex in the triangular mesh model.

$$d_v = P_{c.z}$$

Wherein, $d_v$ is a depth of the triangle vertex, and $P_{c,z}$ is a z-axis coordinate in a fixed-point three-dimensional coordinates in the human eye coordinate system.

$$px = \pi(P_c) \tag{3}$$

Wherein, px is a pixel, π( ) is projecting a three-dimensional point into a pixel point, and $P_c$ is three-dimensional coordinates of the vertex in the human eye coordinate system.

The equations (1) to (3) are provided for rasterizing a vertex on a triangular face in the triangular mesh model. However, because there are a plurality of points in each triangular face, a large computing amount is generated if those points are directly projected, and a great amount of computing resources are required. Therefore, coordinates of a gravity center of the triangular face is computed based on the vertices of the projected triangular face. Then, for all points in the triangular face, interpolation is performed based on the coordinates of the gravity center, to obtain a first depth map corresponding to the pose information of the binocular camera. Such arrangement has the advantage of incurring a small computing amount for the whole rasterization process, to thus reduce the required computing resources and lower the power consumption.

It is a common technique to compute the coordinates of the gravity center of the triangular face based on the vertices of the projected triangular face, details of which are omitted here for brevity.

Alternatively, for all the points in the triangular face, interpolation is performed based on the coordinates of the gravity center, to obtain a first depth map corresponding to the pose information of the binocular camera, which is specifically implemented through the following equation (4):

$$D_l = ud_u + vd_v + wd_w. \tag{4}$$

Wherein, $D_l$ is the first depth map, u, v and w are coordinates of the gravity center, and $d_u$, $d_v$ and $d_w$ are depths of three vertices in the triangular face.

S2102, determining a second depth map based on a binocular environment image collected by the binocular camera.

In practice, an XR device may have a plurality of cameras installed thereon, to implement functions such as tracking and positioning via environment images collected by the cameras. The cameras may be common or fisheye cameras, which is not limited here.

Figure 8:
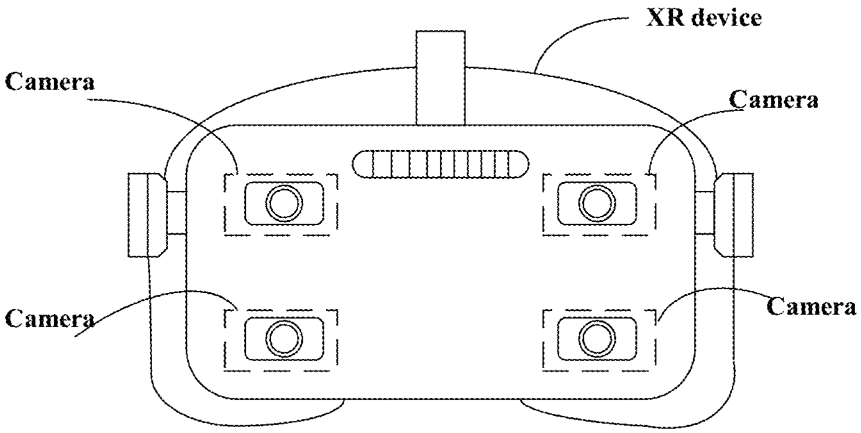
FIG. 8 illustrates a schematic diagram of a plurality of cameras mounted on an XR device provided by embodiments of the present disclosure.

Exemplarily, as shown in FIG. 8, the XR device may have four cameras installed thereon, which face the upper left, the lower left, the upper right and the lower right, respectively.

Figure 9:
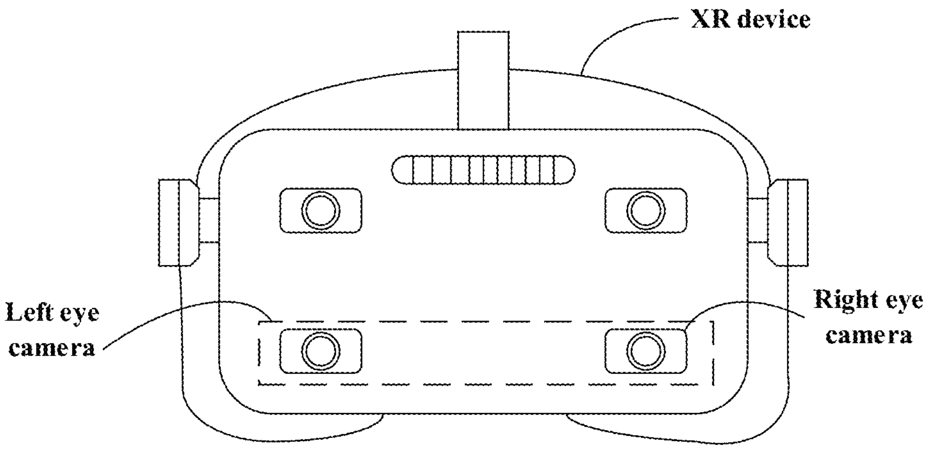
FIG. 9 illustrates a schematic diagram of using two cameras respectively facing the lower left and the lower right on an XR device, as a binocular camera, provided by embodiments of the present disclosure.

As such, in the embodiments of the present disclosure, any two of the cameras on the XR device may be selected as the binocular camera. For example, the two cameras facing the lower left and the lower right are selected as the binocular camera, i.e., a binocular stereo vision. See FIG. 9 for details. For another example, the two cameras facing the lower left and the upper right are used as the binocular camera, and so on, which is not limited here.

The first depth map determined based on the room map provided according to the room plan only includes the depth of stationary furniture, making it impossible to obtain the depths of the movable furniture (e.g. a chair, a stool, a table, and the like) and movable objects (e.g., a person, a pet, a sweeping robot, and the like). As the movable furniture or objects all move on the floor, they can be observed through the two cameras facing the lower left and lower right on the XR device. Therefore, the two cameras facing the lower left and the lower right are preferably used in the present disclosure as the binocular camera.

Alternatively, after the XR device controls the binocular camera to collect a binocular environment image in each perspective, determining the second depth map based on the binocular environment image includes: determining a disparity map based on the binocular environment image; and then determining the second depth map based on the disparity map.

In some implementations, determining the disparity map based on the binocular environment image can be implemented using a binocular matching algorithm. The binocular matching algorithm may include, but is not limited to: a semi-global block matching (SGBM) and a sum of absolute differences (SAD) algorithm. Alternatively, a binocular matching interface, for example, an interface provided by Qualcomm CVP, may be called, to obtain a disparity map based on the binocular environment image, which is not limited here.

Further, the disparity map is converted into a depth map, and the obtained depth map is determined as the second depth map. Alternatively, converting the disparity map to the depth map and obtaining the second depth map can be implemented through the equation (5):

$$d = \frac{f * b}{disp} \tag{5}$$

d is the second depth map, f is an internal camera parameter, b is the binocular baseline, and disp is the disparity map.

Considering the first depth map in step S2101 is in the human eye coordinate system, in order to make the coordinate systems consistent, after obtaining the second depth map, the second depth map can be projected to the human eye coordinate system, to ensure that the first depth map and the second depth map are located in the same coordinate system. In this way, when determining a target depth map based on the first depth map and the second depth map, the coordinate system conversion operations can be reduced, and the 3D reconstruction speed can be improved.

Alternatively, the present disclosure can project the second depth into the human eye coordinate system through the equation (6):

$$\begin{cases} P = R\pi^{-1}(px)D_s(px) + t \\ D_v(\pi(P)) = P_z \end{cases} \tag{6}$$

P is the 3D point in the disparity map, R and t are the rotation and translation from the left eye camera to the human eye center coordinate system, $\pi^{-1}( )$ is projecting the pixel point onto a normalized plane (a plane of z=1), px is the pixel, $D_s(px)$ is the depth at the second depth image pixel px obtained through the binocular stereo vision, π(P) is projecting the 3D point into the pixel point, $D_v$ ( ) is the second depth map obtained through the binocular stereo vision, and $P_z$ is the z-axis coordinate of the 3D point in the disparity map.

Figure 10:
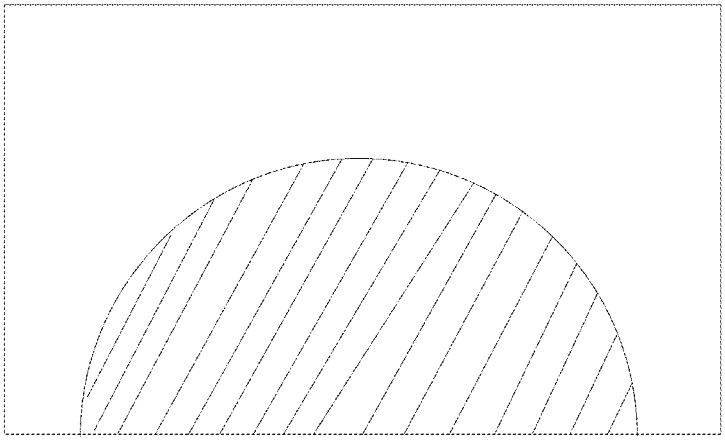
FIG. 10 illustrates a schematic diagram of a coverage, when projecting a second depth map into a human eye coordinate system, provided by embodiments of the present disclosure.

Exemplarily, assumed that the target camera is the two cameras respectively facing the lower left and the lower right, the second depth map obtained based on the binocular environment image collected by the two cameras is projected into the human eye coordinate system, and the coverage in the human eye coordinate system is the shaded area as shown in FIG. 10.

It is to be noted that the execution sequence of the steps S2101 and S2102 in the embodiments of the present disclosure may be: executing first S2101 and then S2102; or executing first S2102 and then S2101; or executing S2101 and S2102 in parallel, which is not specifically limited here.

S2103, determining a target depth map based on the first depth map and the second depth map.

Alternatively, a binocular environment image frame and a room map frame corresponding to the same pose information are determined based on the pose information of the binocular camera, and the target depth map is determined based on the first depth map determined based on the room map frame, and the second depth map determined based on the binocular environment image frame.

Further, determining the target depth map specifically includes performing image fusion on the first depth map and the second depth map corresponding to the same pose information, to generate the target depth map.

It would be appreciated that the target depth map in the present disclosure is a depth map after three-dimensional reconstruction.

S2104, rendering and displaying a three-dimensional scene image based on the target depth map and a target environment image.

Wherein, the target environment image is determined based on the pose information corresponding to the target depth map.

The target depth map is related to depth only, but what is to be displayed to the user should be a three-dimensional scene. Therefore, it is also required to display the color on the basis of the target depth map.

For the above reason, the present disclosure can determine the pose information corresponding to the target depth map, and then determine, based on the pose information, the target environment image corresponding to the target depth map. Then, rendering and displaying are performed based on both the target environment image and the target depth image, to obtain a three-dimensional scene image.

It would be appreciated that the target environment image is a grayscale or color image, which is not limited here. The color image may be a RGB image, but is not limited to the latter.

Since the XR device records the pose information of the binocular camera at every moment, determining the pose information corresponding to the target depth map according to the present disclosure specifically includes determining the pose information of the binocular camera based on the target depth map, and then selecting a binocular environment image corresponding to the pose information of the binocular camera. Subsequently, the left eye environment image and/or the right eye environment image in the selected binocular environment image is selected as the target environment image.

The method for three-dimensional scene reconstruction provided by embodiments of the present disclosure includes determining an observation three-dimensional bounding box of the target object based on the binocular environment image collected by the binocular camera, in conjunction with the pose information corresponding to the binocular environment image, and further determining a final three-dimensional bounding box of the target object jointly based on the three-dimensional bounding box in the target map and the observation three-dimensional bounding box. In this way, the present disclosure can achieve the purpose of automatic calibration of indoor target objects, thus simplifying the calibration process of the target object while improving the efficiency of calibrating the target object.

From the above description, it can be learned that the present disclosure is intended to reduce computing power and power consumption required for real time three-dimensional reconstruction by performing the three-dimensional scene reconstruction based on the binocular environment image collected by the binocular camera and the room map.

On the basis of the embodiments, with reference to FIG. 11, further description will be made on determining the target depth map based on the first depth map and the second depth map.

Figure 11:
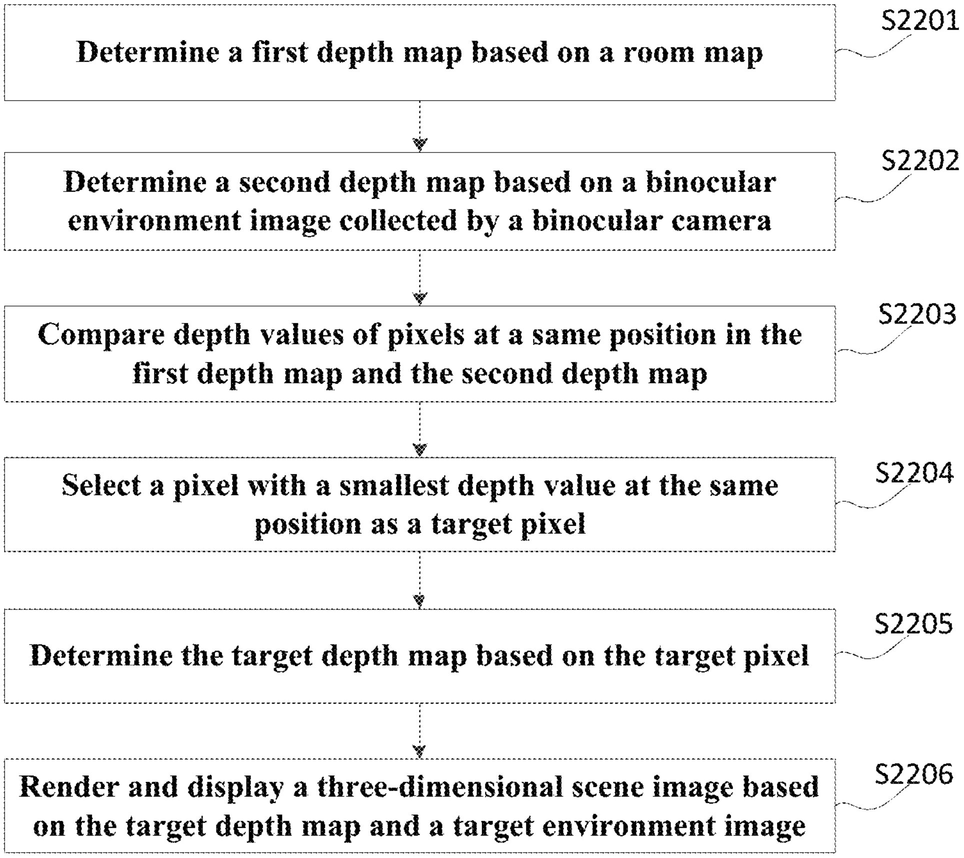
FIG. 11 illustrates a schematic flowchart of a further method for three-dimensional scene reconstruction provided by embodiments of the present disclosure.

As shown in FIG. 11, the method includes the steps of:

S2201, determining a first depth map based on a room map;

S2202, determining a second depth map based on a binocular environment image collected by a binocular camera;

S2203, comparing depth values of pixels at a same position in the first depth map and the second depth map;

S2204, selecting a pixel with a smallest depth value at the same position as a target pixel; and S2205, determining the target depth map based on the target pixel.

Considering that the small depth value of the pixel may occlude the large depth value of the pixel at the same position in the first depth map and the second depth map, the XR device according to the present disclosure determines a depth closer to the human eye (a pixel having a smaller depth) by comparing the depths in the first depth map and the second depth map pixel by pixel, and obtains the target depth map based on the selected depth closer to the human eye.

In some implementations, the present disclosure can be implemented through the following equation (7):

$$D_f = \min(D_l, D_v) \tag{7}$$

Wherein, $D_f$ is the target depth map, min is the minimum value, $D_l$ is the first depth map, and $D_v$ is the second depth map.

In other words, the minimum depth at each position is selected from the first depth map and the second depth map, and the target depth map is then formed based on the target pixels corresponding to the minimum depths, to thus complete fusion of the first depth map and the second depth map.

In addition, considering that the second depth map obtained based on the binocular environment image is smoother than the first depth map obtained based on the room map, the target depth map obtained by fusing the first depth map and the second depth map may have ruptures, for example, serrated ruptures or other noise, resulting in a great distortion of the meshes on the target depth map.

Therefore, after obtaining the target depth map, the present disclosure optionally includes smoothing the target depth map to filter out noise and remove sharp edges, and obtaining the final target depth map. Further, the three-dimensional scene image is rendered and displayed based on the final target depth map and the target environment image.

In the embodiments of the present disclosure, the target depth map is smoothed. Optionally, smoothing such as Gaussian smoothing and the like is performed on the target image, which is not specifically limited here.

S2206, rendering and displaying the three-dimensional scene image based on the target depth map and the target environment image.

The target environment image is determined based on the pose information corresponding to the target depth map.

Figure 12:
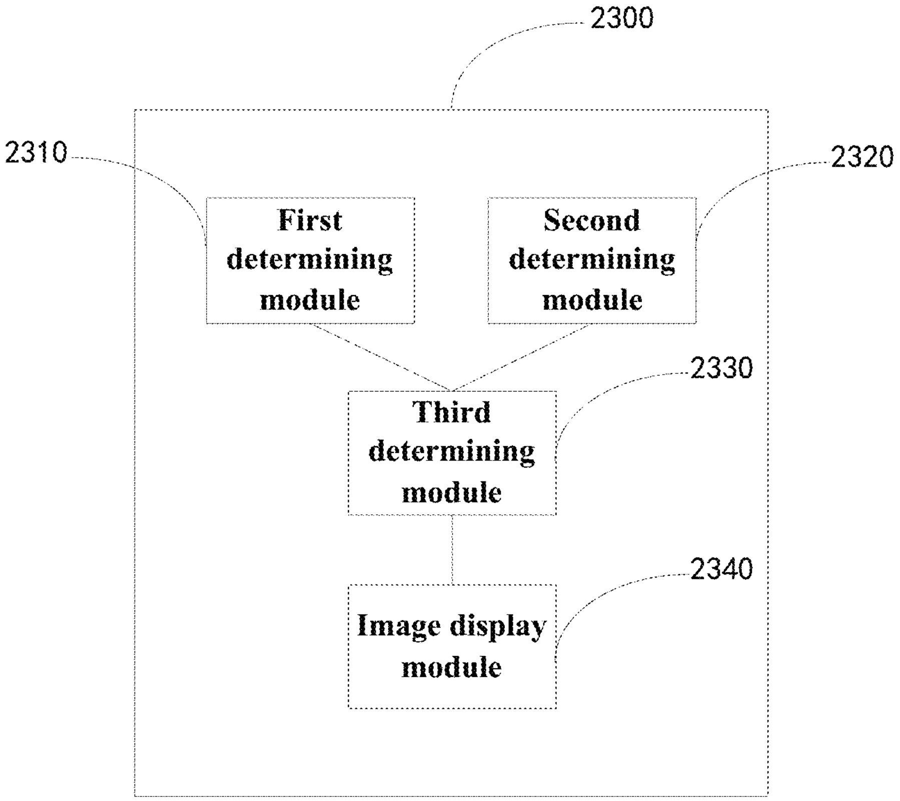
FIG. 12 illustrates a schematic block diagram of an apparatus for three-dimensional scene reconstruction provided by embodiments of the present disclosure.

The method for three-dimensional scene reconstruction provided by embodiments of the present disclosure includes: determining an observation three-dimensional bounding box of the target object based on the binocular environment image collected by the binocular camera, in conjunction with the pose information corresponding to the binocular environment image, and then determining a final three-dimensional bounding box of the target object based on the three-dimensional bounding box in the target map and the observation three-dimensional bounding box. In this way, the present disclosure can achieve the purpose of automatic calibration of indoor target objects, thus simplifying the calibration process of the target object while improving the efficiency of calibrating the target object. Moreover, by smoothing the obtained target depth map to remove the noise and sharp edges from the target depth map, the three-dimensional scene image rendered and displayed based on the smoothed target depth map and the target environment image has a smooth gradient, to thus improve the image quality Reference now will be made to FIG. 12 to describe an apparatus for three-dimensional scene reconstruction provided by embodiments of the present disclosure. FIG. 12 illustrates a schematic block diagram of an apparatus for three-dimensional scene reconstruction provided by embodiments of the present disclosure.

As shown therein, the apparatus 2300 for three-dimensional scene reconstruction includes: a first determining module 2310, a second determining module 2320, a third determining module 2330 and an image display module 2340.

Specifically, the first determining module 2310 is configured to determine a first depth map based on a room map; the second determining module 2320 is configured to determine a second depth map based on a binocular environment image collected by a binocular camera;

the third determining module 2330 is configured to determine a target depth map based on the first depth map and the second depth map; and the image display module 2340 is configured to render and display a three-dimensional scene image based on the target depth map and a target environment image; wherein the target environment image is determined based on pose information corresponding to the target depth map.

In an alternative implementation of the embodiments of the present disclosure, if the room map is a triangular mesh model, the first determining module 2310 is specifically configured to: rasterize the triangular mesh model based on pose information of the binocular camera and obtain the first depth map.

In an alternative implementation of the embodiments of the present disclosure, if the room map is not a triangular mesh model, the apparatus 2300 further includes: a conversion module for converting the room map into a triangular mesh model.

In an alternative implementation of the embodiments of the present disclosure, the second determining module 2320 is specifically configured to: obtain a disparity map based on the binocular environment image; and determine the second depth map based on the disparity map.

In an alternative implementation of the embodiments of the present disclosure, the apparatus 2300 further includes: a projection module for projecting the second depth map to a human eye coordinate system.

In an alternative implementation of the embodiments of the present disclosure, the third determining module 2330 is specifically configured to: compare depth values of pixels at a same position in the first depth map and the second depth map; select a pixel with a smallest depth value at the same position as a target pixel; and determine the target depth map based on the target pixel In an alternative implementation of the embodiments of the present disclosure, the apparatus 2300 further includes: an image smoothing module for smoothing the target depth map.

The apparatus for three-dimensional scene reconstruction provided by embodiments of the present disclosure is configured to: determine the target depth map based on the first depth map determined based on the room map, and the second depth map determined based on the binocular environment image collected by the binocular camera; and render and display the three-dimensional scene image based on the target depth map, and the target environment image determined based on the pose information corresponding to the target depth map. The present disclosure can obtain a high-precision three-dimensional scene image by fusing the environment image collected by the binocular camera and the room map, to thus achieve high-precision real time three-dimensional reconstruction, while reducing the computing power and power consumption required during three-dimensional reconstruction.

It would be appreciated that the apparatus embodiment corresponds to the method embodiment as mentioned above, and reference may be made to the method embodiment for similar description. Details thereof are omitted here for brevity. Specifically, the apparatus 2300 as shown in FIG. 12 can implement the method embodiment corresponding to FIG. 7, the above and other operations, as well as functions, of the respective modules in the apparatus 2300 are performed to implement the corresponding process of the respective methods in FIG. 7. Details thereof are omitted here for brevity.

With reference to the drawings, the apparatus 2300 according to embodiments of the present disclosure have been described above from the perspective of functional modules. It is to be understood that the functional modules may be implemented in the form of hardware, or may be implemented by instructions in the form of software, or may be implemented by a combination of hardware and software modules. Specifically, the respective steps according to the first aspect of the method embodiments of the present disclosure can be directly completed by an integrated logic circuit of hardware and/or instructions in the form of software in the processor. For example, the steps of the first aspect of the method according to the embodiments of the present disclosure can be directly implemented by a hardware decoding processor, or by a combination of hardware and software modules in a decoding processor. Alternatively, software modules may be located in a well-developed storage medium in the art, for example, a Random Access Memory, a flash memory, a Read-Only memory, a Programmable Read-Only Memory, an Electrically Erasable Programmable Memory, a register, or the like. The storage medium may be arranged in a memory, and the processor can read information in the memory and implement, in conjunction with hardware thereof, the steps in the first aspect of the method embodiments.

Figure 13:
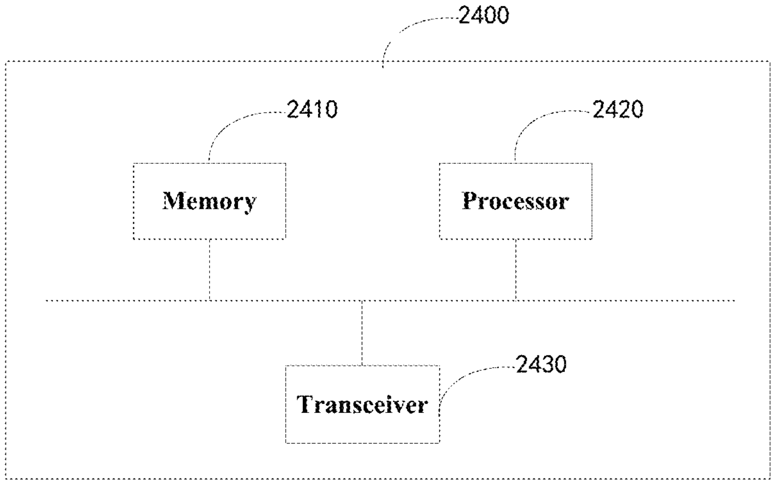
FIG. 13 illustrates a schematic block diagram of an electronic device provided by embodiments of the present disclosure.

FIG. 13 illustrates a schematic block diagram of an electronic device provided by embodiments of the present disclosure. As shown therein, the electronic device 2400 may include: a memory 2410 and a processor 2420, where the memory 2410 is configured to store a computer program and transmit the same to the processor 2420. In other words, the processor 2420 can call, from the memory 2410, and run the computer program to implement the method for three-dimensional scene reconstruction according to embodiments of the present disclosure.

For example, the processor 2420 is configured to implement the three-dimensional scene reconstruction method embodiments based on instructions in the computer program.

In some embodiments of the present disclosure, the processor 2420 may include, but is not limited to: a general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, or the like.

In some embodiments of the present disclosure, the memory 2410 includes, but is not limited to: a volatile memory and/or a non-volatile memory. The non-volatile memory may be a Read-Only Memory (ROM), a Programmable ROM (PROM), an Erasable PROM (EPROM), an Electrically EPROM (EEPROM), or a flash. The volatile memory may be a Random Access Memory (RAM), which serves as an external cache. By way of example, without limitation, more forms of RAMs can be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a synch link DRAM (SLDRAM), and a Direct Rambus RAM (DR RAM).

In some embodiments of the present disclosure, the computer program can be partitioned into one or more modules, where the one or more modules are stored in the memory 2410 and executed by the processor 2420, to implement the method for three-dimensional scene reconstruction provided by the present disclosure. The one or more modules may be a series of computer program instruction snippets configured to complete specific function(s) and used to describe the execution process of the computer program in the electronic device.

As shown in FIG. 13, the electronic device 2400 may further include: a transceiver 2430 that can be connected to the processor 2420 or memory 2410.

The processor 2420 can control the transceiver 2430 to communicate with a further device, specifically to send information or data to the further device, or receive information or data from the further device. The transceiver 2430 may include a transmitter and a receiver. The transceiver 2430 may further include one or more antennas.

It would be appreciated that the respective components in the electronic device are connected via a bus system, where the bus system includes a power supply bus, a control bus and a status signal bus, in addition to the data bus.

Figure 14:
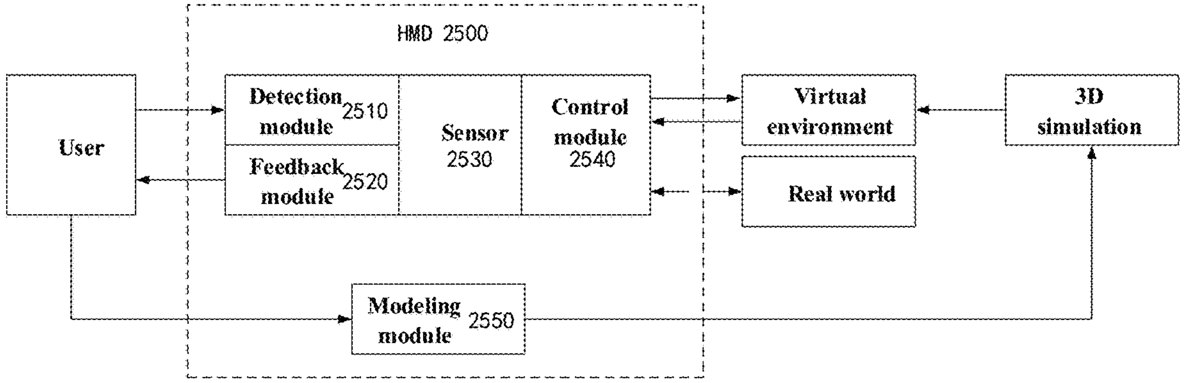
FIG. 14 illustrates a schematic block diagram of using an HMD as an electronic device provided by embodiments of the present disclosure.

When the electronic device is a Head Mount XR device (HMD), a schematic block diagram of the HMD provided by the embodiments of the present disclosure is shown in FIG. 14.

As shown therein, the main functional modules of the HMD 2500 may include, but are not limited to: a detection module 2510, a feedback module 2520, a sensor 2530, a control module 2540, and a modeling module 2550.

Specifically, the detection module 2510 is configured to detect an operation command from a user using various sensors and apply it to a virtual environment, for example, tracking the user's sight and updating the image displayed on the display to implement interaction between the user and the virtual scene.

The feedback module 2520 is configured to receive data from sensors and provide real time feedback to the user. For example, the feedback module 2520 can generate a feedback instruction based on the user operation data and output the feedback instruction.

The sensor 2530 is configured to receive an operation command from the user and apply it to the virtual environment on one hand, and configured to provide a result of the operation in various feedback forms to the user on the other hand.

The control module 2540 is configured to control the sensor and various input/output devices, including acquiring data of the user, for example, actions, voice and the like, and output perception data, for example, images, vibrations, temperature, sounds, and the like, to impact the user, the virtual environment and the real world. For example, the control module 2540 can acquire user gestures, voice and the like.

The modeling module 2550 is configured to construct a three-dimensional model of the virtual environment, and may include various feedback mechanisms, such as sound, tactile feeling, and the like.

It would be appreciated that the respective functional modules in the HMID 2500 can be connected via the bus system, where the bus system includes a power supply bus, a control bus and a status signal bus, in addition to the data bus.

The present disclosure further provides a computer storage medium having a computer program stored thereon, where the computer program, when executed by a computer, causes the computer to implement the method according to the above method embodiments.

The embodiments of the present disclosure also provide a computer program product comprising program instructions, where the program instructions, when running on an electronic device, cause the electronic device to implement the method according to the above method embodiments.

When implemented using software, it may be implemented entirely or partly in the form of a computer program product. The computer program product includes one or more computer instructions. When the computer program instructions are loaded and executed on the computer, the procedures or functions according to the embodiments of the present disclosure can be implemented fully or partly. The computer may be a general-purpose computer, a special-purpose computer, a computer network, or other programmable device. The computer instructions can be stored on a computer-readable storage medium, or can be transmitted from one computer-readable storage medium to a further one, for example, from one website, computer, server, or data center to a further website, computer, server, or data center in a wired (e.g. a coaxial cable, optical fiber, Digital Subscriber Line (DSL)) or wireless (e.g. infrared, radio, microwave and the like) manner.

The computer-readable storage medium may be any available medium that can be accessed by a computer, or can include one or more data storage devices, such as a server, a data center and the like, that can be integrated with the medium. The available medium may be a magnetic medium (e.g. a floppy disk, hard disk, magnetic tape), an optical medium (e.g. a digital video disc (DVD)), or a semiconductor medium (e.g. a Solid State Disk (SSD)), among others.

The ordinary skilled in the art would realize that the respective example modules and algorithm steps described in connection with the embodiments disclosed here can be implemented as electronic hardware, or a combination of computer software and electronic hardware. Whether those functions can be implemented by hardware or software depend on the particular application and design constraints of the technical solution. The skilled artisans can use different methods for each specific application to implement the functions described here, which should not be construed as going beyond of the scope of the present disclosure.

In some embodiments provided by the present disclosure, it is to be understood that the system, the apparatus and the method disclosed here may be implemented in other forms. For example, the apparatus embodiments describe above are provided only for illustration. For example, the division of modules is only a logical functional division, which may be implemented in other division form in practice. For example, a plurality of modules or components may be combined or integrated in a further system, or some features may be omitted, or not executed. In addition, the mutual coupling, direct coupling or communication connection, as displayed or discussed here, may be implemented via some interfaces, and indirect coupling or communication connection between devices or modules may be in an electrical, mechanical or other form.

The modules described as separate parts may or may not be physically separated, and components displayed as modules may or may not be physical modules, i.e., they may be located in the same area, or may be distributed over a plurality of network units. Some or all of the modules are selected therefrom as actually required to fulfil the objective of the solution according to the embodiments. For example, the respective function modules in the embodiments of the present disclosure may be integrated into one processing module, or each module may physically exist alone, or two or more modules may be integrated in one module.

The above description is only made on the specific implementations of the present disclosure, but the scope of the present disclosure is not limited thereto. Any one skilled in the art could easily conceive of changes or substitutions within the technical scope disclosed here, all of which should be covered in the scope of the present disclosure. Therefore, the protection scope of the present disclosure should be subject to the one defined by the appended claims.

Example implementations, provided as below, can achieve high-precision real time three-dimensional reconstruction while reducing computing power and power consumption required during three-dimensional reconstruction.

Implementation 1: A method for three-dimensional scene reconstruction, comprising: determining a first depth map based on a room map; determining a second depth map based on a binocular environment image collected by a binocular camera; determining a target depth map based on the first depth map and the second depth map; and rendering and displaying a three-dimensional scene image based on the target depth map and a target environment image; wherein the target environment image is determined based on pose information corresponding to the target depth map.

Implementation 2: The method of implementation 1, wherein, in case that the room map is a triangular mesh model, determining the first depth map based on the room map comprises: rasterizing the triangular mesh model based on pose information of the binocular camera and obtaining the first depth map.

Implementation 3: The method of implementation 1, in case that the room map is not a triangular mesh model, the method further comprising, prior to determining the first depth map based on the room map: converting the room map to a triangular mesh model.

Implementation 4. The method of implementation 1, wherein determining the second depth map based on the binocular environment image collected by the binocular camera comprises: obtaining a disparity map based on the binocular environment image; and determining the second depth map based on the disparity map.

Implementation 5. The method of implementation 4, after determining the second depth map, further comprising: projecting the second depth map to a human eye coordinate system.

Implementation 6. The method of implementation 4, wherein determining the target depth map based on the first depth map and the second depth map comprises: comparing depth values of pixels at a same position in the first depth map and the second depth map; selecting a pixel with a smallest depth value at the same position as a target pixel; an determining the target depth map based on the target pixel.

Implementation 7. The method of any one of implementations 1-6, after determining the target depth map, further comprising: smoothing the target depth map.

Implementation 8. An apparatus for three-dimensional scene reconstruction, comprising: a first determining module for determining a first depth map based on a room map; a second determining module for determining a second depth map based on a binocular environment image collected by a binocular camera; a third determining module for determining a target depth map based on the first depth map and the second depth map; and an image display module for rendering and displaying a three-dimensional scene image based on the target depth map and a target environment image; wherein the target environment image is determined based on pose information corresponding to the target depth map.

Implementation 9. An electronic device, comprising: a processor and a memory for storing a computer program, wherein the processor is configured to execute the computer program stored in the memory to implement the method for three-dimensional scene reconstruction of any one of implementations 1-7.

Implementation 10. A computer readable storage medium for storing a computer program which causes a computer to implement the method for three-dimensional scene reconstruction of any one of implementations 1-7.

Implementation 11. A computer program product comprising program instructions, wherein the program instructions, when running on an electronic device, cause the electronic device to implement the method for three-dimensional scene reconstruction of any one of implementations 1-7.

Method and Device for Calibration in Mixed Reality Space, Electronic Device, Medium, and Product Examples of the present disclosure further relate to the technical field of mixed reality (MR), and in particular to a method and device for calibration in an MR space, an electronic device, a medium, and a product.

"Mixed reality (MR)" is further developed based on a virtual reality (VR) technology, which introduces real scene information into a virtual environment to build an interactive feedback information loop between virtual world, real world, and a user, so as to enhance realism of user experience.

Calibration of a plane in a virtual house using the MR technology refers to calibrating a wall, a floor, a ceiling, etc.

in the virtual house by means of the virtual house, so as to provide the user with immersive experience by means of a holographic image, achieve mobile preview of a virtual building, and guide installation.

At present, the prior art provides the solution for calibrating the virtual house using a handle based on an MR device. However, the existing method does not achieve automatic calibration, but requires the user to manually perform time-consuming and complicated calibration operations using the handle, which not only is unable to ensure the accuracy of a manual calibration result, but also is not conducive to user experience of the user.

A method and device for calibration in a mixed reality (MR) space, an electronic device, a medium, and a product are provided in examples of the present disclosure. In this way, any plane in an MR space is automatically calibrated, thereby avoiding the problem that a user needs to manually perform time-consuming and tedious calibration operations using a handle.

In a first aspect, a method for calibration in an MR space is provided in an example of the present disclosure. The method includes: obtaining a binocular visual image acquired by an MR device, where the binocular visual image includes a left-eye visual image and a right-eye visual image; determining a first straight line based on the left-eye visual image and the right-eye visual image, where the first straight line is used to calibrate any plane in the MR space; and determining any plane calibrated by a predetermined second straight line in the MR space as a calibration result of the first straight line in case that the first straight line and the second straight line have a matching relationship of feature descriptions.

In a second aspect, a device for calibration in an MR space is provided in an example of the present disclosure. The device includes: an obtaining unit configured to obtain a binocular visual image acquired by an MR device, where the binocular visual image includes a left-eye visual image and a right-eye visual image; a determination unit configured to determine a first straight line based on the left-eye visual image and the right-eye visual image, where the first straight line is used to calibrate any plane in the MR space; and a calibration unit configured to determine any plane calibrated by a predetermined second straight line in the MR space as a calibration result of the first straight line in case that the first straight line and the second straight line have a matching relationship of feature descriptions.

In a third aspect, an electronic device is provided in an example of the present disclosure. The electronic device includes: a processor and a memory, where the memory stores a computer-executable instruction; and the processor executes the computer-executable instruction stored in the memory to cause the at least one processor to perform the method for calibration in an MR space of the first aspect and various possible designs of the first aspect.

In a fourth aspect, a computer-readable storage medium is provided in an example of the present disclosure. The computer-readable storage medium stores a computer-executable instruction, where a processor implements, when executing the computer-executable instruction, the method for calibration in an MR space of the first aspect and various possible designs of the first aspect.

In a fifth aspect, a computer program product is provided in an example of the present disclosure. The computer program product includes a computer program, where the computer program implements, when executed by a processor, the method for calibration in an MR space of the first aspect and various possible designs of the first aspect.

According to the method and device for calibration in an MR space, the electronic device, the medium, and the product provided in the examples, in the method, the binocular visual image acquired by the MR device is obtained, where the binocular visual image includes the left-eye visual image and the right-eye visual image; then, the first straight line can be determined based on the left-eye visual image and the right-eye visual image, so as to calibrate any plane in the MR space using the first straight line; and any plane calibrated by the predetermined second straight line in the MR space is determined as the calibration result of the first straight line in case that the first straight line and the second straight line have the matching relationship of feature descriptions.

According to the examples of the present disclosure, the technical effect of automatically calibrating any plane in the MR space can be achieved using the MR device, thereby avoiding the problem that a user needs to manually perform time-consuming and complicated calibration operations using a handle, and not only ensuring accuracy of the calibration result, but also improving use experience of a user.

In order to make the objectives, technical solutions and advantages of the examples of the present disclosure more clear, the technical solutions in the examples of the present disclosure will be clearly and completely described below in combination with the accompanying drawings in the examples of the present disclosure, and obviously, the described examples are some examples rather than all example of the present disclosure. On the basis of the examples of the present disclosure, all other examples obtained by those of ordinary skill in the art without making creative efforts fall within the scope of protection of the present disclosure.

In a mixed reality (MR) application scene, a real physical space becomes an interactive object by means of an MR technology to allow a user to customize, according to a plurality of room layouts of the user, an application of a game theme space using an MR device, thereby allowing the user to play some mini games or stroll in virtual world matching a space layout.

However, the existing method requires a user to manually perform time-consuming and complicated calibration operations using a handle, which not only is unable to ensure accuracy of a calibration result, but also consumes a long time for manual calibration, and is not conducive to use experience of the user. Therefore, inventors of an example of the present disclosure provide a method for calibration in an MR space, which achieves automatic calibration, so as to improve accuracy of a calibration result and save processing time consumed by calibration.

Figure 15:
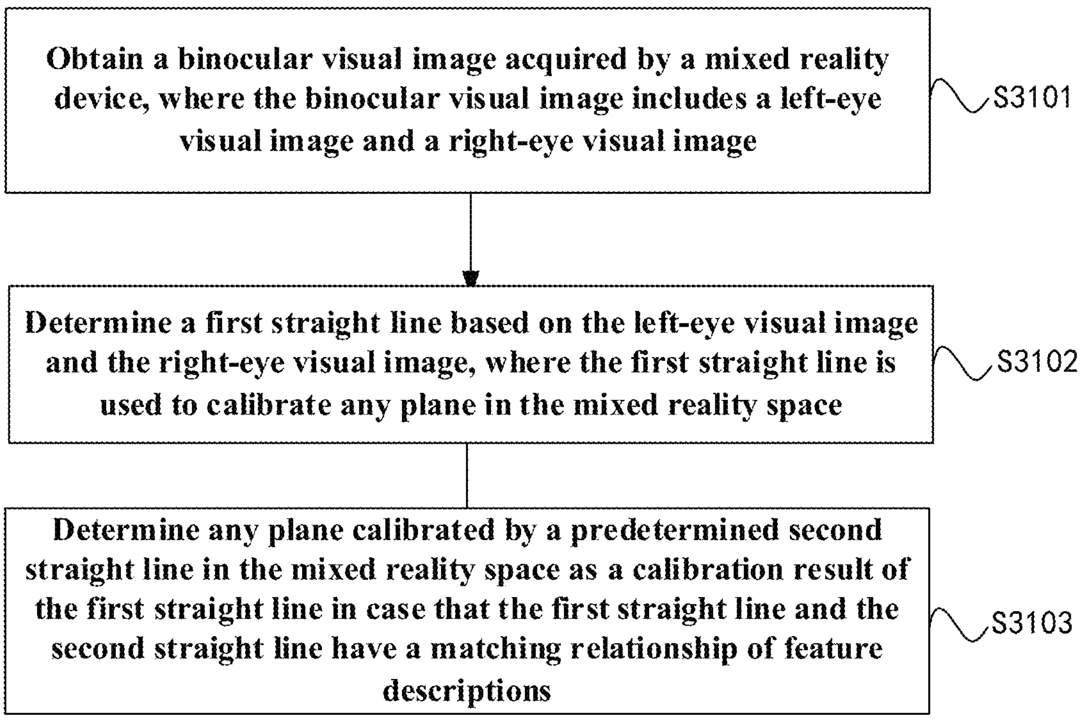
FIG. 15 is a schematic flow diagram of a method for calibration in a mixed reality space according to an example of the present disclosure.

With reference to FIG. 15, FIG. 15 is a schematic flow diagram of a method for calibration in an MR space according to an example of the present disclosure. The method for calibration in an MR space according to the example can be applied to a terminal device or a server, and includes:

- S3101, obtain a binocular visual image acquired by an MR device, where the binocular visual image includes a left-eye visual image and a right-eye visual image;
- S3102, determine a first straight line based on the left-eye visual image and the right-eye visual image, where the first straight line is used to calibrate any plane in the MR space; and
- S3103, determine any plane calibrated by a predetermined second straight line in the MR space as a calibration result of the first straight line in case that the first straight line and the second straight line have a matching relationship of feature descriptions.

According to the method for calibration in an MR space provided according to the example, the binocular visual image acquired by the MR device is obtained, where the binocular visual image includes the left-eye visual image and the right-eye visual image; then, the first straight line can be determined based on the left-eye visual image and the right-eye visual image, so as to calibrate any plane in the MR space using the first straight line; and any plane calibrated by the predetermined second straight line in the MR space is determined as the calibration result of the first straight line in case that the first straight line and the second straight line have the matching relationship of feature descriptions.

The method for calibration in an MR space according to the example of the present disclosure can be applied to the MR device, so as to achieve the technical effect of automatically calibrating any plane in the MR space, thereby avoiding the problem that a user needs to manually perform time-consuming and tedious calibration operations using a handle, and not only ensuring accuracy of the calibration result, but also improving use experience of a user.

Optionally, the MR space may be an MR space displayed in front of eyes of a player after a real scene (for example, a room, a park, an amusement park, etc. in real world) and virtual scene information (for example, a treasure hunt scene, an exploration scene, a decoration scene, etc.) are interactively combined. For example, an MR room displayed to the user by means of a wearable head display device after the room in the real world and the exploration scene are interactively combined using the MR device. By presenting the virtual scene information in the real scene, an interactive feedback information loop is built between the real world, the virtual world and the user to enhance realism of user experience.

Alternatively, in an example of the present disclosure, the binocular visual image includes: a left-eye visual image corresponding to a left-eye camera of the wearable head display device of the MR device, and a right-eye visual image corresponding to a right-eye camera of the wearable head display device of the MR device.

As an alternative example, an application scene in which an MR device is configured to calibrate a plane in an MR space is taken as an example. If a second straight line is currently determined, and the second straight line is a straight line of any plane in the MR space calibrated, feature descriptions may be matched on the second straight line and the first straight line after a first straight line is determined based on a left-eye visual image and a right-eye visual image, so as to determine whether the second straight line and the first straight line have a matching relationship of feature descriptions.

In an example, according to an example of the present disclosure, a projection position of a determined second straight line matches a projection position of a first straight line. If straight line directions of the second straight line and the first straight line differ by less than 1 degree and there is an intersecting line segment between the second straight line and the first straight line, feature descriptions are matched on the second straight line and the first straight line. For example, a line sub-descriptor of the first straight line observed most recently matches a line sub-descriptor of the second straight line. If matching succeeds, it is deemed that the first straight line and the second straight line can be matched into the same straight line. That is, the first straight line and the predetermined second straight line have a matching relationship of the feature descriptions.

By means of the matching processing described above, if it is determined that the second straight line and the first straight line can be matched into the same straight line, any plane calibrated by the second straight line is used as the calibration result of the first straight line, and no repeated calibration operation is needed, thereby saving calibration processing time, automatically calibrating any plane in the MR space, and avoiding the problem that a user needs to manually perform time-consuming and complicated calibration operations using a handle.

In the example of the present disclosure, S3102 of determining a first straight line based on the left-eye visual image and the right-eye visual image may be implemented by the following method steps:

- S3201, obtain a position of an optical center of a first camera of the left-eye visual image and a position of an optical center of a second camera of the right-eye visual image;
- S3202, obtain a first line feature in the left-eye visual image and a second line feature in the right-eye visual image, where
- the first line feature and the second line feature have a corresponding relationship in position;
- S3203, construct a first plane on the basis of the position of the optical center of the first camera and the first line feature, and construct a second plane based on the position of the optical center of the second camera and the second line feature; and
- S3204, obtain the first straight line from intersection of the first plane and the second plane.

Figure 16:
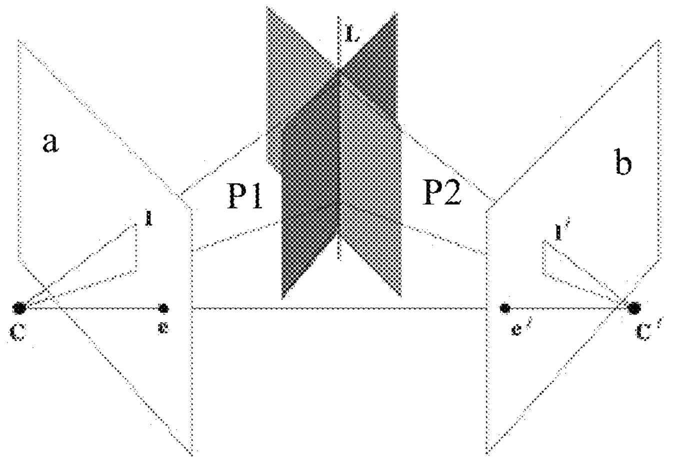
FIG. 16 is a schematic diagram of an alternative scene for determining a first straight line according to an example of the present disclosure.

FIG. 16 is a schematic diagram of determining a first straight line in an alternative method for calibration in an MR space according to an example of the present disclosure. As shown in FIG. 16, a first line feature l in a left-eye visual image a and a second line feature l' in a right-eye visual image b are acquired respectively, a connecting line between a position of an optical center of a first camera c and a position of an optical center of a second camera c' is a line segment cc', an intersection point of the line segment cc' and the left-eye visual image a is e, and an intersection point of the line segment cc' and the right-eye visual image b is e'.

It may be seen from FIG. 16 that the left-eye visual image a and the right-eye visual image b are images imaged symmetrical with respect to each other with respect to optical center positions (i.e. a position of an optical center of a first camera c and a position of an optical center of a second camera c') of two cameras of an MR device, and may further be understood as images imaged symmetrical with respect to each other with respect to a center position of the line segment cc' (or a line segment ee'). Therefore, there is also a corresponding relationship in position between the first line feature l in the left-eye visual image a and the second line feature l' in the right-eye visual image b, i.e. the optical centers of the two cameras relative to the MR device are symmetrical to each other.

Still, as shown in FIG. 16, a first plane P1 may be constructed based on the position of the optical center of the first camera c and the first line feature l of the left-eye visual image a, and a second plane P2 may be constructed based on the position of the optical center of the second camera c' and the second line feature l' of the right-eye visual image b.

It may be seen from FIG. 16 that a first straight line L may be obtained from intersection of the first plane P1 and the second plane P2. In the example of the present disclosure, the first straight line L is obtained from intersection of the first plane P1 and the second plane P2, so as to achieve the technical effect of automatically calibrating any plane in the MR space, thereby avoiding the problem that a user needs to manually perform time-consuming and complicated calibration operations using a handle, and ensuring accuracy of a calibration result.

In the example of the present disclosure, S3202 of obtaining a first line feature in the left-eye visual image and a second line feature in the right-eye visual image may be used by the following method steps:

S3301, extract, respectively, from the left-eye visual image and the right-eye visual image using a line segment detector (LSD) algorithm to obtain a first extraction result and a second extraction result; and

S3302, describe, respectively, the first extraction result and the second extraction result using a line band descriptor (LBD) to obtain the first line feature and the second line feature.

Figure 17:
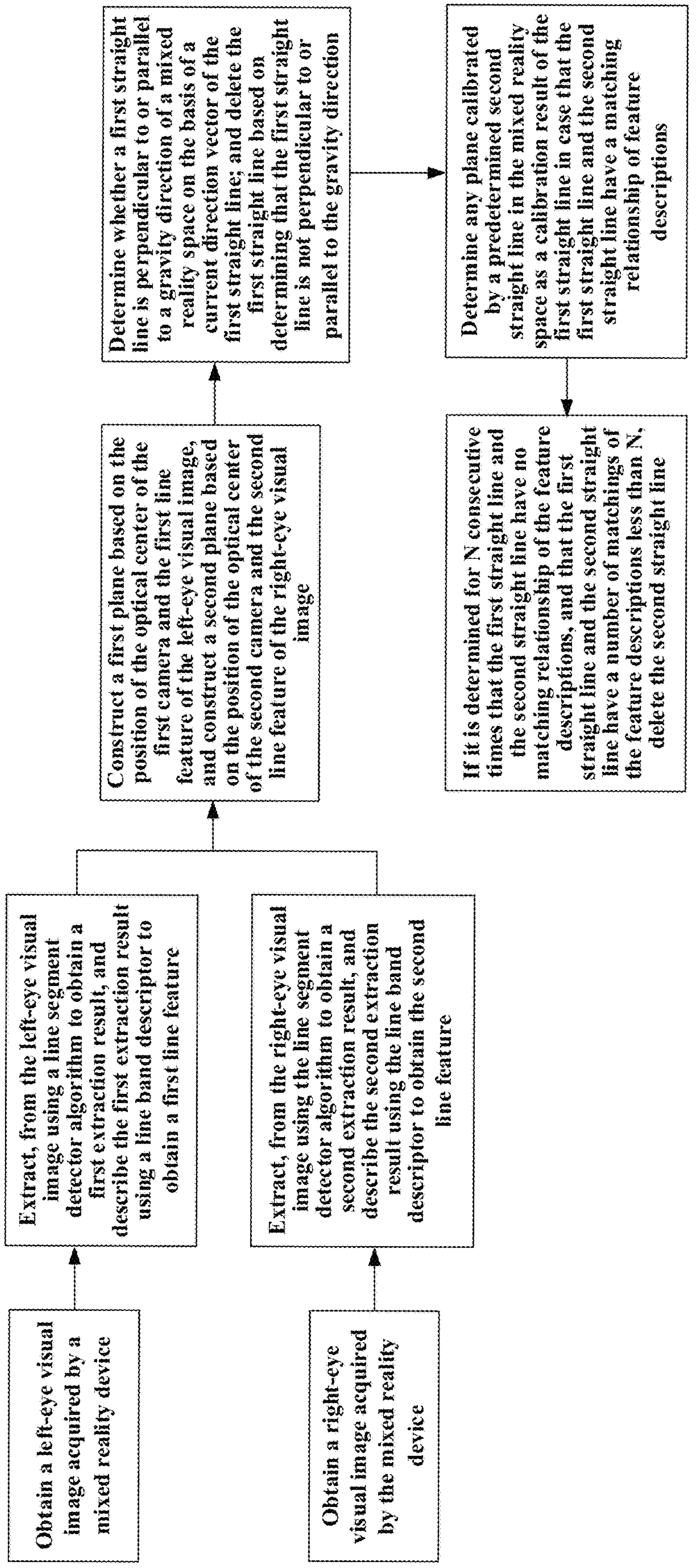
FIG. 17 is a schematic flow diagram of an alternative method for calibration in a mixed reality space according to an example of the present disclosure.

On the basis of the method example shown in FIG. 15, an alternative method example shown in FIG. 17 is further provided in an example of the present disclosure. As shown in FIG. 17, in the example of the present disclosure, line features are extracted respectively from a left-eye visual image and a right-eye visual image using an LSD algorithm. For example, line features are extracted respectively from the left-eye visual image and the right-eye visual image using a line feature extraction filter (or LSD) integrated with the LSD algorithm to obtain a first extraction result corresponding to the left-eye visual image, and a second extraction result corresponding to the right-eye visual image.

It should be noted that the LSD (LSD) algorithm is a line segment detection algorithm that obtains a detection result having sub-pixel accuracy in linear time, and may obtain a straight line detection result having high accuracy in a short time.

Moreover, in the example of the present invention, as shown in FIG. 17, the first extraction result and the second extraction result may be described respectively using an LBD to obtain a first line feature and a second line feature.

According to the descriptions described above, in the example of the present disclosure, line segments in the left-eye visual image and the right-eye visual image may be detected using the LSD, and the detected line segments are computed respectively to extract line features corresponding to the line segments respectively, and a triangular plane may be further constructed based on a corresponding position of an optical center of a camera.

It should be noted that in the step, a length threshold (e.g., 5 centimeters or 3 centimeters) may be preset to avoid collecting line segments in the left-eye visual image and the right-eye visual image whose length is less than the length threshold, thereby ensuring accuracy of a calibration result.

In an alternative example of the present disclosure, the method further includes, before the step of calibrating any plane in the MR space according to the first straight line from intersection of the first plane and the second plane:

S3401, obtain a current direction vector of the first straight line;

S3402, determine, based on the current direction vector of the first straight line, whether the first straight line is perpendicular to or parallel to a gravity direction of the MR space, where the gravity direction of the MR space is aligned with a z-axis in a pose coordinate system provided by a simultaneous localization and mapping (SLAM) algorithm; and

S3403, delete the first straight line based on determining that the first straight line is not perpendicular to or parallel to the gravity direction.

According to one or more examples of the present disclosure, S3401 of obtaining a current direction vector of the first straight line includes:

S3501, obtain a first normal vector of the first plane and a second normal vector of the second plane;

S3502, compute an initial direction vector of the first straight line based on the first normal vector and the second normal vector;

S3503, obtain a translation distance by translation movement of an initial position point on the first straight line along the initial direction vector to a target position point, where the target position point characterizes a coordinate position of an intermediate point of the first straight line projected to the first line feature; and

S3504, compute the current direction vector of the first straight line according to the initial position point, the translation distance and the initial direction vector.

Still, as shown in FIG. 16, the position of the optical center of the first camera c and the first line feature l form a triangular plane P1, the position of the optical center of the second camera c' and the first line feature l' form a triangular plane P2, and the first straight line L may be determined from intersection of the triangular plane P1 and the triangular plane P2.

In the example of the present disclosure, $\pi(P)=p$ indicates that position points on a three-dimensional triangular plane are projected onto the binocular visual image, $\overline{P}=\pi^{-1}(p)$ indicates that pixel points on the binocular visual image are projected onto a normalized plane (plane with z=1), coordinate points of the position of the optical center of the first camera and the position of the optical center of the second camera may be indicated as $P_C$ and $P_{C'}$ respectively, and orientations of an optical center of the first camera and an optical center of the second camera are indicated as $R_C$ and $R_{C'}$; and a starting point and an end point of the first line feature l are, $l_s$, $l_e$ respectively, and a starting point and an end point of the second line feature l' are $l'_s$, $l'_e$ respectively.

Thus, a first normal vector n of the triangular plane P1 and a second normal vector n' of the triangular plane P2 may be computed by the following formulas:

$$n = \left(R_C\pi^{-1}(l_s) \times R_C\pi^{-1}(l_e)\right) \cdot \text{normalize}();$$

$$n' = \left(R_{C'}\pi^{-1}(l'_s) \times R_{C'}\pi^{-1}(l'_e)\right) \cdot \text{normalize}();$$

So, an initial direction vector of the first straight line L may be indicated as: $t_L=n\times n'$, and an initial position point of the first straight line L is indicated as: $P_L$; and a maximum coordinate value of $P_L$ in three coordinate values xyz is selected, and the maximum coordinate value is set as 0 to solve an equation:

$$\begin{bmatrix} n^T \\ n'^T \end{bmatrix} \begin{pmatrix} P_{L_x} \\ P_{L_y} \\ P_{L_z} \end{pmatrix} = \begin{bmatrix} n^T P_C \\ n'^T P_{C'} \end{bmatrix};$$

After $P_L$ is obtained, $P_L$ translates along an initial direction vector $t_L$ until a position of $P_L$ is projected to an intermediate point (target position point) of a point under a camera at $l_s$, $l_e$. That is, the equation is solved to obtain a translation distance h:

$$\pi(R_C^T(P_L + ht_L - P_C)) = \frac{l_s + l_e}{2};$$

After $h$ is solved, $P_L = P_L + ht_{L1}$ is made.

The z-axis in the pose coordinate system provided by an SLAM algorithm is aligned with a gravity direction of the MR space such that the current direction vector $t_{L1}$ of the first straight line can be computed through the computation process described above, so as to determine whether the first straight line is perpendicular to or parallel to the gravity direction of the MR space based on the current direction vector $t_{L1}$, and further, the first straight line that is not perpendicular or parallel to the gravity direction can be deleted.

In this way, accuracy of a calibration result can be improved, thereby preventing some straight lines that are not perpendicular to or parallel to the gravity direction from interfering with a calibration process.

In an example of the present disclosure, the method further includes:

S3601, delete the second straight line based on determining for N consecutive times that the first straight line and the second straight line have no matching relationship of the feature descriptions and that the first straight line and the second straight line have a number of matchings of the feature descriptions less than N.

Alternatively, N described above may be selected according to individual requirements. For example, 3 may be selected as N. The second straight line is deleted in case that a second straight line and a subsequent first straight line may not be matched into the same straight line for 3 consecutive times, and a number of matchings of the second straight line and the subsequent first straight line are less than 3. Similarly, 2 or 5 may further be selected as N to avoid retaining a second straight line that is unable to be used for calibration, or that is of little significance for calibration.

In an alternative example of the present disclosure, the method further includes:

S3701, obtain a first value of an inner product of the current direction vector of the first straight line and a third normal vector of a third plane in case that the first straight line is unable to calibrate any plane in the MR space, where the third plane is a virtual plane currently calibrated;

S3702, compute a distance from any position point on the first straight line to the third plane in case that the first value of inner product is within a predetermined range of the inner product; and

S3703, determine that the first straight line is on the third plane in case that the distance from any position point on the first straight line to the third plane is less than a predetermined distance.

In the example of the present invention, if the first straight line is unable to calibrate any plane in the MR space, that is, it is indicated that the first straight line is further unable to calibrate any plane in the MR space, a third plane currently calibrated may be randomly found, or a virtual plane pre-calibrated and having the highest priority may be found as the third plane. Then, a first value of inner product of the current direction vector of the first straight line and the third normal vector of the third plane is computed, and whether the first value of the inner product is within a predetermined range of the inner product (e.g., cos 89°). For example, if the first value of the inner product is within the predetermined range of the inner product, a distance from any position point on the first straight line to the third plane may be computed to determine whether the first straight line is on the third plane.

Specifically, in the example of the present disclosure, if the distance from any position point on the first straight line to the third plane is less than a predetermined distance (e.g., 5 cm), it is determined that the first straight line is on the third plane.

Moreover, according to an alternative example of the present disclosure, a plurality of straight lines that are unable to calibrate any plane may further be combined into pairs to obtain a plurality of fourth planes; then fourth normal vectors respectively corresponding to the plurality of fourth planes are determined to obtain a second value of inner product of a current direction vector of a first straight line and each of the fourth normal vectors; a distance from any position point on a first straight line to the fourth plane is computed in case that the second value of the inner product is within a predetermined range of the inner product; and it is determined that the first straight line is on the fourth plane in case that the distance from any position point on the first straight line to the fourth plane is less than a predetermined distance.

It can be seen from the descriptions described above that according to the example of the present disclosure, any plane in the MR space can be automatically calibrated, thereby avoiding the problem that a user needs to manually perform time-consuming and complicated calibration operations using a handle.

Figure 18:
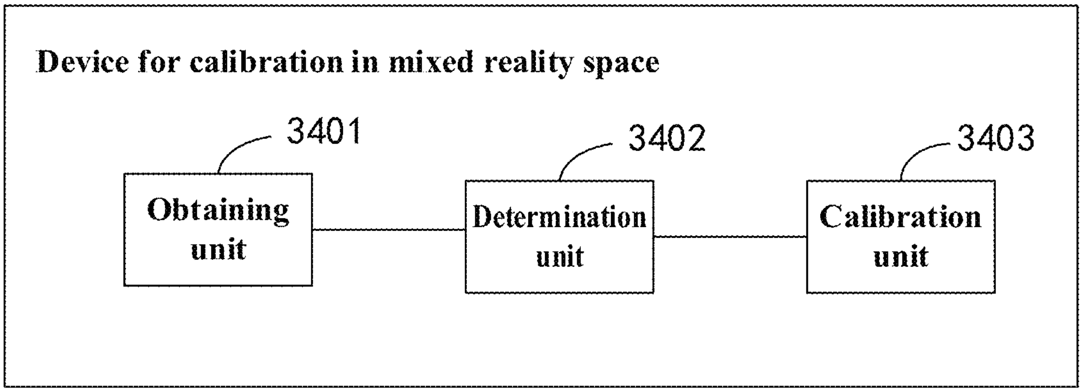
FIG. 18 is a structural block diagram of a device for calibration in a mixed reality space according to an example of the present disclosure.

Corresponding to the method for calibration in an MR space of the example described above, FIG. 18 is a structural block diagram of a device for calibration in an MS space according to an example of the present disclosure. For ease of illustration, only portions relevant to the example of the present disclosure are shown. With reference to FIG. 18, a device for calibration in an MR space includes: an obtaining unit 3401, a determination unit 3402, and a calibration unit 3403.

The obtaining unit 3401 is configured to obtain a binocular visual image acquired by a mixed reality device, where the binocular visual image includes a left-eye visual image and a right-eye visual image;

the determination unit 3402 is configured to determine a first straight line based on the left-eye visual image and the right-eye visual image, where the first straight line is used to calibrate any plane in the mixed reality space; and the calibration unit 3403 is configured to determine any plane calibrated by a predetermined second straight line in the mixed reality space as a calibration result of the first straight line in case that the first straight line and the second straight line have a matching relationship of feature descriptions.

In an example of the present disclosure, the determination unit 3402 specifically includes:

a first obtaining sub-unit configured to obtain a position of an optical center of a first camera of the left-eye visual image and a position of an optical center of a second camera of the right-eye visual image;

a second obtaining sub-unit configured to obtain a first line feature in the left-eye visual image and a second line feature in the right-eye visual image, where the first line feature and the second line feature have a corresponding relationship in position;

a construction sub-unit configured to construct a first plane on the basis of the position of the optical center of the first camera and the first line feature, and construct a second plane based on the position of the optical center of the second camera and the second line feature; and a third obtaining sub-unit configured to obtain the first straight line from intersection of the first plane and the second plane.

In an example of the present disclosure, the second obtaining sub-unit is specifically configured to: extract, respectively, from the left-eye visual image and the right-eye visual image using an LSD algorithm to obtain a first extraction result and a second extraction result; and describe, respectively, the first extraction result and the second extraction result using an LBD to obtain the first line feature and the second line feature.

In an example of the present disclosure, the device further includes:

a vector obtaining unit configured to obtain a current direction vector of the first straight line;

a direction determination unit configured to determine, based on the current direction vector of the first straight line, whether the first straight line is perpendicular to or parallel to a gravity direction of the mixed reality space; and a first deletion unit configured to delete the first straight line based on determining that the first straight line is not perpendicular to or parallel to the gravity direction.

In an example of the present disclosure, the vector obtaining unit is specifically configured to: obtain a first normal vector of the first plane and a second normal vector of the second plane; compute an initial direction vector of the first straight line based on the first normal vector and the second normal vector; obtain a translation distance by translation movement of an initial position point on the first straight line along the initial direction vector to a target position point, where the target position point characterizes a coordinate position of an intermediate point of the first straight line projected to the first line feature; and compute the current direction vector of the first straight line according to the initial position point, the translation distance and the initial direction vector.

In an example of the present disclosure, the device further includes:

a second deletion unit configured to delete the second straight line based on determining for N consecutive times that the first straight line and the second straight line have no matching relationship of the feature descriptions and that the first straight line and the second straight line have a number of matchings of the feature descriptions less than N.

In an example of the present disclosure, the device further includes:

a first computation unit configured to obtain a first value of an inner product of the current direction vector of the first straight line and a third normal vector of a third plane in case that the first straight line is unable to calibrate any plane in the mixed reality space, where the third plane is a virtual plane currently calibrated;

a second computation unit configured to compute a distance from any position point on the first straight line to the third plane in case that the first value of inner product is within a predetermined range of the inner product; and a first processing unit configured to determine that the first straight line is on the third plane in case that the distance from any position point on the first straight line to the third plane is less than a predetermined distance.

In an example of the present disclosure, the device further includes:

a combination unit configured to combine, into pairs, a plurality of straight lines that are unable to calibrate any plane to obtain a plurality of fourth planes;

a third computation unit configured to determine fourth normal vectors respectively corresponding to the plurality of fourth planes to obtain a second value of inner product of the current direction vector of the first straight line and each of the fourth normal vectors; and a second processing unit configured to compute a distance from any position point on the first straight line to the fourth plane in case that the second value of the inner product is within a predetermined range of the inner product; and determine that the first straight line is on the fourth plane in case that the distance from any position point on the first straight line to the fourth plane is less than a predetermined distance.

The device according to the example can be applied to the technical solution of executing the method example described above, and the implementation principle and the technical effect of the device are similar, which are not repeated herein in the example.

In order to implement the above examples, an electronic device is further provided in an example of the present disclosure.

Figure 19:
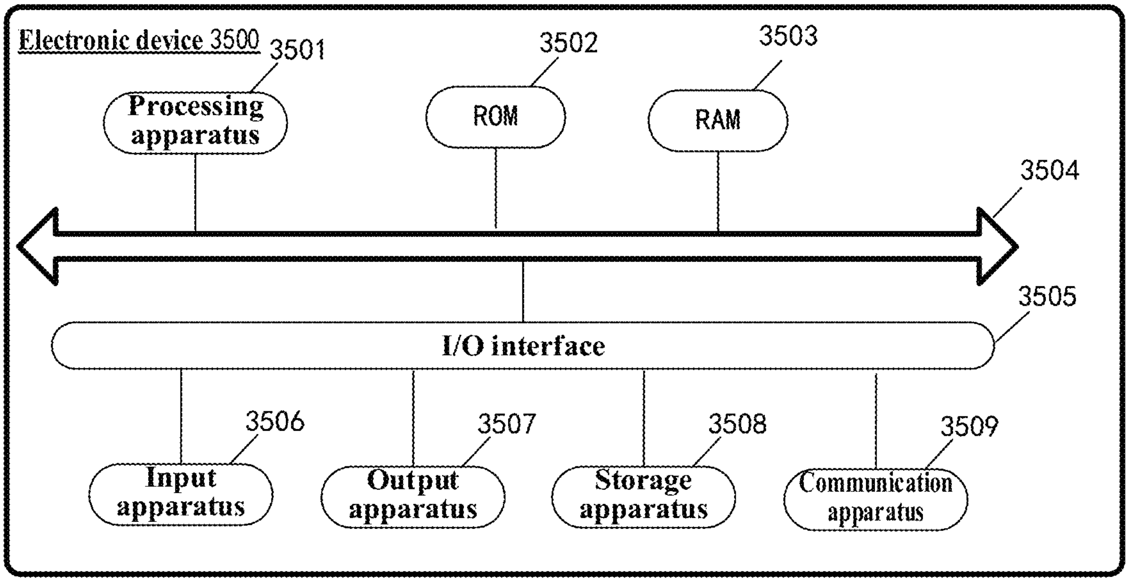
FIG. 19 is a schematic diagram of a hardware structure of an electronic device according to an example of the present disclosure.

With reference to FIG. 19 showing a schematic structural diagram of an electronic device 3500 suitable for implementing the examples of the present disclosure, the electronic device 3500 may be a terminal device or a server. The terminal device may include, but not limited to, a mobile terminal such as a mobile phone, a notebook computer, a digital broadcast receiver, a personal digital assistant (PDA), a portable android device (PAD), a portable media player (PMP), and a vehicle-mounted terminal (e.g., a vehicle-mounted navigation terminal), and a fixed terminal such as a digital television (TV), and a desktop computer. The electronic device shown in FIG. 19 is merely an example and should not bring any limitation to functions and the scope of use of the examples of the present disclosure.

As shown in FIG. 19, the electronic device 3500 may include a processing apparatus (such as a central processing unit and a graphics processing unit) 3501 that may perform various suitable actions and processes according to programs stored in a read only memory (ROM) 3502 or programs loaded from a storage apparatus 3508 into a random access memory (RAM) 3503.

Various programs and data required for the operation of the electronic device 3500 are further stored in the RAM 503. The processing apparatus 3501, the ROM 3502, and the RAM 3503 are connected to each other by means of a bus 3504. An input/output (I/O) interface 3505 is also connected to the bus 3504.

Usually, the following apparatuses may be connected to the I/O interface 3505: input apparatuses 3506 including a touch screen, a touchpad, a keyboard, a mouse, a camera, a microphone, an accelerometer and a gyroscope, for example; output apparatuses 3507 including a liquid crystal display (LCD), a speaker and a vibrator, for example;

storage apparatuses 3508 including a magnetic tape and a hard drive, for example; and a communication apparatus 3505. The communication apparatus 3505 may allow the electronic device 3500 to perform wireless or wired communication with other devices to exchange data. Although FIG. 19 illustrates the electronic device 3500 having various apparatuses, it should be understood that not all of the illustrated apparatuses are required to be implemented or provided. More or less apparatuses may be alternatively implemented or provided.

Specifically, according to the example of the present disclosure, the process described above with reference to the flow diagram may be implemented as a computer software program. For example, the example of the present disclosure includes a computer program product including a computer program carried on a computer-readable medium. The computer program includes program codes configured to perform the method illustrated in the flow diagram. In such an example, the computer program may be downloaded and installed from a network via the communication apparatus 3505, or installed from the storage apparatus 3508, or installed from the ROM 502. When the computer program is performed by the processing apparatus 3501, the functions described above defined in the method of the example of the present disclosure are executed.

It should be noted that the computer-readable medium of the present disclosure may be a computer-readable signal medium, a computer-readable storage medium, or any combination of the computer-readable signal medium and the computer-readable storage medium. The computer-readable storage medium may be, for example, but not limited to, systems, apparatuses or devices of electricity, magnetism, light, electromagnetism, infrared or semiconductors, or any combination of the above. More specific examples of the computer-readable storage medium may include, but not limited to: an electrically connected and portable computer disk having one or more wires, a hard drive, a RAM, a ROM, an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that includes or stores a program that may be used by an instruction execution system, apparatus, or device or in combination with the instruction execution system, apparatus, or device. In the present disclosure, the computer-readable signal medium may include data signals propagating in a baseband or as part of a carrier wave, which carry computer-readable program codes. The data signal propagating may take various forms, including, but not limited to, an electromagnetic signal, an optical signal, or any suitable combination of the above. The computer-readable signal medium may further be any computer-readable medium apart from the computer-readable storage medium, and the computer-readable signal medium may send, propagate, or transmit programs used by the instruction execution system, apparatus, or device or in combination with the instruction execution system, apparatus, or device. Program codes included on the computer-readable medium may be transmitted by using any suitable medium, including, but not limited to, wire, optical cable, radio frequency (RF), etc., or any suitable combination of the above.

The computer-readable medium described above may be included in the electronic device described above, or exist separately without being assembled into the electronic device.

The computer-readable medium described above carries one or more programs, which, when executed by the electronic device, cause the electronic device to perform the method shown in the example described above.

Computer program codes configured to perform operations of the present disclosure may be written in one or more programming languages or a combination of the programming languages. The programming languages described above include object-oriented programming languages such as Java, Smalltalk and C++, and further include conventional procedural programming languages such as "C" programming language or similar programming languages. The program codes may be executed entirely on a user computer, executed partially on the user computer, executed as a stand-alone software package, executed partially on the user computer and partially on a remote computer, or executed entirely on the remote computer or a server. Where the remote computer is involved, the remote computer may be connected to the user computer by means of any kind of network, including local area network (LAN) or wide area network (WAN), or may be connected to an external computer (for example, the remote computer is connected by means of the Internet by an Internet service provider).

Flow diagrams and block diagrams in the accompanying drawings illustrate system structures, functions and operations, which may be implemented according to systems, methods and computer program products in the various examples of the present disclosure. In this regard, each block in the flow diagrams or the block diagrams may represent a module, a program segment, or a part of a code, which may include one or more executable instructions configured to implement logical functions specified. It should also be noted that in some alternative implementations, functions noted in the blocks may also occur in sequences different from those in the accompanying drawings. For example, the functions represented by two continuous blocks may be actually implemented basically in parallel, sometimes implemented in reverse sequences, which depends on the involved functions. It should also be noted that each block in the block diagrams and/or the flow diagrams, and combinations of the blocks in the flow diagrams and/or the block diagrams, may be implemented by using dedicated hardware-based systems that implement the specified functions or operations, or may be implemented by using combinations of dedicated hardware and computer instructions.

The units described in the examples of the present disclosure may be implemented in software or hardware. The names of the units do not constitute limitations to the units themselves in some cases.

The functions described above herein may be at least partially executed by one or more hardware logic components. For example, non-restrictively, demonstration types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may include or store a program for use by the instruction execution system, apparatus, or device or in combination with the instruction execution system, apparatus, or device. The machine-readable medium may be a computer-readable signal medium or a computer-readable storage medium. The machine-readable medium may include, but not limited to, an electronic, magnetic, optical, electromagnetic, infrared, or semiconductor system, apparatus, or device, or any suitable combination of the above. More specific examples of the machine-readable storage medium may include an electrically connected and portable computer disk having one or more wires, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the above.

In a first aspect, according to one or more examples of the present disclosure, a method for calibration in an MR space is provided. The method includes: obtaining a binocular visual image acquired by a mixed reality device, where the binocular visual image includes a left-eye visual image and a right-eye visual image; determining a first straight line based on the left-eye visual image and the right-eye visual image, where the first straight line is used to calibrate any plane in the mixed reality space; and determine any plane calibrated by a predetermined second straight line in the mixed reality space as a calibration result of the first straight line in case that the first straight line and the second straight line have a matching relationship of feature descriptions.

According to one or more examples of the present disclosure, the step of determining a first straight line based on the left-eye visual image and the right-eye visual image includes: obtain a position of an optical center of a first camera of the left-eye visual image and a position of an optical center of a second camera of the right-eye visual image; obtain a first line feature in the left-eye visual image and a second line feature in the right-eye visual image, where the first line feature and the second line feature have a corresponding relationship in position; construct a first plane on the basis of the position of the optical center of the first camera and the first line feature, and construct a second plane based on the position of the optical center of the second camera and the second line feature; and obtain the first straight line from intersection of the first plane and the second plane.

According to one or more examples of the present disclosure, the step of obtaining a first line feature in the left-eye visual image and a second line feature in the right-eye visual image includes: extract, respectively, from the left-eye visual image and the right-eye visual image using an LSD algorithm to obtain a first extraction result and a second extraction result; and describe, respectively, the first extraction result and the second extraction result using an LBD to obtain the first line feature and the second line feature.

According to one or more examples of the present disclosure, the method further includes, after the step of obtaining the first straight line from intersection of the first plane and the second plane: obtain a current direction vector of the first straight line; determine, based on the current direction vector of the first straight line, whether the first straight line is perpendicular to or parallel to a gravity direction of the mixed reality space, where the gravity direction of the mixed reality space is aligned with a z-axis in a pose coordinate system provided by an SLAM algorithm; and delete the first straight line based on determining that the first straight line is not perpendicular to or parallel to the gravity direction.

According to one or more examples of the present disclosure, the step of obtaining a current direction vector of the first straight line includes: obtain a first normal vector of the first plane and a second normal vector of the second plane; compute an initial direction vector of the first straight line based on the first normal vector and the second normal vector; obtain a translation distance by translation movement of an initial position point on the first straight line along the initial direction vector to a target position point, where the target position point characterizes a coordinate position of an intermediate point of the first straight line projected to the first line feature; and compute the current direction vector of the first straight line according to the initial position point, the translation distance and the initial direction vector.

According to one or more examples of the present disclosure, the step of calibrating any plane in the MR space according to the first straight line from intersection of the first plane and the second plane includes: obtain a second straight line currently determined; carry out feature description matching processing on the second straight line and the first straight line to determine whether the second straight line and the first straight line are the same straight line; and determine any plane calibrated by the second straight line as a calibration result of the first straight line in case of determining that the second straight line and the first straight line are the same straight line.

According to one or more examples of the present disclosure, the method further includes: delete the second straight line based on determining for N consecutive times that the first straight line and the second straight line have no matching relationship of the feature descriptions and that the first straight line and the second straight line have a number of matchings of the feature descriptions less than N.

According to one or more examples of the present disclosure, the method further includes: obtain a first value of an inner product of the current direction vector of the first straight line and a third normal vector of a third plane in case that the first straight line is unable to calibrate any plane in the mixed reality space, where the third plane is a virtual plane currently calibrated; compute a distance from any position point on the first straight line to the third plane in case that the first value of the inner product is within a predetermined range of the inner product; and determine that the first straight line is on the third plane in case that the distance from any position point on the first straight line to the third plane is less than a predetermined distance.

According to one or more examples of the present disclosure, the method further includes: combine, into pairs, a plurality of straight lines that are unable to calibrate any plane to obtain a plurality of fourth planes; determine fourth normal vectors respectively corresponding to the plurality of fourth planes to obtain a second value of inner product of the current direction vector of the first straight line and each of the fourth normal vectors; compute a distance from any position point on the first straight line to the fourth plane in case that the second value of the inner product is within a predetermined range of the inner product; and determine that the first straight line is on the fourth plane in case that the distance from any position point on the first straight line to the fourth plane is less than a predetermined distance.

In a second aspect, according to one or more examples of the present disclosure, a device for calibration in an MR space is provided. The device includes: an obtaining unit configured to obtain a binocular visual image acquired by a mixed reality device, where the binocular visual image includes a left-eye visual image and a right-eye visual image; a determination unit configured to determine a first straight line based on the left-eye visual image and the right-eye visual image, where the first straight line is used to calibrate any plane in the mixed reality space; and a calibration unit configured to determine any plane calibrated by a predetermined second straight line in the mixed reality space as a calibration result of the first straight line in case that the first straight line and the second straight line have a matching relationship of feature descriptions.

In an example of the present disclosure, the determination unit specifically includes: a first obtaining sub-unit configured to obtain a position of an optical center of a first camera of the left-eye visual image and a position of an optical center of a second camera of the right-eye visual image; a second obtaining sub-unit configured to obtain a first line feature in the left-eye visual image and a second line feature in the right-eye visual image, where the first line feature and the second line feature have a corresponding relationship in position; a construction sub-unit configured to construct a first plane on the basis of the position of the optical center of the first camera and the first line feature, and construct a second plane based on the position of the optical center of the second camera and the second line feature; and a third obtaining sub-unit configured to obtain the first straight line from intersection of the first plane and the second plane.

In an example of the present disclosure, the second obtaining sub-unit is specifically configured to: extract, respectively, from the left-eye visual image and the right-eye visual image using an LSD algorithm to obtain a first extraction result and a second extraction result; and describe, respectively, the first extraction result and the second extraction result using an LBD to obtain the first line feature and the second line feature.

In an example of the present disclosure, the device further includes: a vector obtaining unit configured to obtain a current direction vector of the first straight line; a direction determination unit configured to determine, based on the current direction vector of the first straight line, whether the first straight line is perpendicular to or parallel to a gravity direction of the mixed reality space; and a first deletion unit configured to delete the first straight line based on determining that the first straight line is not perpendicular to or parallel to the gravity direction.

In an example of the present disclosure, the vector obtaining unit is specifically configured to: obtain a first normal vector of the first plane and a second normal vector of the second plane; compute an initial direction vector of the first straight line based on the first normal vector and the second normal vector; obtain a translation distance by translation movement of an initial position point on the first straight line along the initial direction vector to a target position point, where the target position point characterizes a coordinate position of an intermediate point of the first straight line projected to the first line feature; and compute the current direction vector of the first straight line according to the initial position point, the translation distance and the initial direction vector.

In an example of the present disclosure, the device further includes: a second deletion unit configured to delete the second straight line based on determining for N consecutive times that the first straight line and the second straight line have no matching relationship of the feature descriptions and that the first straight line and the second straight line have a number of matchings of the feature descriptions less than N.

In an example of the present disclosure, the device further includes: a first computation unit configured to obtain a first value of an inner product of the current direction vector of the first straight line and a third normal vector of a third plane in case that the first straight line is unable to calibrate any plane in the mixed reality space, where the third plane is a virtual plane currently calibrated; a second computation unit configured to compute a distance from any position point on the first straight line to the third plane in case that the first value of inner product is within a predetermined range of the inner product; and a first processing unit configured to determine that the first straight line is on the third plane in case that the distance from any position point on the first straight line to the third plane is less than a predetermined distance.

In an example of the present disclosure, the device further includes: a combination unit configured to combine, into pairs, a plurality of straight lines that are unable to calibrate any plane to obtain a plurality of fourth planes; a third computation unit configured to determine fourth normal vectors respectively corresponding to the plurality of fourth planes to obtain a second value of inner product of the current direction vector of the first straight line and each of the fourth normal vectors; and a second processing unit configured to compute a distance from any position point on the first straight line to the fourth plane in case that the second value of the inner product is within a predetermined range of the inner product; and determine that the first straight line is on the fourth plane in case that the distance from any position point on the first straight line to the fourth plane is less than a predetermined distance.

In a third aspect, according to one or more examples of the present disclosure, an electronic device is provided. The electronic device includes: at least one processor and a memory, where the memory stores a computer-executable instruction; and the at least one processor executes the computer-executable instruction stored in the memory to cause the at least one processor to perform the method for calibration in a mixed reality space of the first aspect and various possible designs of the first aspect.

In a fourth aspect, according to one or more examples of the present disclosure, a computer-readable storage medium is provided. The computer-readable storage medium stores a computer-executable instruction, where a processor implements, when executing the computer-executable instruction, the method for calibration in an MR space of the first aspect and various possible designs of the first aspect.

In a fifth aspect, according to one or more examples of the present disclosure, a computer program product is provided. The computer program product includes a computer program, where the computer program implements, when executed by a processor, the method for calibration in an MR space of the first aspect and various possible designs of the first aspect.

What are described above are only for illustration of the preferred examples of the present disclosure and the technical principles used. It should be understood by those skilled in the art that the disclosed scope involved in the present disclosure is not limited to the technical solution formed by a specific combination of the technical features described above, and should also cover other technical solutions formed by any combination of the technical features described above or equivalent features without departing from the disclosed concept described above. For example, the technical solution formed by replacing the features described above with the technical features with similar functions disclosed in (but not limited to) the present disclosure.

Furthermore, although each operation is described in a specific order, this should not be understood as requiring the operations to be executed in the specific order shown or in a sequential order. In certain environments, multitasking and parallel processing may be advantageous.

Similarly, although several specific implementation details are included in the above discussion, these details should not be interpreted as limiting the scope of the present disclosure. Certain features described in the context of a single example can further be implemented in a single example in an combined manner. On the contrary, various features described in the context of a single example can also be implemented in multiple examples separately or in an any suitable sub-combination manner.

Although the subject matter has been described in language specific to structural features and/or method logical actions, it should be understood that the subject matter defined in the appended claims may not necessarily be limited to the specific features or actions described above. On the contrary, the specific features and actions described above are merely example forms of implementing the claims.

Example implementations are provided as below. In this way, any plane in a mixed reality space can be automatically calibrated, thereby avoiding the problem that a user needs to manually perform time-consuming and tedious calibration operations using a handle.

Implementation 1. A method for calibration in a mixed reality space, comprising: obtaining a binocular visual image acquired by a mixed reality device, wherein the binocular visual image comprises a left-eye visual image and a right-eye visual image; determining a first straight line based on the left-eye visual image and the right-eye visual image, wherein the first straight line is used to calibrate any plane in the mixed reality space; and determining any plane calibrated by a second predetermined straight line in the mixed reality space as a calibration result of the first straight line in case that the first straight line and the second straight line have a matching relationship of feature descriptions.

Implementation 2. The method according to implementation 1, wherein the determining a first straight line based on the left-eye visual image and the right-eye visual image comprises: obtaining a first camera optical center position of the left-eye visual image and a second camera optical center position of the right-eye visual image; obtaining a first line feature in the left-eye visual image and a second line feature in the right-eye visual image, wherein the first line feature and the second line feature have a corresponding relationship in position; constructing a first plane based on the first camera optical center position and the first line feature, and constructing a second plane based on the second camera optical center position and the second line feature; and obtaining the first straight line from intersection of the first plane and the second plane.

Implementation 3. The method according to implementation 2, wherein the obtaining a first line feature in the left-eye visual image and a second line feature in the right-eye visual image comprises: extracting, respectively, from the left-eye visual image and the right-eye visual image using a line segment detector algorithm to obtain a first extraction result and a second extraction result; and describing, respectively, the first extraction result and the second extraction result using a line feature descriptor to obtain the first line feature and the second line feature.

Implementation 4. The method according to implementation 2, wherein the method further comprises, after obtaining the first straight line from intersection of the first plane and the second plane: obtaining a current direction vector of the first straight line; determining, based on the current direction vector of the first straight line, whether the first straight line is perpendicular to or parallel to a gravity direction of the mixed reality space wherein the gravity direction of the mixed reality space is aligned with a z-axis in a pose coordinate system provided by a simultaneous localization and mapping algorithm; and deleting the first straight line based on determining that the first straight line is not perpendicular to or parallel to the gravity direction.

Implementation 5. The method according to implementation 4, wherein obtaining a current direction vector of the first straight line comprises: obtaining a first normal vector of the first plane and a second normal vector of the second plane; computing an initial direction vector of the first straight line based on the first normal vector and the second normal vector; obtain a translation distance by translation movement of an initial position point on the first straight line along the initial direction vector to a target position point, wherein the target position point characterizes a coordinate position of an intermediate point of the first straight line projected to the first line feature; and computing the current direction vector of the first straight line according to the initial position point, the translation distance and the initial direction vector.

Implementation 6. The method according to any one of implementations 1-5, further comprising: deleting the second straight line based on determining for N consecutive times that the first straight line and the second straight line have no matching relationship of the feature descriptions and that the first straight line and the second straight line have a number of matchings of the feature descriptions less than N.

Implementation 7. The method according to any one of implementations 1-5, further comprising: obtaining a first value of an inner product of the current direction vector of the first straight line and a third normal vector of a third plane in case that the first straight line is unable to calibrate any plane in the mixed reality space, wherein the third plane is a virtual plane currently calibrated; computing a distance from any position point on the first straight line to the third plane in case that the first value of inner product is within a predetermined range for the inner product; and determining that the first straight line is on the third plane in case that the distance from any position point on the first straight line to the third plane is less than a predetermined distance.

Implementation 8. The method according to any one of implementations 1-5, further comprising: combining, into pairs, a plurality of straight lines that are unable to calibrate any plane to obtain a plurality of fourth planes; determining fourth normal vectors respectively corresponding to the plurality of fourth planes to obtain a second inner product value of the current direction vector of the first straight line and each of the fourth normal vectors; computing a distance from any position point on the first straight line to the fourth plane in case that the second inner product value is within a predetermined range of the inner product; and determining that the first straight line is on the fourth plane in case that the distance from any position point on the first straight line to the fourth plane is less than a predetermined distance.

Implementation 9. A device for calibration in a mixed reality space, comprising: an obtaining unit configured to obtain a binocular visual image acquired by a mixed reality device, wherein the binocular visual image comprises a left-eye visual image and a right-eye visual image; a determining unit configured to determine a first straight line based on the left-eye visual image and the right-eye visual image, wherein the first straight line is used to calibrate any plane in the mixed reality space; and a calibration unit configured to any plane calibrated by a second predetermined straight line in the mixed reality space as a calibration result of the first straight line in case that the first straight line and the second straight line have a matching relationship of feature descriptions.

Implementation 10. An electronic device, comprising: a processor and a memory, wherein the memory stores a computer-executable instruction; and the processor executes the computer-executable instruction stored in the memory to cause the processor to perform the method for calibration in a mixed reality space according to any of implementations 1-8.

Implementation 11. A computer-readable storage medium storing a computer-executable instruction, wherein a processor, when executing the computer-executable instruction, implements the method for calibration in a mixed reality space according to any one of implementations 1-8.

Implementation 12. A computer program product comprising a computer program, wherein the computer program, when executed by a processor, implements the method for calibration in a mixed reality space according to any one of implementations 1-8.

Method and Apparatus for Generating Spatial Layout, Device, Medium, and Program Product Examples of the disclosure relate to the technical field of computer vision, in particular to a method and apparatus for generating a spatial layout, a device, a medium, and a program product.

Room layouts are widely used in many scenes, such as virtual room viewing, virtual furniture placement, and virtual decoration, all of which rely on room layout estimation. Moreover, the room layout is crucial in extended reality (XR) applications. A more realistic scene can be simulated based on the room layout, which enhances the "immersive experience" of a user.

Currently, the room layout frequently relies on high-precision offline three-dimensional reconstruction. While this method can estimate a room layout with very high precision, an XR scene typically does not require such high precision, but instead requires room estimation in real time. In some real-time solutions, a room layout is generated by deep learning, which gives results with sufficient precision in real time.

However, neural networks usually require specialized neural network chips due to the large arithmetic overhead, and this method generally consumes more power, making it more difficult to be applied to mobile devices.

Examples of the disclosure provide a method and apparatus for generating a spatial layout, a device, a medium, and a program product. The method obtains the spatial layout by means of lightweight pure geometric operation, such that a generation cost of a spatial layout is lower, which is more suitable for mobile devices.

In a first aspect, an example of the disclosure provides a method for generating a spatial layout. The method includes: obtaining depth maps, gray-scale images and camera pose information of a plurality of layout images of a space; obtaining plane information of each layout image; determining three-dimensional coordinates of pixels on a plane of each layout image according to a depth map and camera pose information of each layout image; extracting a straight line from a gray-scale image corresponding to each layout image according to the plane information of each layout image, and obtaining the straight line of each layout image; constraining and performing joint optimization for the planes and straight line in the space according to the plane information of the plurality of layout images, the three-dimensional coordinates of the pixels on the planes, information regarding the straight line, and the camera pose information; and solving the joint optimization with constraints, and generating the spatial layout according to an optimization result.

In some examples, obtaining plane information of each layout image includes: determining the plane information of each layout image through a plane calibration method and/or a plane aggregation method.

In some examples, determining the plane information of each layout image through a plane calibration method includes: determining, according to a calibration box in each layout image, pixels included in the calibration box, and assigning a same plane identification (ID) to the pixels included in the calibration box, where the pixels in the calibration box belong to one plane, the calibration box is formed by using ray calibration for an outline of an object in the space, and each layout image is captured after the outline of the object in the space is calibrated under the ray calibration.

In some examples, determining the plane information of each layout image through a plane aggregation method includes: generating a normal map of each layout image according to the depth map of each layout image; and determining an identification (ID) of the plane of each layout image according to the normal map of each layout image.

In some examples, determining an identification (ID) of the plane of each layout image according to the normal map of each layout image includes: assigning plane identification IDs to pixels of a first layout image according to a normal map of the first layout image, where adjacent pixels with consistent normal vectors have a same plane ID; determining planes included in the first layout image according to the number of pixels included in each plane ID in the first layout image; for a layout image except for the first layout image, projecting, according to relative poses of a previous layout image and the current layout image, pixels on a plane of the previous layout image onto camera coordinates corresponding to the current layout image; determining plane IDs of projected pixels projected onto the current layout image according to plane IDs of the pixels on the plane of the previous layout image; assigning plane IDs to pixels with plane IDs not determined in the current layout image according to a normal map of the current layout image, where adjacent pixels with consistent normal vectors have a same plane ID; and determining planes included in the first layout image according to the number of pixels included in each plane ID in the current layout image.

In some examples, determining plane IDs of projected pixels projected onto the current layout image according to plane IDs of the pixels on the plane of the previous layout image includes: determining an estimated depth map and an estimated normal map of the current layout image according to the relative poses of the previous layout image and the current layout image, and a depth map and a normal map of the previous layout image; comparing the depth map and the normal map of the current layout image with the estimated depth map and the estimated normal map of the current layout image, and determining pairs of projected pixels with similar depths and normal vectors, where the pair of projected pixels is composed of a projected pixel and a corresponding pixel of the previous layout image; and setting plane IDs of projected pixels in a target plane with a number of pairs of projected pixels greater than or equal to a first threshold to be plane IDs of corresponding pixels in the previous layout image.

In some examples, projecting, according to relative poses of a previous layout image and the current layout image, pixels on a plane of the previous layout image onto camera coordinates corresponding to the current layout image includes: determining pixel coordinates of projected pixels formed by projecting the pixels on the plane of the previous layout image onto the camera coordinates corresponding to the current layout image using the following equation:

$$px_i^c = \pi\left(R_p^c \pi^1 (px_i^p) D^p (px_i^p) + t_p^c\right);$$

where $$R_p^c$$

and $$t_p^c$$

represent a rotation matrix and a translation matrix of the current layout image relative to the previous layout image respectively, π represents a projection function of a camera, $$px_i^p$$

represents pixel coordinates of an ith pixel of the previous layout image, and $$px_i^c$$

represents pixel coordinates of a projected pixel of $$px_i^p$$

in the current layout image; and where determining an estimated depth map and an estimated normal map of the current layout image according to the relative poses of the previous layout image and the current layout image, and a depth map and a normal map of the previous layout image includes: calculating an estimated depth and an estimated normal vector value of the projected pixel of the current layout image by using the following equations:

$$\hat{d}_i^c = \left(R_p^c \pi^{-1} (px_i^p) D^p (px_i^p) + t_p^c\right) \cdot z;$$

$$\hat{n}_i^c = R_p^c n^p (px_i^p);$$

where $$\hat{d}_i^c$$

represents the estimated depth of the projected pixel, $D^p(\cdot)$ represents a depth of the pixel of the previous layout image, $n^p(\cdot)$ represents a normal vector of the pixel of the previous layout image, $$\hat{n}_i^c$$

represents the estimated normal vector value of the projected pixel, and z represents an z-coordinate value of the pixel.

In some examples, comparing the depth map and the normal map of the current layout image with the estimated depth map and the estimated normal map of the current layout image, and determining pairs of projected pixels with similar depths and normal vectors includes: determining that the projected pixel and the corresponding pixel of the previous layout image are a pair of projected pixels in case that a normal vector and a depth of the projected pixel of the current layout image satisfy $$\left|\hat{d}_i^c - D^c(px_i^c)\right| < \delta_d \text{ and } \left|\hat{n}_i^c - n^c(px_i^c)\right| < \delta_c;$$

where $D^c(\cdot)$ represents the depth of the projected pixel $$px_i^c$$

of the current layout image, $n^c(\cdot)$ represents the normal vector of the projection pixel $$px_i^c$$

of the current layout image, $\delta_d$ represents a preset depth threshold, and $\delta_c$ represents a preset normal vector threshold.

In some examples, generating a normal map of each layout image according to the depth map of each layout image includes: determining a pixel block with a preset size by taking each pixel in the depth map as a central point; determining a three-dimensional coordinate value of each pixel in the pixel block under a camera coordinate system according to pixel coordinates and a depth of each pixel in the pixel block; and constructing a structure matrix for the pixel block according to the three-dimensional coordinate value of each pixel in the pixel block under the camera coordinate system, performing singular value decomposition (SVD) on the structure matrix, obtaining an eigenvector corresponding to a minimum singular value, and determining the eigenvector corresponding to the minimum singular value as a normal vector of the central point of the pixel block.

In some examples, determining a three-dimensional coordinate value of each pixel in the pixel block under a camera coordinate system according to pixel coordinates and a depth of each pixel in the pixel block includes: determining the three-dimensional coordinate value of each pixel in the pixel block under the camera coordinate system using the following formula:

$$P_i = \left(\pi^{-1}(px_i)\right) D(px_i);$$

where $P_i$ represents a three-dimensional coordinate value of an ith pixel in the pixel block, π represents a projection function of a camera, $px_i$ represents a pixel coordinate of the ith pixel in the pixel block, and $D(\cdot)$ represents a depth of the pixel.

In some examples, constructing a structure matrix for the pixel block according to the three-dimensional coordinate value of each pixel in the pixel block under the camera coordinate system includes:

obtaining the structure matrix H as:

$$H = \sum_{j=1, j\neq i}^{n} (P_i - P_j)(P_i - P_j)^T$$

where $P_i$ denotes the central point of the pixel block, $P_j$ denotes other pixels in the pixel block, and n is the number of pixels in the pixel block.

In some examples, assigning plane identification IDs to pixels of a first layout image according to a normal map of the first layout image includes: accessing the pixels of the first layout image in a preset accessing order, and accessing a next pixel in case that a currently accessed pixel has a plane ID; determining whether a normal vector of the current accessed pixel is consistent with a normal vector of an adjacent pixel in case that the current accessed pixel has no plane ID; setting the plane ID of the current accessed pixel as a plane ID of the adjacent pixel in case that the normal vector of the current accessed pixel is consistent with the normal vector of the adjacent pixel and that the adjacent pixel has a plane ID; alternatively, assigning a new plane ID to the currently accessed pixel in case that the normal vector of the currently accessed pixel is consistent with the normal vector of the adjacent pixel and that the adjacent pixel has no plane ID; and alternatively, assigning a new plane ID to the current accessed pixel in case that the normal vector of the current accessed pixel is inconsistent with the normal vector of the adjacent pixel.

In some examples, assigning plane IDs to pixels with plane IDs not determined in the current layout image according to a normal map of the current layout image includes: accessing the pixels of the current layout image in a preset access order, and accessing a next pixel in case that a currently accessed pixel has a plane ID; determining whether a normal vector of the current accessed pixel is consistent with a normal vector of an adjacent pixel in case that the current accessed pixel has no plane ID; setting the plane ID of the current accessed pixel as a plane ID of the adjacent pixel in case that the normal vector of the current accessed pixel is consistent with the normal vector of the adjacent pixel and that the adjacent pixel has a plane ID; alternatively, assigning a new plane ID to the currently accessed pixel in case that the normal vector of the currently accessed pixel is consistent with the normal vector of the adjacent pixel and that the adjacent pixel has no plane ID; and alternatively, assigning a new plane ID to the current accessed pixel in case that the normal vector of the current accessed pixel is inconsistent with the normal vector of the adjacent pixel.

In some examples, extracting a straight line from the gray-scale image corresponding to each layout image according to the plane information of each layout image, and obtaining the straight line of each layout image include: determining three-dimensional coordinate values of pixels of each layout image in the camera coordinate system according to pixel coordinates and depths of each layout image; obtaining a plane equation of each layout image by plane fitting according to the plane information of each layout image and the three-dimensional coordinate values of the pixels of the image under the camera coordinate system; obtaining an intersection line by intersecting planes in each layout image in pairs, and projecting the intersection line onto the gray-scale image corresponding to each layout image, to obtain a prior straight line corresponding to the intersection line; and determining the straight line on each layout image according to the prior straight line.

In some examples, determining the straight line on each layout image according to the prior straight line includes: extending two sides of the prior straight line by a preset number of pixels in a perpendicular direction of the prior straight line separately, and obtaining a reference image block surrounding the prior straight line; calculating a gradient map of the reference image block; calculating an inner product of a gradient direction of each pixel in the reference image block and a direction of the prior straight line; determining target pixels having an inner product greater than a second threshold from the reference image block; and performing straight line fitting on the target pixels in the reference image block, and obtaining the straight line on each layout image.

In some examples, performing straight line fitting on the target pixels in the reference image block includes: performing straight line fitting on the target pixels in the reference image block using a random sample consensus (RANSAC) method.

In some examples, constraining and performing joint optimization for the planes and straight line in the space according to the plane information of the plurality of layout images, the three-dimensional coordinates of the pixels on the planes, information regarding the straight line, and the camera pose information include: constructing a plane equation of each plane in the space according to the plane information of the plurality of layout images; establishing a distance constraint from points on each plane to the plane according to the plane equation of each plane and the three-dimensional coordinates of the pixels on each plane; establishing an intersection constraint of two intersecting planes according to the plane equations of the planes, the camera pose information of the plurality of layout images and information regarding the straight line, where the information regarding the straight line includes a straight line direction, a straight line position, and IDs of the two intersecting planes used for extracting the straight line, and the intersection constraint is a constraint between a projection line of an intersection line of the two intersecting planes in the gray-scale image and the straight lines extracted from the two intersecting planes, and the projection line of the intersection line of the two intersecting planes is obtained based on projection according to the camera pose information; and performing joint optimization on the distance constraint from points to the plane and the intersection constraint of the two intersecting planes.

In some examples, a plane equation of a kth plane is as follows:

$$a_k x + b_k y + c_k z + d_k = 0, \text{ where } a_k^2 + b_k^2 + c_k^2 = 1;$$

a distance constraint from points on the kth plane to the plane is as follows:

$$e_{ki}^k = \left(a_k P_{k_i}^w \cdot x + b_k P_{k_i}^w \cdot y + c_k P_{k_i}^w \cdot z + d_k\right)^2;$$

where $$P_{k_i}^{w}$$

is three-dimensional coordinates of an ith point on the kth plane;

for a straight line $L_p$ extracted in a pth layout image, an intersection constraint of two intersecting planes k and l used for extracting the straight line $L_p$ is as follows:

$$e_p^{kl} = \left(\pi\left(R_p^w\left(\begin{pmatrix} a_k \\ b_k \\ c_k \end{pmatrix} \times \begin{pmatrix} a_l \\ b_l \\ c_l \end{pmatrix}\right)\right) - \ell_p\right)$$

where $$R_p^w$$

represents a rotation matrix of the pth layout image relative to a world coordinate system, π represents the projection function of a camera, and $\ell_p$ represents a direction vector of the straight line $L_p$; and the joint optimization is as follows:

$$E = \sum_{i,k} e_{k_i}^k + \sum_{p,k,l} e_p^{kl},$$

subject to $$\forall\, k,\, a_k^2 + b_k^2 + c_k^2 = 1.$$

In another aspect, an example of the disclosure provides an apparatus for generating a spatial layout. The apparatus includes: a first obtaining module configured to obtain depth maps, gray-scale images and camera pose information of a plurality of layout images of a space; a second obtaining module configured to obtain plane information of each layout image; a determination module configured to determine three-dimensional coordinates of pixels on a plane of each layout image according to a depth map and camera pose information of each layout image; a straight line extracting module configured to extract a straight line from a gray-scale image corresponding to each layout image according to the plane information of the layout image, and obtain the straight lines of each layout image; an optimization module configured to constrain and perform joint optimization for the planes and the straight line in the space according to the plane information of the plurality of layout images, the three-dimensional coordinates of the pixels on the planes, information regarding the straight line, and the camera pose information; and a generation module configured to solve the joint optimization with constraints, and generating the spatial layout according to an optimization result.

In yet another aspect, an example of the disclosure provides an electronic device. The electronic device includes a memory and a processor, where the memory stores a computer program, and the processor is configured to execute the computer program stored in the memory, to perform the method according to any one of above items.

In yet another aspect, an example of the disclosure provides a computer-readable storage medium, storing a computer program. The computer program causes a computer to perform the above method according to any one of the above items.

In still another aspect, an example of the disclosure provides a computer program product including a computer program. The computer program implements, when executed by a processor, the method according to any one of the above items.

Examples of the disclosure provide a method and apparatus for generating a spatial layout, a device, a medium and a program product, including: obtaining depth maps, gray-scale images and camera pose information of a plurality of layout images of a space, and obtaining plane information of each layout image; determining three-dimensional coordinates of pixels on a plane of each layout image according to a depth map and camera pose information of each layout image; extracting a straight line from a gray-scale image corresponding to each layout image according to the plane information of each layout image, and obtaining the straight line of each layout image; constraining and performing joint optimization for the planes and the straight line in the space according to the plane information of the plurality of layout images, the three-dimensional coordinates of the pixels on the planes, information regarding the straight line, and the camera pose information; and solving the joint optimization with constraints, and generating the spatial layout according to an optimization result. In this way, a spatial layout can be obtained through lightweight pure geometric operations at a lower cost, and therefore more suitable for mobile devices.

The technical solutions of the examples of the present invention are clearly and completely described below with reference to the drawings. Apparently, the described examples are merely some examples rather than all examples of the present invention. Based on the examples of the present invention, all other examples acquired by those of ordinary skill in the art without making creative efforts fall within the scope of protection of the present invention.

It should be noted that the terms "first", "second" and so forth, in the specification and claims of the present invention and in the above-mentioned drawings, are used to distinguish between similar objects and not necessarily to describe a particular order or sequential order. It should be understood that the data used in this way may be interchanged where appropriate, such that the examples of the present invention described herein can be implemented in other sequences than those illustrated or described herein. In addition, the terms "comprise", "include", "have", and any variations thereof are intended to cover non-exclusive inclusions, for example, processes, methods, systems, products, or servers that includes a series of steps or units are not necessarily limited to those explicitly listed steps or units, but may include other steps or units not explicitly listed or inherent to these processes, methods, products, or devices.

An example of the disclosure provides a method for generating a spatial layout, which is configured to generate a layout of a three-dimensional space. The spatial layout includes shapes of objects, positions of objects, and relative positional relations between objects in the three-dimensional space. The spatial layout includes but is not limited to a design layout of a room, a three-dimensional layout of a city, etc. Room layouts are widely used in scenes of virtual room viewing, virtual furniture placement, virtual decoration, etc.

The method for generating a spatial layout provided in the example of the disclosure can be applied to electronic devices such as extended reality (XR) devices, mobile phones, computers, etc. Due to lightweight computing, the method is more suitable for mobile terminals such as XR devices and mobile phones.

XR refers to combination of reality and virtuality through computers, to create a virtual environment that can achieve man-machine interaction. XR is also a general term for virtual reality (VR), augmented reality (AR) and mixed reality (MR). By integrating visual interaction technologies of VR, AR and MR, "immersive experience" of seamless transition between a virtual world and a real world is brought to an experiencer.

VR is a technology for creating and experiencing a virtual world, generates a virtual environment through computing, and is multi-source information (the virtual reality mentioned herein includes at least visual perception, and may also include auditory perception, tactile perception, motion perception, and even taste perception, olfactory perception, etc.). VR achieve fused and interactive three-dimensional dynamic vision of the virtual environment and simulation of entity behavior, and immerses users into the simulated virtual reality environment, such that applications in a variety of virtual environments such as maps, games, videos, education, medical treatment, simulation, collaborative training, sales, assisted manufacturing, maintenance and repair.

A VR device refers to a terminal capable of achieving virtual reality effects, and may generally be provided in the form of glasses, a head mount display (HMD), and contact lenses, so as to achieve visual perception and other forms of perception. Certainly, a form of the virtual reality device is not limited thereto, and may be further miniaturized or enlarged according to needs.

For AR, an AR set is a simulated set in which at least one virtual object is superimposed on a top of a physical set or a representation of the physical set. For example, an electronic system may have an opaque display and at least one imaging sensor. The imaging sensor is configured to capturing an image or a video of the physical set, and the image or video is a representation of the physical set. The system combines the image or the video with a virtual object and displays the combination on the opaque display. An individual uses the system to view the physical set indirectly by means of the image or video of the physical set and to observe the virtual object superimposed on the top of the physical set. When the system captures images of the physical set using one or more image sensors, and uses these images to display an AR set on the opaque display, the displayed images are referred to as video pass-through. Alternatively, the electronic system for displaying an AR set may have a transparent or translucent display, and an individual may view the physical set directly by means of the display. The system may display the virtual object on the transparent or translucent display, such that an individual may use the system to view the virtual object superimposed on the physical set. As another instance, the system may include a projection system that projects the virtual object onto the physical set. The virtual object, for example, may be projected onto a physical surface or as a hologram, such that an individual may use the system to view the virtual object superimposed on the top of physical set. Specifically, a technology for calculating camera posture parameters of a camera in a real world (or called a three-dimensional world or a real world) in real time in a process of collecting images by the camera, and adding virtual elements to the images collected by the camera according to the camera posture parameters is used. The virtual elements include, but are not limited to, images, videos, and three-dimensional models. The AR technology aims to connect the virtual world to the real world on the screen for interaction.

For MR, by presenting virtual scene information in a real scene, an interactive feedback information loop is set up between the real world, the virtual world and the user, to enhance realism of the user experience. For example, computer-created sensory input (for example, a virtual object) is integrated with sensory input from a physical set or a representation of the physical set in a simulated set. In some MR sets, the computer-created sensory input may be adapted to variations in the sensory input from the physical set. Moreover, some electronic systems configured to present MR sets may monitor an orientation and/or position relative to the physical set, to allow the virtual object to interact with a real object (that is, a physical element or a representation of the physical element from the physical set). For example, the system may monitor motion, such that virtual plants appear stationary relative to physical buildings.

Alternatively, the virtual reality device (that is, the XR device) described in the example of the disclosure may include, but is not limited to, the following types.

1) A mobile virtual reality device supports setting a mobile terminal (such as a smart phone) in various ways (such as a head-mounted display provided with a special card slot). The mobile terminal performs calculations related to virtual reality functions by means of wired or wireless connection with the mobile terminal, and outputs data to the mobile virtual reality device. For example, a virtual reality video is viewed by means of an application (APP) of the mobile terminal.

2) An all-in-one virtual reality device has a processor for calculations related to virtual functions, such that the all-in-one virtual reality device has independent virtual reality input and output functions, does not need to be connected to a personal computer (PC) side or a mobile terminal, and has a high degree of freedom in use.

3) A personal computer virtual reality (PCVR) device implements calculations related to virtual reality functions and outputs data using a PC side, and the external PCVR device uses data output from the PC side to achieve a virtual reality effect.

After introducing some concepts involved in the examples of the disclosure, a method for generating a spatial layout provided in the examples of the disclosure is described in detail below with reference to the accompanying drawings.

Figure 20:
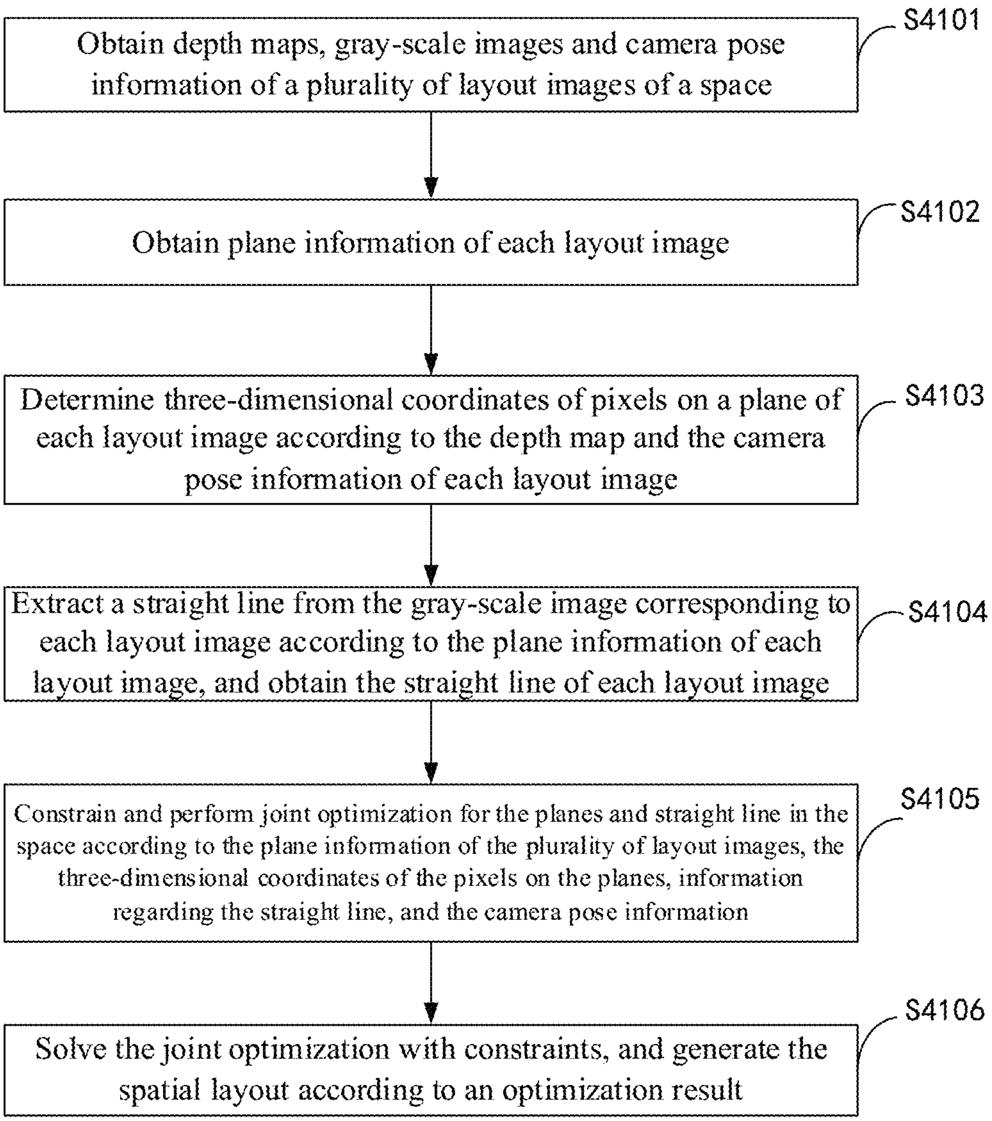
FIG. 20 is a flowchart of a method for generating a spatial layout according to Example 1 of the disclosure.

FIG. 20 is a flowchart of a method for generating a spatial layout according to Example 1 of the disclosure. The method in the example is performed by an electronic device. The electronic device includes, but is not limited to, an XR device, a mobile phone, a tablet computer, etc. The following examples are described by taking an XR device as an example. As shown in FIG. 20, the method in the example includes:

S4101, obtain depth maps, gray-scale images and camera pose information of a plurality of layout images of a space.

A plurality of layout image of the space are captured by a camera, and the depth maps, the gray-scale images and the camera pose information corresponding to the plurality of layout images of the space are obtained. It can be understood that during implementation, after each layout image is captured, a depth map, a gray-scale image and camera pose information of the image may be obtained; and alternatively, after a plurality of layout images are captured, depth maps, gray-scale images and camera pose information of the layout images may be obtained sequentially.

The depth map of the layout image consists of a depth of each pixel point in the layout image. The depth of the pixel point is configured to indicate a distance between the pixel point and the camera. For example, a depth camera may be used for capturing a layout image. Each pixel point in the image captured by the depth camera consists of four values, that is, (R, G, B, D), where RGB is a value of three color channels of red (R), green (G), and blue (B), and D is a depth of the pixel point, such that the depths of the pixel points may be directly obtained from the image, to form a depth map.

A gray-scale image is also called a grayscale map. An RGB image captured by the camera is converted to obtain a corresponding gray-scale image. Each pixel point of gray-scale image can be expressed as (Gray, Gray, Gray), where Gray is a gray value, a value range of Gray is (0-255), white is 255, and black is 0.

The camera pose information of the ith layout image refers to rotation information and translation information of the camera relative to a world coordinate system when the ith layout image is captured. The rotation information and translation information may be represented by matrices, such that the camera pose information may be a rotation matrix and a translation matrix of the camera relative to the world coordinate system.

In the example of the disclosure, the depth map and the gray-scale image may be generated from layout images captured by one camera, or may be generated from layout images captured by two different cameras. Accordingly, when the depth map and the gray-scale image are generated from layout images captured by one camera, the camera pose information is pose information of one camera. When the depth map and the gray-scale image are generated from layout images captured by two cameras, the camera pose information includes pose information of the two cameras.

S4102, obtain plane information of each layout image.

The plane information of each layout image includes an identification (ID) of a plane to which a pixel of the layout image belongs. Pixels having a same plane ID to which the pixels on the layout image belong to one plane. Alternatively, the plane information of the layout image further includes the number of pixels included in each plane in the layout image. The number of pixels included in each plane is the number of pixels with a same plane ID.

In a layout image, for the same plane ID, in case that the number of pixels included in the plane ID is greater than or equal to a preset number threshold, or in case that a ratio of the number of pixels included in the plane ID to the total number of pixels is greater than or equal to a preset first ratio, it is considered that the pixels represent a plane in a physical world. The total number of pixels refers to the total number of pixels in the layout image. That is to say, in a layout image, when the number of pixels having a same plane ID is small, it is considered that the pixels do not represent a plane in a physical world.

Each layout image may have one or more planes. The planes in the layout image correspond to planes in a real environment where the space is located. Surfaces of each object in the real environment are planes in the real environment. For example, in a room layout, a surface of a wall is a plane, and a surface of a table may form one or more planes. A plane in the real environment still belongs to the same plane in different layout images, that is, a plane ID corresponding to a plane in the real environment is the unchanged in different layout images.

In the example, the plane information of each layout image may be determined through a plane calibration method and/or a plane aggregation method. The plane information of each layout image is determined may be understood as determining an ID of a plane to which each pixel in each layout image belongs, that is, determining which pixels belong to the same plane and assigning the plane ID.

Illustratively, the plane information of each layout image is determined through a plane calibration method as follows: determine, according to a calibration box in each layout image, pixels included in the calibration box, and assign a same plane ID to the pixels included in the calibration box, where the pixels in the calibration box belong to one plane. The calibration box is formed by using ray calibration for an outline of an object in the space, and each layout image is captured after the outline of the object in the space is calibrated under the ray calibration.

Therefore, the captured layout image includes a calibration box, and all pixels within one calibration box in the layout image constitute a plane.

Rays can be emitted from a handle of the XR device or from other devices capable of emitting rays. With the handle of XR device as an instance, a user controls the handle to move a ray to a corner of an object to be calibrated, takes the corner as a starting point, moves the handle to draw a calibration box.

The calibration box may be rectangular, circular, oval, square, etc., or in other irregular shapes, and the examples of the disclosure does not limit the shape of the calibration box.

The plane aggregation method does not require a user to manually calibrate an outline of an object in the space, generates a normal map of each layout image according to a depth map of each layout image, and determines a plane ID of each layout image according to the normal map of each layout image.

A plane in the plane calibration method is manually calibrated by a user, and may not be calibrated accurately. Therefore, the plane calibration method and the plane aggregation method can be combined to determine the plane, such that the determined plane of the layout image is more accurate.

S4103, determine three-dimensional coordinates of pixels on a plane of each layout image according to the depth map and the camera pose information of each layout image.

The three-dimensional coordinates of pixels on the layout image are three-dimensional coordinates in the world coordinate system. The camera pose information includes a rotation matrix and a translation matrix of each layout image relative to the world coordinate system. The rotation matrix and the translation matrix of each layout image relative to the world coordinate system refer to a rotation matrix and a translation matrix of the camera relative to the world coordinate system when the camera captures each layout image.

Illustratively, the three-dimensional coordinates of each pixel on the plane of the layout image are determined by means of the following equation (1):

$$P_i^w = R_p^w \pi^{-1}(px_i) D^p(px_i) + t_p^w$$

where $$R_p^w$$

denotes a rotation matrix of a pth layout image relative to the world coordinate system, $$t_p^w$$

denotes a translation matrix of the pth layout image relative to the world coordinate system, π denotes a projection function of the camera, $px_i$ denotes pixel coordinates of an ith pixel in the pth layout image, and $D^p(\cdot)$ denotes a depth map of the pth layout image.

S4104, extract a straight line from the gray-scale image corresponding to each layout image according to the plane information of each layout image, and obtain the straight line of each layout image.

Illustratively, three-dimensional coordinate values of pixels of each layout image in the camera coordinate system are determined according to pixel coordinates and depths of each layout image, and a plane equation of each layout image is obtained by plane fitting according to the plane information of each layout image and the three-dimensional coordinate values of the pixels of the image under the camera coordinate system. An intersection line is obtained by intersecting planes in each layout image in pairs, and the intersection line is projected onto the gray-scale image corresponding to each layout image, to obtain a prior straight line corresponding to the intersection line. In one way, the prior straight line is taken as a straight line on each layout image directly, and in another way, the straight line on each layout image is determined according to the prior straight line.

Illustratively, three-dimensional coordinate values of pixels of each layout image in the camera coordinate system are determined according to the following equation:

$$P_i = (\pi^{-1}(px_i))D(px_i)$$

where $P_i$ denotes a three-dimensional coordinate value of an ith pixel in a current layout image, π denotes a projection function of a camera, $\pi^{-1}(\cdot)$ denotes inverse mapping of a projection of the camera, $px_i$ denotes pixel coordinates of the ith pixel in the current layout image, and $D(\cdot)$ denotes a depth of the pixel.

After the three-dimensional coordinate values of pixels of the current layout image in the camera coordinate system are determined, according to plane information of the current layout image, that is, a plane ID to which the pixels in the current layout image belong, plane fitting is performed on the three-dimensional coordinate values of pixels having a same plane ID in the current layout image in the camera coordinate system, to obtain a plane equation of the current layout image. Therefore, the plane obtained by fitting is a plane in the camera coordinate system, and plane fitting is performed on each layout image independently.

In the example, any existing plane fitting method may be used for fitting to obtain the plane equation of each plane in the current layout image. Illustratively, commonly used plane fitting methods include the least square method, the moving least squares, the iteration method with variable weights, etc.

When an intersection line of intersecting planes is projected onto a gray-scale image, two end points of the intersection line may be projected onto the gray-scale image, projection points of the two end points in the gray-scale image are obtained, and a prior straight line corresponding to the intersection line may be obtained by connecting the projection points of the two end points in the gray-scale image. The prior straight line is located in the gray-scale image.

Errors may exist in obtaining a plane of each layout image. For example, the plane calibration method may lead to inaccurate calibration of a plane due to artificial calibration, such that a finally obtained plane has errors. For another example, the plane aggregation method inevitably introduces some errors. The plane obtained in the previous step has errors, resulting in errors in the prior straight line projected onto the gray-scale image. Therefore, in the example, a straight line on each layout image may be determined according to the prior straight line, which is equivalent to correcting the prior straight line.

Illustratively, a line on each layout image can be determined in the following manner of: extending two sides of the prior straight line by a preset number of pixels in a perpendicular direction of the prior straight line separately, and obtaining a reference image block surrounding the prior straight line; calculating a gradient map of the reference image block; calculating an inner product of a gradient direction of each pixel in the reference image block and a direction of the prior straight line; determining target pixels having an inner product greater than a second threshold from the reference image block; and performing straight line fitting on the target pixels in the reference image block, and obtaining the straight line on each layout image.

Figure 21:
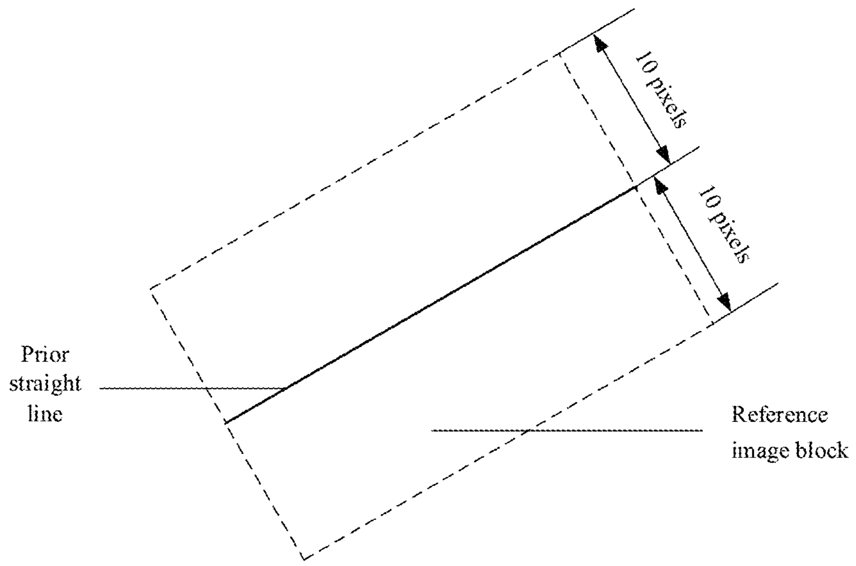
FIG. 21 is a schematic diagram of expansion of a prior straight line on a gray-scale image.

FIG. 21 is a schematic diagram of expansion of a priori straight line on a gray-scale image. As shown in FIG. 21, a vertical direction of the prior straight line is shown by an arrow. The prior straight line is taken as a center line, two sides of the prior straight line are extended by a preset number of pixels in the vertical direction of the prior straight line, and a reference image block is obtained. The number of pixels for extending can be set according to needs and use scenes. For example, the preset number of pixels for extending is 10, that is, two sides of the prior straight line are extended by 10 pixels separately, and a reference image block with a width of 20 pixels is obtained. A length of the reference image block is equal to a length of the prior straight line.

After a reference image of the prior straight line is obtained, a gradient map of the reference image block is calculated. The gradient map of the reference image block includes gradient values of pixels in the reference image block, and the gradient value of each pixel includes a direction (that is, gradient direction) and a magnitude.

After the gradient value of each pixel in the reference image block is obtained, target pixels consistent with the prior straight line in direction are determined from the reference image block according to the gradient values of the pixels. Straight line fitting is performed on the determined target pixels, and a fitted straight line directly corresponding to the prior straight line is taken as a straight line on the layout image.

Alternatively, an inner product of the gradient direction of each pixel in the reference image block and the direction of the prior straight line is calculated, and an absolute value of the inner product of the gradient direction of the pixel and the direction of the prior straight line indicates whether the directions of the pixel and the prior straight line are consistent. Pixels whose inner product is greater than a preset second threshold are taken as target pixels, straight line fitting is performed on the target pixels in the reference image block, and a straight line on each layout image is obtained.

Illustratively, straight line fitting is performed on the target pixels in the reference image block using a random sample consensus (RANSAC) method. The RANSAC method is an algorithm that calculates mathematical model parameters of data according to a set of sample data containing abnormal data, and obtains valid sample data.

S4105, constrain and perform joint optimization for the planes and straight line in the space according to the plane information of the plurality of layout images, the three-dimensional coordinates of the pixels on the planes, information regarding the straight line, and the camera pose information.

Alternatively, after plane information of a layout image, three-dimensional coordinates of pixels on a plane, information regarding the straight line, and camera pose information are obtained, the plane information of layout image, the three-dimensional coordinates of pixels on a plane, the information regarding the straight line, and the camera pose information are stored. After needed plane information of all layout images, needed information regarding the straight line, and needed camera pose information are obtained, joint optimization is performed using the step, to generate the spatial layout.

Joint optimization is optimization in the world coordinate system. For parameters used for optimization, coordinate transformation may be performed according to the camera pose information, and parameters in the camera coordinate system may be transformed into the world coordinate system.

The information regarding a straight line on each layout image may include a direction vector of the straight line, a position of the straight line, and IDs of two intersecting planes used when extracting the straight line, that is, the straight line is determined by intersection of the two planes.

In the example, constraints on the joint optimization include a distance constraint from a point to a plane, and an intersection constraint of two intersecting planes. The joint optimization is optimization from a point to a plane and optimization of two intersecting planes. An accurate plane in the space may be obtained by means of the joint optimization.

S4106, solve the joint optimization with constraints, and generate the spatial layout according to an optimization result.

The joint optimization is solved to obtain plane equations of the planes in the space. Three-dimensional reconstruction is performed according to position relations between the planes, to generate the spatial layout. The spatial layout can be displayed to a user by means of a display screen of a device.

The method in the example includes: obtain depth maps, gray-scale images and camera pose information of a plurality of layout images of a space, and obtain plane information of each layout image; determine three-dimensional coordinates of pixels on a plane of each layout image according to a depth map and camera pose information of each layout image; extract a straight line from a gray-scale image corresponding to each layout image according to the plane information of each layout image, and obtain the straight line of each layout image; constrain and perform joint optimization for the planes and the straight line in the space according to the plane information of the plurality of layout images, the three-dimensional coordinates of the pixels on the planes, information regarding the straight line, and the camera pose information; and solve the joint optimization with constraints, and generate the spatial layout according to an optimization result. In this way, a spatial layout can be obtained through lightweight pure geometric operations at a lower cost, and therefore more suitable for mobile devices.

Figure 22:
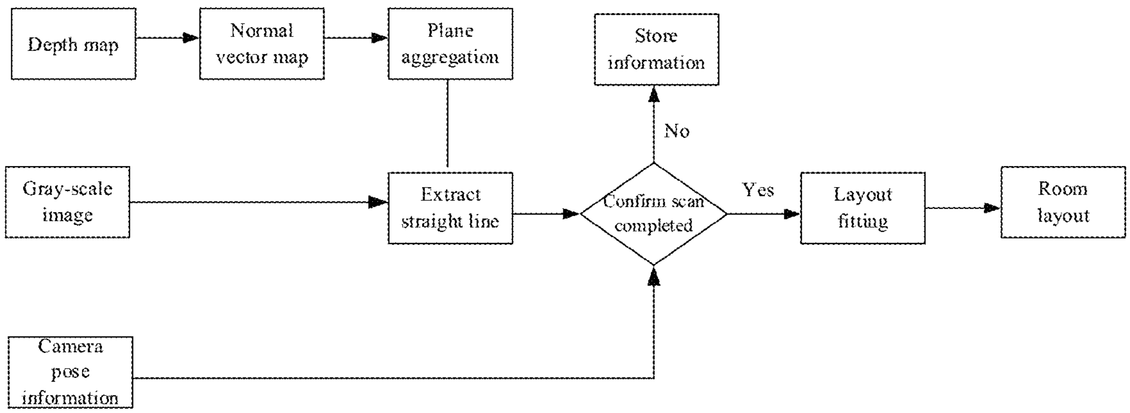
FIG. 22 is a schematic diagram illustrating a principle of a method for generating spatial layout according to an example of the disclosure.

Based on Example 1, FIG. 22 is a schematic diagram illustrating a principle of a method for generating spatial layout according to an example of the disclosure. In the method, plane information of a layout image is obtained through a plane aggregation method. As shown in FIG. 22, input of the method is a depth map, a gray-scale image and camera pose information of each layout image, a normal map of the layout image is obtained according to the depth map of the layout image, plane aggregation is performed according to the normal map of the layout image, and the plane of the layout image is obtained means of plane aggregation. Then, based on the obtained planes, an intersection line of intersecting planes is projected onto the gray-scale image, a straight line is extracted from the gray-scale image, and a straight line on the layout image is extracted. Scan completion confirmation is performed, that is, it is detected whether the current layout image is the last layout image. In case that the current layout image is not the last layout image, that is, scan is not completed, information is store, specifically, plane information of the current layout image, three-dimensional coordinates of pixels on a plane, information regarding the straight line, camera pose information, etc. are stored. In case that the current layout image is the last layout image, that is, scan is complete, layout fitting is performed according to stored plane information of each layout image, three-dimensional coordinates of pixels on a plane, information regarding the straight line, and camera pose information, to generate a spatial layout. The layout fitting corresponds to S4105 and S4106 in Example 1.

Figure 23:
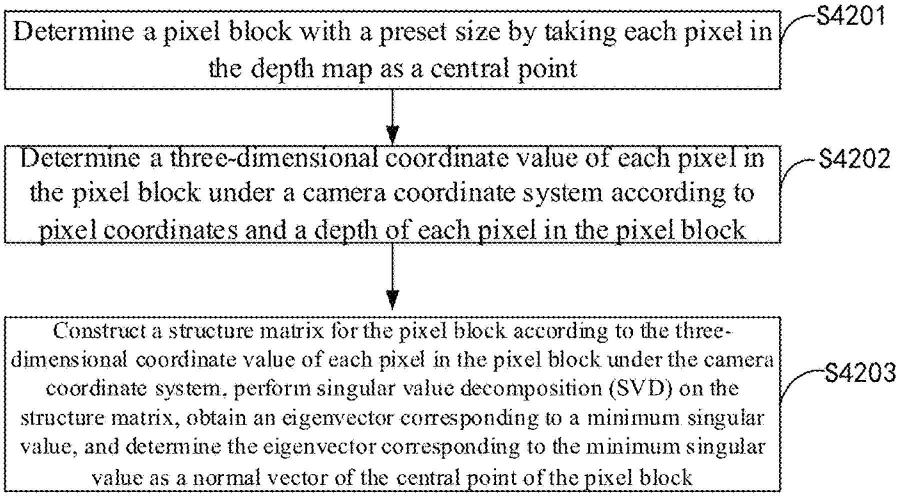
FIG. 23 is a flowchart of a method for generating a normal map of a layout image according to Example 2 of the disclosure.

FIG. 23 is a flowchart of a method for generating a normal map of a layout image according to Example 2 of the disclosure. The flowchart is used for describing a method for generating a normal map in Example 1 and in FIG. 22. In the example, a normal map corresponding to each layout image is generated according to a depth map of each layout image. With reference to FIG. 23, the method provided in the example includes the following steps.

S4201, determine a pixel block with a preset size by taking each pixel in the depth map as a central point.

For each pixel in the depth map, a pixel block of a preset size is determined by taking the pixel as a central point. For example, the pixel block of a preset size includes 9 pixels, that is, 8 pixels adjacent to the pixel are used for form the pixel block together by taking the pixel as a center, and the pixel block is such a pixel block of 3*3. It can be understood that the pixel block may further include more or fewer pixels, which is not limited in the example of the disclosure.

It can be understood that pixels at edges in the depth map cannot form pixel blocks as central points, but the pixels at edges can still belong to some pixel blocks.

S4202, determine a three-dimensional coordinate value of each pixel in the pixel block under a camera coordinate system according to pixel coordinates and a depth of each pixel in the pixel block.

Illustratively, the three-dimensional coordinate value of each pixel in the pixel block under the camera coordinate system is determined using the following formula:

$$P_i = (\pi^{-1}(px_i))D(px_i)$$

where $P_i$ denotes a three-dimensional coordinate value of an ith pixel in a pixel block, $\pi$ denotes a projection function of a camera, $\pi^{-1}(\cdot)$ denotes inverse mapping of a projection of the camera, $px_i$ denotes pixel coordinates of the ith pixel in the pixel block, and $D(\cdot)$ denotes a depth of the pixel. By performing camera inverse mapping on pixel coordinates in the pixel block, a pixel on an image is mapped to a point on a normalization plane, then a mapped normalized point is multiplied by a depth of the point, and a three-dimensional coordinate value of the pixel in a camera coordinate system is obtained.

S4203, construct a structure matrix for the pixel block according to the three-dimensional coordinate value of each pixel in the pixel block under the camera coordinate system, perform singular value decomposition (SVD) on the structure matrix, obtain an eigenvector corresponding to a minimum singular value, and determine the eigenvector corresponding to the minimum singular value as a normal vector of the central point of the pixel block.

Illustratively, obtain the structure matrix H as:

$$H = \sum_{j=1, j\neq 1}^{n} (P_i - P_j)(P_i - P_j)^T$$

where $P_i$ denotes the central point of the pixel block, $P_j$ denotes other pixels in the pixel block, and n is the number of pixels in the pixel block. $P_i$ and $P_j$ each are a 3*1 column vector, such that the structure matrix H is a 3*3 matrix, singular value decomposition (SVD) is performed on the structure matrix H, to obtain an eigenvector corresponding to a minimum singular value. The eigenvector corresponding to a minimum singular value is determined as a normal vector of the central point of the pixel block, the normal vector of each pixel in the layout image is obtained in the above manner, and the normal vectors of the pixels constitutes a normal map.

The normal map corresponding to the layout image and generated by the example method is more accurate, such that a plane obtained by subsequent plane aggregation based on the normal map is more accurate.

Figure 24:
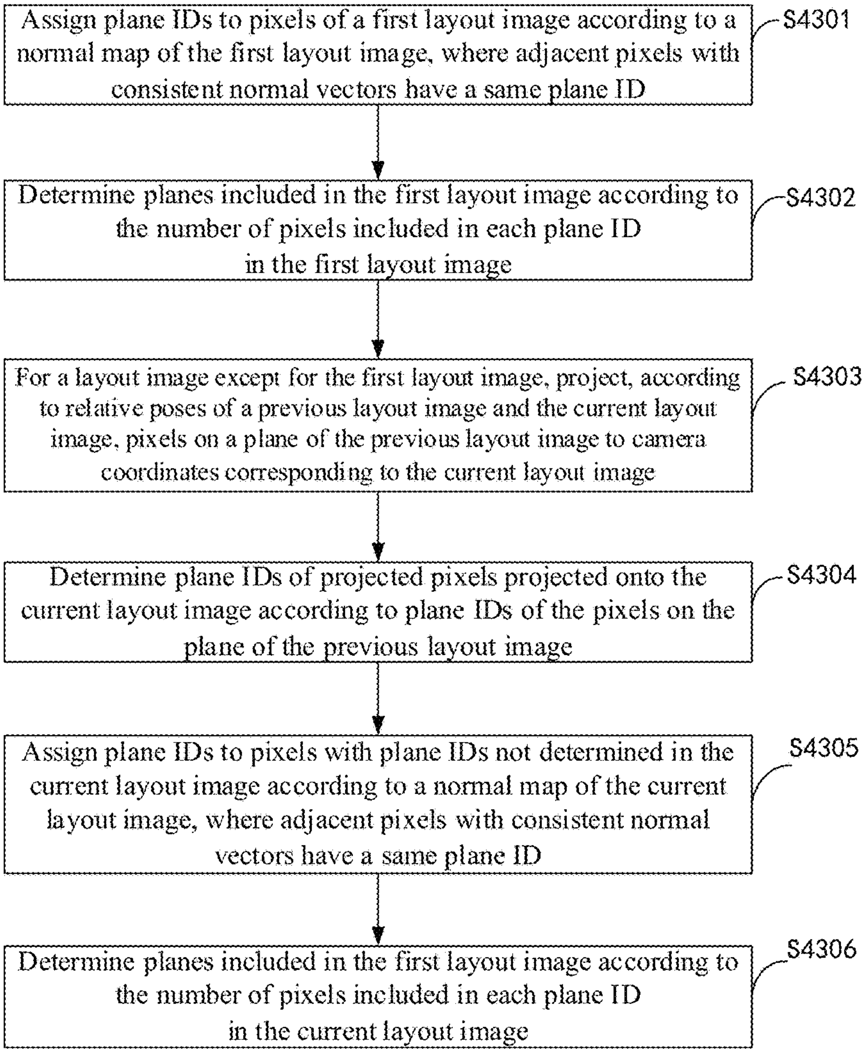
FIG. 24 is a flowchart of a plane aggregation method according to Example 3 of the disclosure.

FIG. 24 is a flowchart of a plane aggregation method according to Example 3 of the disclosure. The flowchart is used for describing a specific flow of plane aggregation in Example 1 and in FIG. 22. With reference to FIG. 24, the method provided in this embodiment includes the following steps.

S4301, assign plane IDs to pixels of a first layout image according to a normal map of the first layout image, where adjacent pixels with consistent normal vectors have a same plane ID.

When plane IDs are assigned to pixels, in case that normal vectors of adjacent pixels coincide, adjacent pixels can be considered to belong to a same plane, and pixels belonging to the same plane are assigned a same plane ID. Normal vectors of adjacent pixels coincide can be understood as that an absolute value of a difference between normal vectors of adjacent pixels is less than a preset threshold.

Illustratively, plane IDs are assigned to pixels in the first layout image in the following manners. The pixels in the first layout image are accessed in a preset access order, and a next pixel is accessed in case that the currently accessed pixel has a plane ID. Whether a normal vector of the current accessed pixel is consistent with a normal vector of an adjacent pixel is determined in case that the current accessed pixel has no plane ID; the plane ID of the current accessed pixel is set as a plane ID of the adjacent pixel in case that the normal vector of the current accessed pixel is consistent with the normal vector of the adjacent pixel and that the adjacent pixel has a plane ID; and alternatively, a new plane ID is assigned to the currently accessed pixel in case that the normal vector of the currently accessed pixel is consistent with the normal vector of the adjacent pixel and that the adjacent pixel has no plane ID. Anew plane ID is assigned to the current accessed pixel in case that the normal vector of the current accessed pixel is inconsistent with the normal vector of the adjacent pixel.

Illustratively, the access order may be from upper left to lower right. Certainly, the access order may also be from upper right to lower left, which is not limited in the example. For a pixel not located on an edge, the pixel has 8 adjacent pixels which are located at an upper side, a lower side, a left side, a right side, an upper right side, a lower right side, an upper left side and a lower left side of the pixel. For a pixel located on an edge, the number of adjacent pixels is less than 8. A pixel located on an edge and a pixel not located on an edge refer to whether the pixel in the layout image is located at an edge of the layout image.

With the access order from the upper left to the lower right of the first layout image as an example, for a first pixel on an upper left side of the first layout image, the first pixel has no plane ID, and adjacent pixels have no plane ID. A plane ID is assigned to the first pixel. A second pixel is accessed. Adjacent pixels of the second pixel include the first pixel, and it is determined whether normal vectors of the second pixel and the first pixel are consistent. In case that the normal vectors of the second pixel and the first pixel are consistent, a plane ID of the second pixel is set to be the plane ID of the first pixel. In case that the normal vectors of the second pixel and the first pixel are inconsistent, a new plane ID is assigned to the second pixel, that is, the plane ID of the second pixel is inconsistent with the plane ID of the first pixel. A third pixel is then accessed. The second pixel is an adjacent pixel of the third pixel. A method for assigning a plane ID to the third pixel refers to a method for assigning a plane ID to the second pixel, and so on. After plane IDs are assigned to pixels in a first row, a plane ID is assigned from a first left pixel in the second row. After all pixels of the first layout image are accessed once, each pixel in the first layout image is assigned a plane ID.

A process of assigning plane IDs to pixels of the first layout image is similar to a plane growing process. Plane growing can be understood as extending a plane, that is, gradually expanding the plane from a pixel according to relations between normal vectors of pixels, or generating a new plane.

S4302, determine planes included in the first layout image according to the number of pixels included in each plane ID in the first layout image.

The number of pixels included in each plane ID in the first layout image may be different. Some planes include more pixels, and some planes include less pixels.

In an illustrative manner, in case that the number of pixels included in the plane ID is greater than or equal to a preset number threshold, it is considered that the pixels included in the plane ID represent a plane in a physical world, and it is determined that the plane corresponding to the plane ID is a plane of the first layout image. In case that the number of pixels included in the plane ID is less than the number threshold, it is determined that the plane corresponding to the plane ID is not a plane of the first layout image.

In another illustrative manner, in case that a ratio of the number of pixels included in the plane ID to a total number of pixels is greater than or equal to a preset first ratio, it is determined that the plane corresponding to the plane ID is a plane of the first layout image. The total number of pixels refers to the total number of pixels in the layout image. In case that the ratio of the number of pixels included in the plane ID to the total number of pixels is less than the first ratio, it is determined that the plane corresponding to the plane ID is not a plane of the first layout image.

S4303, for a layout image except for the first layout image, project, according to relative poses of a previous layout image and the current layout image, pixels on a plane of the previous layout image to camera coordinates corresponding to the current layout image.

The relative poses of the previous layout image and the current layout image includes a rotation matrix and a translation matrix of the current layout image relative to the previous layout image. The rotation matrix and the translation matrix of the current layout image relative to the previous layout image are a rotation matrix and a translation matrix of the current layout image relative to the previous layout image in the camera coordinate system. The rotation matrix and the translation matrix of the current layout image relative to the previous layout image may be obtained by converting camera pose information of the current layout image and the previous layout image.

According to the relative poses, a pixel on a plane of the previous layout image is projected onto camera coordinates corresponding to the current layout image. The pixel on the plane of the previous layout image are also referred to as a plane point. Since the first layout image does not have a previous layout image, the operation is not performed on the first layout image.

Through projection, pixel coordinates of a projected pixel obtained after the pixel on the plane of the previous layout image is projected onto the current layout image can be obtained. The projected pixel is also referred to as a projection point, that is, a projection point of the plane point on the previous layout image onto the current layout image.

Illustratively, the coordinates of the projected pixel are determined by means of the following equation:

$$px_i^c = \pi\left(R_p^c \pi^{-1}(px_i^p) D^p(px_i^p) + t_p^c\right)$$

where $$R_p^c$$

and $$t_p^c$$

represent a rotation matrix and a translation matrix of the current layout image relative to the previous layout image respectively, π represents a projection function of a camera, $$px_i^p$$

represents pixel coordinates of an ith pixel of the previous layout image, and $$px_i^c$$

represents pixel coordinates of a projected pixel of $$px_i^p$$

in the current layout image.

S4304, determine plane IDs of projected pixels projected onto the current layout image according to plane IDs of the pixels on the plane of the previous layout image.

Illustratively, an estimated depth map and an estimated normal map of the current layout image are determined according to the relative poses of the previous layout image and the current layout image, and a depth map and a normal map of the previous layout image; the depth map and the normal map of the current layout image is compared with the estimated depth map and the estimated normal map of the current layout image, and pairs of projected pixels with similar depths and normal vectors are determined, where the pair of projected pixels is composed of a projected pixel and a corresponding pixel of the previous layout image; and plane IDs of projected pixels in a target plane with a number of pairs of projected pixels greater than or equal to a first threshold are set to be plane IDs of corresponding pixels in the previous layout image.

Alternatively, an estimated depth and an estimated normal vector value of the projected pixel of the current layout image are calculated using the following equations:

$$\hat{d}_i^c = \left(R_p^c \pi^{-1}(px_i^p) D^p(px_i^p) + t_p^c\right) \cdot z;$$

$$\hat{n}_i^c = R_p^c n^p(px_i^p);$$

where $$R_p^c$$

and $$t_p^c$$

represent a rotation matrix and a translation matrix of the current layout image relative to the previous layout image respectively, π represents a projection function of a camera, $$px_i^p$$

represents pixel coordinates of an ith pixel of the previous layout image, $$px_i^c$$

represents pixel coordinates of a projected pixel of $$px_i^p$$

in the current layout image, $$\hat{d}_i^c$$

represents the estimated depth of the projected pixel, $D^p(\cdot)$ represents a depth of the pixel of the previous layout image, $n^p(\cdot)$ represents a normal vector of the pixel of the previous layout image, $$\hat{n}_i^c$$

represents the estimated normal vector value of the projected pixel, and z represents an z-coordinate value of the pixel. The z-coordinate value of the pixel is the depth of the pixel.

The depth map and the normal map corresponding to the current layout image may be considered to provide observed depths and observed normal vectors respectively. The estimated depth map and the estimated normal map corresponding to the current layout image provide estimated depths and estimated normal vectors respectively. For each projected pixel in the current layout image, an estimated depth of the projected pixel is compared with an observed depth, and an estimated normal vector of the projected pixel is compared with an observed normal vector, and a pair of projected pixels having similar depths and normal vectors are determined according to a comparison result. The estimated depth of the projected pixel refers to a value of the projected pixel in the estimated depth map, and the observed depth of the projected pixel refers to a value of the projected pixel in the depth map of the current layout image. The estimated normal vector of the projected pixel refers to a value of the projected pixel in the estimated normal vector map, and the observed normal vector of the projected pixel refers to a value of the projected pixel in the normal map of the current layout image.

Illustratively, it is determined that the projected pixel and the corresponding pixel of the previous layout image are a pair of projected pixels in case that a normal vector and a depth of the projected pixel of the current layout image satisfy $$|\hat{d}_i^c - D^c(px_i^c)| < \delta_d \text{ and } |\hat{n}_i^c - n^c(px_i^c)| < \delta_c.$$

$D^c(\cdot)$ represents the depth of the projected pixel $$px_i^c$$

in the current layout image, that is, the observed value of the depth, $n^c(\cdot)$ represents the normal vector of the projected pixel $$px_i^c$$

in the current layout image, that is, the observed value of the normal vector, $\delta_d$ represents a preset depth threshold, $\delta_c$ represents a preset normal vector size threshold, $$\hat{d}_i^c$$

represents the estimated depth of the projected pixel $$px_i^c,$$

and $$\hat{n}_i^c$$

represents the estimated normal vector of the projected pixel $$px_i^c.$$

For the projected pixel $$px_i^c, |\hat{d}_i^c - D^c(px_i^c)| < \delta_d$$

indicates that the observed depth and the estimated depth of the projected pixel are similar or consistent, and $$|\hat{n}_i^c - n^c(px_i^c)| < \delta_c$$

indicates that the observed normal vector and the estimated normal vector of the projected pixel are similar or consistent. In case that the observed depth and the estimated depth as well as the observed normal vector and the estimated normal vector of the projected pixel are similar, it can be considered that a projection result of the projected pixel is accurate, that is to say, the projected pixel is the same point as a pixel on the plane of the previous layout image corresponding to the projected pixel, that is, they correspond a same point in a real environment. Therefore, a plane to which the projected pixel belongs is the same as a plane to which the pixel corresponding to the projected pixel on the previous layout image belongs.

After the pairs of projected pixels are determined, the number of pairs of projected pixel in each plane of the previous layout image is determined, and the number of pairs of projected pixels in each plane is less than or equal to the number of pixels in each plane. A target plane in which the number of pairs of projected pixels is greater than or equal to a first threshold is determined from the planes of the previous layout image. A plane ID of a projected pixel of each pair of projected pixels in the target plane is set to be the plane ID of the corresponding pixel in the previous layout image.

In the example, when the number of the pairs of projected pixels on the same plane is greater than or equal to the first threshold, it is considered that corresponding pixels of the pairs of projected pixels in the current layout image and the previous layout image represent the same plane, that is, IDs of corresponding pixels of the pairs of projected pixels in the target planes in the two images are set to be the same.

In case that the number of the pairs of projected pixels on the same plane is less than the first threshold, it is considered that the corresponding pixels of the pairs of projected pixels in the current layout image and the previous layout image do not represent a same plane, and the pixels corresponding to the pairs of projected pixels are not processed.

S4305, assign plane IDs to pixels with plane IDs not determined in the current layout image according to a normal map of the current layout image, where adjacent pixels with consistent normal vectors have a same plane ID.

In S4304, the same ID is set for the same plane in the current layout image according to the plane ID of the previous layout image. Some pixels in the current layout image are not assigned plane IDs. These pixels that are not assigned plane IDs may belong to a new plane, or may be stray pixels that do not belong to any plane. The new plane is a plane added relative to the previous layout image.

Illustratively, assigning plane IDs to pixels with plane IDs not determined in the current layout image includes: access the pixels of the current layout image in a preset access order, and access a next pixel in case that a currently accessed pixel has a plane ID; determine whether a normal vector of the current accessed pixel is consistent with a normal vector of an adjacent pixel in case that the current accessed pixel has no plane ID; set the plane ID of the current accessed pixel as a plane ID of the adjacent pixel in case that the normal vector of the current accessed pixel is consistent with the normal vector of the adjacent pixel and that the adjacent pixel has a plane ID; alternatively, assign a new plane ID to the currently accessed pixel in case that the normal vector of the currently accessed pixel is consistent with the normal vector of the adjacent pixel and that the adjacent pixel has no plane ID; and alternatively, assign a new plane ID to the current accessed pixel in case that the normal vector of the current accessed pixel is inconsistent with the normal vector of the adjacent pixel.

A specific implementation mode of the step is achieved with reference to the description of S4301, that is, is similar to the mode of assigning plane IDs to the current layout image and the first layout image. A difference lies in that all pixels of the first layout image do not have plane IDs before plane IDs are assigned according to the assignment mode, and some pixels of the current layout image already have plane IDs before plane IDs are assigned according to the assignment mode.

S4306, determine planes included in the first layout image according to the number of pixels included in each plane ID in the current layout image.

A specific implementation mode of the step is achieved with reference to the description of S4302, which will not be repeated herein.

In the example, plane IDs are assigned to pixels in the first layout image according to the normal map of the first layout image. For a layout image except for the first layout image, according to relative poses of a previous layout image and the current layout image, pixels on a plane of the previous layout image are projected onto camera coordinates corresponding to the current layout image. Plane IDs of projected pixels projected onto the current layout image are determined according to plane IDs of the pixels on the plane of the previous layout image. Plane IDs are assigned to pixels with plane IDs not determined in the current layout image according to the normal map of the current layout image, where when plane IDs are assigned to each image, the plane IDs of adjacent pixels with consistent normal vectors are the same. After plane IDs are assigned to pixels in the each layout image, planes included in the layout image are determined according to a number of pixels included in each plane ID in the layout image, such that plane aggregation is completed, and a plane obtained from aggregation is more accurate.

In some examples, when plane information of each layout image is determined by combining a plane calibration method and a plane aggregation method, an initial plane of the layout image may be determined using the plane calibration method first, then a normal map of the layout image is generated according to a depth map of the layout image, plane IDs are assigned to pixels with plane IDs not determined in the layout image according to the normal map of the layout image, that is, plane IDs are assigned to planes except for the initial plane in the layout image. Reference is made to a manner of assigning plane IDs for the current layout image in Example 3 for a specific assignment manner, which will not be repeated herein.

Figure 25:
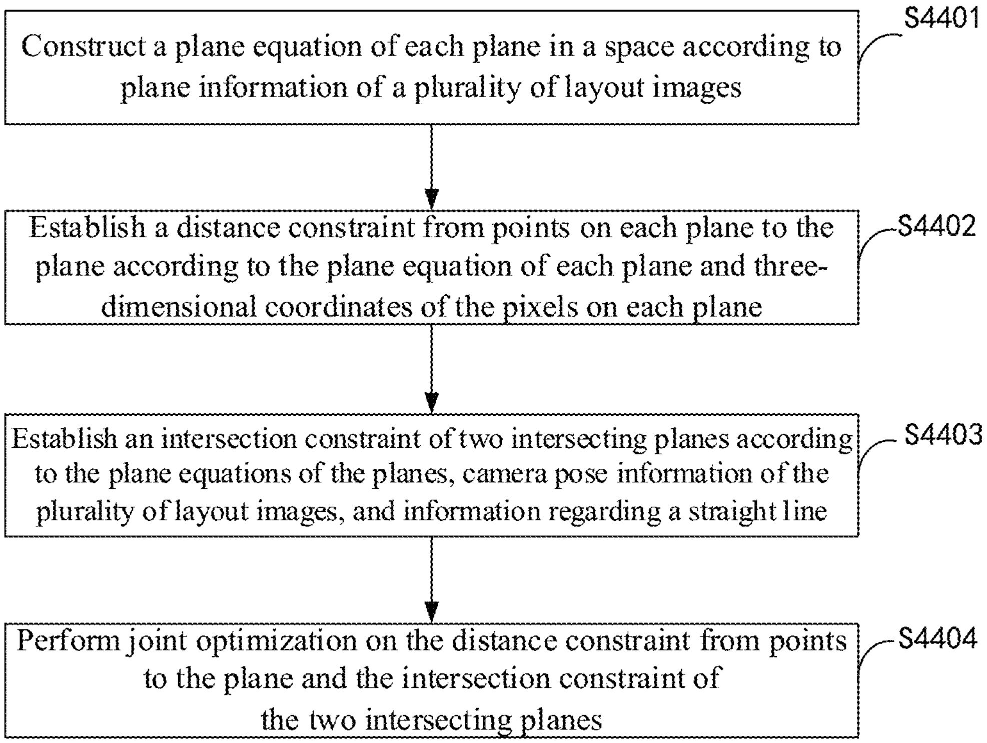
FIG. 25 is a flowchart of a joint optimization method according to Example 4 of the disclosure.

Based on Examples 1-3, Example 4 of the disclosure provides a joint optimization method, configured to constrain and perform joint optimization for the planes and straight line in the space according to the plane information of the plurality of layout images, the three-dimensional coordinates of the pixels on the planes, information regarding the straight line, and the camera pose information. FIG. 25 is a flowchart of a joint optimization method according to Example 4 of the disclosure. As shown in FIG. 25, the method provided in the example includes the following steps.

S4401, construct a plane equation of each plane in a space according to plane information of a plurality of layout images After spatial scan is completed, the plane equations of all planes in the space are constructed. The space includes a plurality of planes. For example, a plane equation of a kth plane is expressed as:

$$a_k x + b_k y + c_k z + d_k = 0, \text{ where } a_k^2 + b_k^2 + c_k^2 = 1.$$

In the step, according to the plane information of the plurality of layout images, that is, the plane IDs to which the pixels of the plurality of layout image belongs, planes exist in the space are determined, and the plane equation of each plane in the space is constructed. Pixels with a same plane ID in the plurality of layout images belong to one plane. For the kth plane, pixels in the plane may be located in one or more layout images, and for different planes, pixels in the planes may be located in different layout images. For example, pixels of plane 1 are located in layout images 1-3, and pixels of plane 2 are located in layout images 3-6.

S4402, establish a distance constraint from points on each plane to the plane according to the plane equation of each plane and three-dimensional coordinates of the pixels on each plane The three-dimensional coordinates of the pixels on each plane (that is, points on the plane) are three-dimensional coordinates of the points on the plane in the world coordinate system. Illustratively, the distance constraint from a point on the kth plane to the plane is as follows:

$$e_{k_i}^k = \left(a_k P_{k_i}^w \cdot x + b_k P_{k_i}^w \cdot y + c_k P_{k_i}^w \cdot z + d_k\right)^2.$$

where $$P_{k_i}^w$$

is three-dimensional coordinates of an ith point on the kth plane, and $$e_{k_i}^k$$

is a distance constraint from point $$P_{k_i}^w$$

on the kth plane to the plane.

S4403, establish an intersection constraint of two intersecting planes according to the plane equations of the planes, camera pose information of the plurality of layout images, and information regarding a straight line.

The information regarding a straight line on the plane may include a straight line direction of each straight line on the plane and IDs of two intersecting planes used for extracting the straight line. Alternatively, the information regarding a straight line further includes a position of the straight line. The position of the straight line may be represented by three-dimensional coordinates of two endpoints of the straight line.

The intersection constraint may be a constraint between a projection line of an intersection line of the two intersecting planes in the gray-scale image and the straight lines extracted from the two intersecting planes, and the projection line of the intersection line of the two intersecting planes is obtained based on projection according to the camera pose information.

Illustratively, for a straight line $L_p$ extracted in a pth layout image, an intersection constraint of two intersecting planes k and l used for extracting the straight line $L_p$ is as follows:

$$e_p^{kl} = \left(\pi\left(R_p^w\left(\begin{pmatrix} a_k \\ b_k \\ c_k \end{pmatrix} \times \begin{pmatrix} a_l \\ b_l \\ c_l \end{pmatrix}\right)\right) - \ell_p\right)$$

where $$R_p^w$$

represents a rotation matrix of the pth layout image relative to a world coordinate system, π represents the projection function of a camera, and $\ell_p$ represents a direction vector of the straight line $L_p$.

$$R_p^w$$

is included in a camera pose of the pth layout image, the camera pose of the pth layout image includes a rotation matrix of the pth layout image relative to the world coordinate system, and may further include a translation matrix of the pth layout image relative to the world coordinate system.

The intersection constraint $$e_p^{kl}$$

in the above equation uses a difference between a direction vector of the straight line $L_p$ and a direction of the projection of the intersection line of the two intersecting planes k and l. Alternatively, in other examples of the disclosure, the intersection constraint may further use a difference between a position of the straight line $L_p$ and a position of the projection of the intersection line of the two intersecting planes k and l, or use a difference between a pose (including the position and direction of the straight line) of the straight line $L_p$ and a pose of the projection of the intersection line of the two intersecting planes k and l.

When the intersection constraint is performed by using the position and pose of the straight line $L_p$ and the position and pose of the projection of the intersection line of two intersecting planes k and l, position transformation needs to be performed by using the translation matrix of the pth layout image relative to the world coordinate system.

S4404, perform joint optimization on the distance constraint from points to the plane and the intersection constraint of the two intersecting planes.

Illustratively, the joint optimization is as follows:

$$E = \sum_{i,k} e_{k_i}^k + \sum_{p,k,l} e_p^{kl},$$

subject to $$\forall\, k,\ a_k^2 + b_k^2 + c_k^2 = 1.$$

The joint optimization equation is solved, that is, three-dimensional coordinates of points on each plane are brought into joint optimization for solution, and values of parameters $a_k$, $b_k$, $c_k$ and $d_k$ of the kth plane are obtained, such that the equation of the kth plane is obtained. The plane equations of all planes are obtained by solving in turn.

Alternatively, during joint optimization solving, when E is solved to a minimum value, values of $a_k$, $b_k$, $c_k$ and $d_k$ of $$\forall\, k,\ a_k^2 + b_k^2 + c_k^2 = 1$$

are satisfied.

In the example, a distance constraint from points on each plane to the plane is established according to the plane equation of each plane and three-dimensional coordinates of pixels on the plane. According to the plane equation of each plane, the camera pose information of the plurality of layout images, and the information regarding the straight line, the intersection constraint between the projection line of the intersection line of the two intersecting planes in the gray-scale image and the straight lines extracted from the two intersecting planes is established, the distance constraint and the intersection constraint of each plane are subject to joint optimization, parameters of each plane are solved, and the plane equation of each plane is obtained, such that the plane equation of each plane obtained by solving is more accurate.

Figure 26:
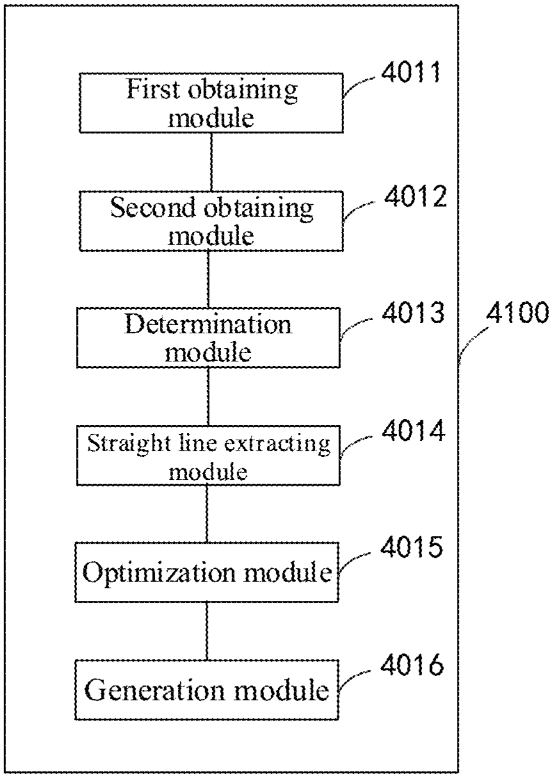
FIG. 26 is a schematic structural diagram of an apparatus for generating a spatial layout according to Example 5 of the disclosure.

To facilitate better implementation of the method for generating a spatial layout of the example of the disclosure, an example of the disclosure further provides an apparatus for generating a spatial layout. FIG. 26 is a schematic structural diagram of an apparatus for generating a spatial layout provided in Example 5 of the disclosure. As shown in FIG. 26, the apparatus 4100 for generating a spatial layout may include: a first obtaining module 4011 configured to obtain depth maps, gray-scale images and camera pose information of a plurality of layout images of a space; a second obtaining module 4012 configured to obtain plane information of each layout image; a determination module 4013 configured to determine three-dimensional coordinates of pixels on a plane of each layout image according to a depth map and camera pose information of each layout image; a straight line extracting module 4014 configured to extract a straight line from a gray-scale image corresponding to each layout image according to the plane information of the layout image, and obtain the straight lines of each layout image; an optimization module 4015 configured to constrain and perform joint optimization for the planes and the straight line in the space according to the plane information of the plurality of layout images, the three-dimensional coordinates of the pixels on the planes, information regarding the straight line, and the camera pose information; and a generation module 4016 configured to solve the joint optimization with constraints, and generating the spatial layout according to an optimization result.

In some examples, the second obtaining module 4012 is specifically configured to determine the plane information of each layout image through a plane calibration method and/or a plane aggregation method.

In some examples, the second obtaining module 4012 is specifically configured to: determine, according to a calibration box in each layout image, pixels included in the calibration box, and assigning a same plane identification (ID) to the pixels included in the calibration box, where the pixels in the calibration box belong to one plane, the calibration box is formed by using ray calibration for an outline of an object in the space, and each layout image is captured after the outline of the object in the space is calibrated under the ray calibration.

In some examples, the second obtaining module 4012 is specifically configured to: generate a normal map of each layout image according to the depth map of each layout image; and determine an identification (ID) of the plane of each layout image according to the normal map of each layout image.

In some examples, the second obtaining module 4012 is specifically configured to: assign plane identification IDs to pixels of a first layout image according to a normal map of the first layout image, where adjacent pixels with consistent normal vectors have a same plane ID; determine planes included in the first layout image according to the number of pixels included in each plane ID in the first layout image; for a layout image except for the first layout image, project, according to relative poses of a previous layout image and the current layout image, pixels on a plane of the previous layout image onto camera coordinates corresponding to the current layout image; determine plane IDs of projected pixels projected to the current layout image according to plane IDs of the pixels on the plane of the previous layout image; assigning plane IDs to pixels with plane IDs not determined in the current layout image according to a normal map of the current layout image, where adjacent pixels with consistent normal vectors have a same plane ID; and determine planes included in the first layout image according to the number of pixels included in each plane ID in the current layout image.

In some examples, the second obtaining module 4012 is specifically configured to: determine an estimated depth map and an estimated normal map of the current layout image according to the relative poses of the previous layout image and the current layout image, and a depth map and a normal map of the previous layout image; compare the depth map and the normal map of the current layout image with the estimated depth map and the estimated normal map of the current layout image, and determine pairs of projected pixels with similar depths and normal vectors, where the pair of projected pixels is composed of a projected pixel and a corresponding pixel of the previous layout image; and set plane IDs of projected pixels in a target plane with a number of pairs of projected pixels greater than or equal to a first threshold to be plane IDs of corresponding pixels in the previous layout image.

In some examples, the second obtaining module 12 is specifically configured to: determine pixel coordinates of projected pixels formed by projecting the pixels on the plane of the previous layout image onto the camera coordinates corresponding to the current layout image using the following equation:

$$px_i^c = \pi\left(R_p^c \pi^{-1}(px_i^p) D^p(px_i^p) + t_p^c\right);$$

where $R_p^c$ and $t_p^c$ represent a rotation matrix and a translation matrix of the current layout image relative to the previous layout image respectively, π represents a projection function of a camera, $px_i^p$ represents pixel coordinates of an ith pixel of the previous layout image, and $px_i^c$ represents pixel coordinates of a projected pixel of $px_i^p$ in the current layout image; and calculate an estimated depth and an estimated normal vector value of the projected pixel of the current layout image by using the following equations:

$$\hat{d_i^c} = \left(R_p^c \pi^{-1}(px_i^p) D^p(px_i^p) + t_p^c\right) \cdot z;$$

$$\hat{n_i^c} = R_p^c n^p(px_i^p);$$

where $$\hat{d_i^c}$$

represents the estimated depth of the projected pixel, $D^p(\cdot)$ represents a depth of the pixel of the previous layout image, $n^p(\cdot)$ represents a normal vector of the pixel of the previous layout image, $$\hat{n_i^c}$$

represents the estimated normal vector value of the projected pixel, and z represents an z-coordinate value of the pixel.

In some examples, the second obtaining module 4012 is specifically configured to:

determine that the projected pixel and the corresponding pixel of the previous layout image are a pair of projected pixels in case that a normal vector and a depth of the projected pixel of the current layout image satisfy $$\left|\hat{d_i^c} - D^c(px_i^c)\right| < \delta_d \text{ and } \left|\hat{n_i^c} - n^c(px_i^c)\right| < \delta_c;$$

where $D^c(\cdot)$ represents the depth of the projected pixel $$px_i^c$$

of the current layout image, $n^c(\cdot)$ represents the normal vector of the projection pixel $$px_i^c$$

of the current layout image, $\delta_d$ represents a preset depth threshold, and $\delta_c$ represents a preset normal vector threshold.

In some examples, the second obtaining module 4012 is specifically configured to: determine a pixel block with a preset size by taking each pixel in the depth map as a central point; determine a three-dimensional coordinate value of each pixel in the pixel block under a camera coordinate system according to pixel coordinates and a depth of each pixel in the pixel block; and construct a structure matrix for the pixel block according to the three-dimensional coordinate value of each pixel in the pixel block under the camera coordinate system, performing singular value decomposition (SVD) on the structure matrix, obtain an eigenvector corresponding to a minimum singular value, and determine the eigenvector corresponding to the minimum singular value as a normal vector of the central point of the pixel block.

In some examples, the second obtaining module 4012 is specifically configured to: determine the three-dimensional coordinate value of each pixel in the pixel block under the camera coordinate system using the following formula:

$$P_i = \left(\pi^{-1}(px_i)\right) D(px_i);$$

where $P_i$ represents a three-dimensional coordinate value of an ith pixel in the pixel block, $\pi$ represents a projection function of a camera, $px_i$ represents a pixel coordinate of the ith pixel in the pixel block, and $D(\cdot)$ represents a depth of the pixel.

In some examples, the second obtaining module 4012 is specifically configured to: obtain the structure matrix H as:

$$H = \sum_{j=1, j\neq 1}^{n} (P_i - P_j)(P_i - P_j)^T$$

where $P_i$ denotes the central point of the pixel block, $P_j$ denotes other pixels in the pixel block, and n is the number of pixels in the pixel block.

In some examples, the second obtaining module 4012 is specifically configured to: access the pixels of the first layout image in a preset accessing order, and accessing a next pixel in case that a currently accessed pixel has a plane ID; determine whether a normal vector of the current accessed pixel is consistent with a normal vector of an adjacent pixel in case that the current accessed pixel has no plane ID; set the plane ID of the current accessed pixel as a plane ID of the adjacent pixel in case that the normal vector of the current accessed pixel is consistent with the normal vector of the adjacent pixel and that the adjacent pixel has a plane ID; alternatively, assign a new plane ID to the currently accessed pixel in case that the normal vector of the currently accessed pixel is consistent with the normal vector of the adjacent pixel and that the adjacent pixel has no plane ID; and alternatively, assign a new plane ID to the current accessed pixel in case that the normal vector of the current accessed pixel is inconsistent with the normal vector of the adjacent pixel.

In some examples, the second obtaining module 4012 is specifically configured to: access the pixels of the current layout image in a preset access order, and access a next pixel in case that a currently accessed pixel has a plane ID; determine whether a normal vector of the current accessed pixel is consistent with a normal vector of an adjacent pixel in case that the current accessed pixel has no plane ID; set the plane ID of the current accessed pixel as a plane ID of the adjacent pixel in case that the normal vector of the current accessed pixel is consistent with the normal vector of the adjacent pixel and that the adjacent pixel has a plane ID; alternatively, assign a new plane ID to the currently accessed pixel in case that the normal vector of the currently accessed pixel is consistent with the normal vector of the adjacent pixel and that the adjacent pixel has no plane ID; and alternatively, assign a new plane ID to the current accessed pixel in case that the normal vector of the current accessed pixel is inconsistent with the normal vector of the adjacent pixel.

In some examples, the straight line extracting module 4014 is specifically configured to: determine three-dimensional coordinate values of pixels of each layout image in the camera coordinate system according to pixel coordinates and depths of each layout image; obtain a plane equation of each layout image by plane fitting according to the plane information of each layout image and the three-dimensional coordinate values of the pixels of the image under the camera coordinate system; obtain an intersection line by intersecting planes in each layout image in pairs, and project the intersection line onto the gray-scale image corresponding to each layout image, to obtain a prior straight line corresponding to the intersection line; and determine the straight line on each layout image according to the prior straight line.

In some examples, the straight line extracting module 4014 is specifically configured to: extend two sides of the prior straight line by a preset number of pixels in a perpendicular direction of the prior straight line separately, and obtain a reference image block surrounding the prior straight line; calculate a gradient map of the reference image block; calculate an inner product of a gradient direction of each pixel in the reference image block and a direction of the prior straight line; determine target pixels having an inner product greater than a second threshold from the reference image block; and perform straight line fitting on the target pixels in the reference image block, and obtain the straight line on each layout image.

In some examples, the straight line extracting module 4014 is specifically configured to perform straight line fitting on the target pixels in the reference image block using a random sample consensus (RANSAC) method.

In some examples, the optimization module 4015 is specifically configured to: construct a plane equation of each plane in the space according to the plane information of the plurality of layout images; establish a distance constraint from points on each plane to the plane according to the plane equation of each plane and the three-dimensional coordinates of the pixels on each plane; establish an intersection constraint of two intersecting planes according to the plane equations of the planes, the camera pose information of the plurality of layout images and the information regarding the straight line, where the information regarding the straight line includes a straight line direction, a straight line position, and IDs of the two intersecting planes used for extracting the straight line, and the intersection constraint is a constraint between a projection line of an intersection line of the two intersecting planes in the gray-scale image and the straight lines extracted from the two intersecting planes, and the projection line of the intersection line of the two intersecting planes is obtained based on projection according to the camera pose information; and perform joint optimization on the distance constraint from points to the plane and the intersection constraint of the two intersecting planes.

In some examples, a plane equation of a kth plane is as follows:

$$a_k x + b_k y + c_k z + d_k = 0, \text{ where } a_k^2 + b_k^2 + c_k^2 = 1;$$

A distance constraint from points on the kth plane to the plane is as follows:

$$e_{ki}^k = (a_k P_k^w \cdot x + b_k P_k^w \cdot y + c_k P_k^w \cdot z + d_k)^2;$$

where $$P_{k_i}^w$$

is three-dimensional coordinates of an ith point on the kth plane;

For a straight line $L_p$ extracted in a pth layout image, an intersection constraint of two intersecting planes k and l used for extracting the straight line $L_p$ is as follows:

$$e_p^{kl} = \left(\pi\left(R_p^w\left(\begin{pmatrix} a_k \\ b_k \\ c_k \end{pmatrix} \times \begin{pmatrix} a_l \\ b_l \\ c_l \end{pmatrix}\right)\right) - \ell_p\right)$$

where $$R_p^w$$

represents a rotation matrix of the pth layout image relative to a world coordinate system, $\pi$ represents the projection function of a camera, and $\ell_p$ represents a direction vector of the straight line $L_p$; and the joint optimization is as follows:

$$E = \sum_{i,k} e_{k_i}^k + \sum_{p,k,l} e_p^{kl},$$

subject to $$\forall k, a_k^2 + b_k^2 + c_k^2 = 1.$$

It should be understood that the apparatus example and the method example may correspond to each other, and reference may be made to the method example for similar descriptions, which will not be repeated herein to avoid repetition.

An apparatus 4100 of the example of the disclosure is described above in conjunction with the accompanying drawings from the perspective of functional modules. It should be understood that the functional modules may be implemented in a form of hardware, may be implemented in a form of a software instruction, or may also be implemented in a form of combination of hardware and software modules. Specifically, each step of the method example in the examples of the disclosure may be completed by an integrated logic circuit in hardware and/or instructions in a software form in a processor. The steps of the methods disclosed in conjunction with the example of the disclosure may be directly completed by a hardware coding processor, or completed by a combination of hardware and software modules in a coding processor. Alternatively, the software module may be located in a random access memory, a flash memory, a read-only memory, a programmable read-only memory, an electrically erasable programmable memory, a register, and other storage media well known in the art. The storage medium is located in the memory, and the processor reads information from the memory and completes the steps of the method example described above in conjunction with its hardware.

Figure 27:
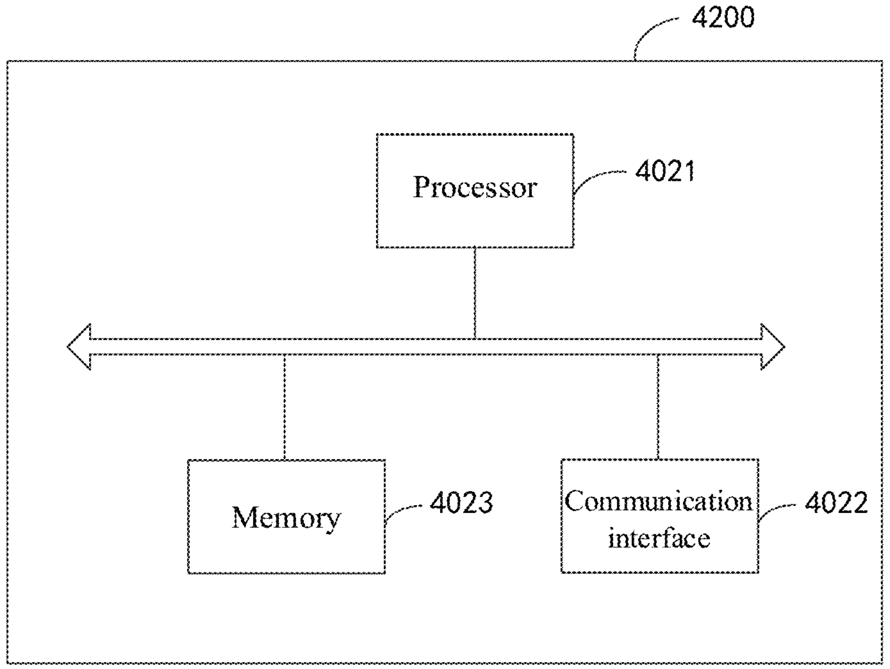
FIG. 27 is a schematic structural diagram of an electronic device according to Example 6 of the disclosure.

The examples of the disclosure further provide an electronic device. FIG. 27 is a schematic structural diagram of an electronic device according to Example 6 of the disclosure. As shown in FIG. 27, the electronic device 4200 may include: a memory 4021, a processor 4022, and a dual-camera module 4023. The memory 4021 is configured to store a computer program and transmit a program code to the processor 4022. In other words, the processor 4022 may execute the computer program from the memory 4021, to perform the method in the example of the disclosure. The dual-camera module 4023 is configured to capture images and send the images to the memory 4021 and the processor 4022 for processing.

For example, the processor 4022 may be configured to execute the method example described above according to an instruction in the computer program.

In some examples of the disclosure, the processor 4022 may include, but is not limited to: a general-purpose processor, a digital signal processor (DSP), an application specific integrated circuit (ASIC), a field programmable gate array (FPGA), other programmable logic devices, a discrete gate, a transistor logic device, a discrete hardware component, etc.

In some examples of the disclosure, the memory 4021 includes, but is not limited to: a volatile memory and/or a nonvolatile memory. A read-only memory (ROM), a programmable ROM (PROM), an erasable PROM (EPROM), an electrically EPROM (EEPROM), or a flash memory may be used as a nonvolatile memory. A random access memory (RAM) may be used as a volatile memory, which serves as an external cache. By means of illustrative but not restrictive description, various forms of RAMs are available, for example, a static RAM (SRAM), a dynamic RAM (DRAM), a synchronous DRAM (SDRAM), a double data rate SDRAM (DDRSDRAM), an enhanced SDRAM (ESDRAM), a synch link DRAM (SLDRAM), and a direct rambus RAM (DRRAM).

In some examples of the disclosure, the computer program may be divided into one or more modules. The one or more modules are stored in the memory 4021 and are executed by the processor 4022, to complete the method provided in the disclosure. The one or more modules may be a series of instruction segments of computer program that may implement specific functions, where the instruction segments are configured to describe an execution process of the computer program in the electronic device.

As shown in FIG. 27, the electronic device 4200 may further include a transceiver connected to the processor 4022 or the memory 4021.

The processor 4022 may control the transceiver to communicate with other devices, specifically, to send information or data to other devices, or to receive information or data sent from other devices. The transceiver 4023 may include a transmitter and a receiver. The transceiver may further include antennas, one or more antennas may be provided.

It can be understood that although not shown in FIG. 27, the electronic device 4200 may further include a WiFi module, a positioning module, a Bluetooth module, a display, a controller, etc., which will not be repeated herein.

It should be understood that various assemblies in the electronic device are connected together by means of a bus system. The bus system includes a data bus, and further includes a power bus, a control bus, and a status signal bus.

The disclosure further provides a computer storage medium, storing a computer program. The computer program causes, when executed by a computer, the computer to perform the method of the above method example. Alternatively, an example of the disclosure further provides a computer program product containing an instruction. The instruction causes, when executed by a computer, the computer to perform the method of the above method example.

The disclosure further provides a computer program product. The computer program product includes a computer program. The computer program is stored in a computer-readable storage medium. A processor of the electronic device reads the computer program from the computer-readable storage medium, and executes the computer program to causes the electronic device to perform a corresponding flow of the method for generating a spatial layout in the examples of the disclosure, which will not be repeated herein for brevity.

In the several examples provided in the disclosure, it should be understood that the disclosed systems, apparatuses and methods can be implemented in other ways. For example, the apparatus examples described above are merely illustrative. For example, a division of the modules is merely a division of logical functions, and in practice there can be additional ways of division. For example, a plurality of modules or assemblies can be combined or integrated into another system, or some features can be omitted or not executed. Furthermore, coupling or direct coupling or communication connection between each other as shown or discussed can be achieved by means of some interfaces, and indirect coupling or communication connection between apparatuses or modules can be in an electrical form, a mechanical form or other forms.

The modules illustrated as separate components can be physically separated or not, and the components shown as modules can be physical modules or not, that is, can be located in one place, or can also be distributed over a plurality of network units. Some or all of the modules may be selected according to actual needs to achieve the purpose of the solutions of the examples. For example, the functional modules in the examples of the disclosure can be integrated into one processing module, or each module can be physically present separately, or two or more modules can be integrated into one module.

What are described above are merely being particular embodiments of the disclosure, and are not intended to limit the scope of protection of the disclosure, and any changes or substitutions that can readily occur to those skilled in the art within the scope of technology disclosed in the disclosure should fall within the scope of protection of the disclosure. Therefore, the scope of protection of the disclosure shall be subject to the scope of protection of the claims.

Example implementations are provided below. In this way, a spatial layout can be obtained through lightweight pure geometric operations at a lower cost, and therefore more suitable for mobile devices.

Implementation 1. A method for generating a spatial layout, comprising:

obtaining depth maps, gray-scale images and camera pose information of a plurality of layout images of a space;

for each layout image, obtaining plane information of the layout image; determining three-dimensional coordinates of pixels on a plane of the layout image according to a depth map and camera pose information of the layout image; and extracting a straight line from a gray-scale image corresponding to the layout image according to the plane information of the layout image, and obtaining the straight line on the layout image;

constraining and performing joint optimization for the planes and straight line in the space according to the plane information of the plurality of layout images, the three-dimensional coordinates of the pixels on the planes, information regarding the straight line, and the camera pose information, and solving the joint optimization with constraints, and generating the spatial layout according to an optimization result.

Implementation 2. The method according to implementation 1, wherein obtaining plane information of the layout image comprises: determining the plane information of the layout image through a plane calibration method and/or a plane aggregation method.

Implementation 3. The method according to implementation 2, wherein determining the plane information of the layout image through a plane calibration method comprises: determining, according to a calibration box in the layout image, pixels comprised in the calibration box, and assigning a same plane identification (ID) to the pixels comprised in the calibration box, wherein the pixels in the calibration box belong to one plane, the calibration box is formed by using ray calibration for an outline of an object in the space, and the layout image is captured after the outline of the object in the space is calibrated under the ray calibration.

Implementation 4. The method according to implementation 2, wherein determining the plane information of the layout image through the plane aggregation method comprises: generating a normal map of the layout image according to the depth map of the layout image; and determining an identification (ID) of the plane of the layout image according to the normal map of the layout image.

Implementation 5. The method according to implementation 4, wherein determining an identification (ID) of the plane of the layout image according to the normal map of the layout image comprises: assigning plane identification IDs to pixels of a first layout image according to a normal map of the first layout image, wherein adjacent pixels with identical normal vectors have a same plane ID; determining planes comprised in the first layout image according to the number of pixels comprised in each plane ID in the first layout image; for a layout image other than the first layout image, projecting, according to relative poses of a previous layout image and the current layout image, pixels on a plane of the previous layout image to camera coordinates corresponding to the current layout image; determining plane IDs of projected pixels projected to the current layout image according to plane IDs of the pixels on the plane of the previous layout image; assigning plane IDs to pixels with plane IDs not determined in the current layout image according to a normal map of the current layout image, wherein adjacent pixels with identical normal vectors have a same plane ID; and determining planes comprised in the first layout image according to the number of pixels comprised in each plane ID in the current layout image.

Implementation 6. The method according to implementation 5, wherein determining plane IDs of projected pixels projected to the current layout image according to plane IDs of the pixels on the plane of the previous layout image comprises:

determining an estimated depth map and an estimated normal map of the current layout image according to the relative poses of the previous layout image and the current layout image, and a depth map and a normal map of the previous layout image;

comparing the depth map and the normal map of the current layout image with the estimated depth map and the estimated normal map of the current layout image, and determining pairs of projected pixels with similar depth values and normal vectors, wherein the pair of projected pixels is composed of a projected pixel and a corresponding pixel of the previous layout image; and setting plane IDs of projected pixels in a target plane with a number of projected pixel pairs greater than or equal to a first threshold to be plane IDs of corresponding pixels in the previous layout image.

Implementation 7. The method according to implementation 6, wherein projecting, according to relative poses of a previous layout image and the current layout image, pixels on a plane of the previous layout image to camera coordinates corresponding to the current layout image comprises: determining pixel coordinates of projected pixels formed by projecting the pixels on the plane of the previous layout image to the camera coordinates corresponding to the current layout image using the following equation:

$$px_i^c = \pi\left(R_p^c \pi^{-1}(px_i^p) D^p(px_i^p) + t_p^c\right),$$

wherein $$R_p^c$$

and $$t_p^c$$

represent a rotation matrix and a translation matrix of the current layout image relative to the previous layout image respectively, π represents a projection function of a camera, $$px_i^p$$

represents pixel coordinates of an i-th pixel of the previous layout image, and $$px_i^c$$

represents pixel coordinates of a projected pixel of $$px_i^p$$

in the current layout image; and wherein determining an estimated depth map and an estimated normal map of the current layout image according to the relative poses of the previous layout image and the current layout image, and a depth map and a normal map of the previous layout image comprises: calculating an estimated depth value and an estimated normal vector value of the projected pixel of the current layout image by using the following equations:

$$\hat{d}_i^c = \left(R_p^c \pi^{-1}(px_i^p) D^p(px_i^p) + t_p^c\right) \cdot z, \text{ and}$$

$$\hat{n}_i^c = R_p^c n^p(px_i^p),$$

wherein $$\hat{d}_i^c$$

represents the estimated depth value of the projected pixel, $D^p(\cdot)$ represents a depth value of the pixel of the previous layout image, $n^p(\cdot)$ represents a normal vector of the pixel of the previous layout image, $$\hat{n}_i^c$$

represents the estimated normal vector value of the projected pixel, and z represents an z-coordinate value of the pixel.

Implementation 8. The method according to implementation 7, wherein comparing the depth map and the normal map of the current layout image with the estimated depth map and the estimated normal map of the current layout image, and determining a projected pixel pair with similar depth values and normal vectors comprise:

determining that the projected pixel and the corresponding pixel of the previous layout image are a projected pixel pair in case that a normal vector and a depth value of the projected pixel of the current layout image satisfy $$\left|\hat{d}_i^c - D^c(px_i^c)\right| < \delta_s \text{ and } \left|\hat{n}_i^c - n^c(px_i^c)\right| < \delta_c;$$

wherein $D^c(\cdot)$ represents the depth value of the projected pixel $$px_i^c$$

of the current layout image, $n^c(\cdot)$ represents the normal vector of the projection pixel $$px_i^c$$

of the current layout image, $\delta_d$ represents a preset depth threshold, and $\delta_c$ represents a preset normal vector threshold.

Implementation 9. The method according to implementation 4, wherein generating a normal map of the layout image according to the depth map of the layout image comprises: determining a pixel block with a preset size by taking each pixel in the depth map as a central point; determining a three-dimensional coordinate value of each pixel in the pixel block under a camera coordinate system according to pixel coordinates and a depth value of each pixel in the pixel block; and constructing a structure matrix for the pixel block according to the three-dimensional coordinate value of each pixel in the pixel block under the camera coordinate system, performing singular value decomposition (SVD) on the structure matrix, obtaining an eigenvector corresponding to a minimum singular value, and determining the eigenvector corresponding to the minimum singular value as a normal vector of the central point of the pixel block.

Implementation 10. The method according to implementation 9, wherein determining a three-dimensional coordinate value of each pixel in the pixel block under a camera coordinate system according to pixel coordinates and a depth value of each pixel in the pixel block comprises:

determining the three-dimensional coordinate value of each pixel in the pixel block under the camera coordinate system by using the following formula:

$$P_i = \left(\pi^{-1}(px_i)\right)D(px_i),$$

wherein $P_i$ represents a three-dimensional coordinate value of an ith pixel in the pixel block, $\pi$ represents a projection function of a camera, $px_i$ represents a pixel coordinate of the ith pixel in the pixel block, and $D(\cdot)$ represents a depth value of the pixel.

Implementation 11. The method according to implementation 9, wherein constructing a structure matrix for the pixel block according to the three-dimensional coordinate value of each pixel in the pixel block under the camera coordinate system comprises:

obtaining the structure matrix H as:

$$H = \sum_{j=1, j\neq 1}^{n} (P_i - P_j)(P_i - P_j)^T$$

wherein $P_i$ denotes the central point of the pixel block, $P_j$ denotes other pixels in the pixel block, and n is the number of pixels in the pixel block.

Implementation 12. The method according to implementation 5, wherein assigning plane identification IDs to pixels of a first layout image according to a normal map of the first layout image comprises:

accessing the pixels of the first layout image in a preset accessing order, and accessing a next pixel in case that a currently accessed pixel has a plane ID;

determining whether a normal vector of the current accessed pixel is consistent with a normal vector of an adjacent pixel in case that the current accessed pixel has no plane ID;

setting the plane ID of the current accessed pixel as a plane ID of the adjacent pixel in case that the normal vector of the current accessed pixel is consistent with the normal vector of the adjacent pixel and that the adjacent pixel has a plane ID; alternatively, assigning a new plane ID to the currently accessed pixel in case that the normal vector of the currently accessed pixel is consistent with the normal vector of the adjacent pixel and that the adjacent pixel has no plane ID; and alternatively, assigning a new plane ID to the current accessed pixel in case that the normal vector of the current accessed pixel is inconsistent with the normal vector of the adjacent pixel.

Implementation 13. The method according to implementation 5, wherein assigning plane IDs to pixels with plane IDs not determined in the current layout image according to a normal map of the current layout image comprises:

accessing the pixels of the current layout image in a preset access sequence, and accessing a next pixel in case that a currently accessed pixel has a plane ID;

determining whether a normal vector of the current accessed pixel is consistent with a normal vector of an adjacent pixel in case that the current accessed pixel has no plane ID;

setting the plane ID of the current accessed pixel as a plane ID of the adjacent pixel in case that the normal vector of the current accessed pixel is consistent with the normal vector of the adjacent pixel and that the adjacent pixel has a plane ID; alternatively, assigning a new plane ID to the currently accessed pixel in case that the normal vector of the currently accessed pixel is consistent with the normal vector of the adjacent pixel and that the adjacent pixel has no plane ID; and alternatively, assigning a new plane ID to the current accessed pixel in case that the normal vector of the current accessed pixel is inconsistent with the normal vector of the adjacent pixel.

Implementation 14. The method according to any one of implementations 1-13, wherein extracting a straight line from the gray-scale image corresponding to the layout image according to the plane information of the layout image, and obtaining the straight line on the layout image comprise:

determining three-dimensional coordinate values of pixels of the layout image in the camera coordinate system according to pixel coordinates and depth values of the layout image;

obtaining a plane equation of the layout image by plane fitting according to the plane information of the layout image and the three-dimensional coordinate values of the pixels of the image under the camera coordinate system;

obtaining an intersection line by intersecting planes in the layout image in pairs, and projecting the intersection line into the gray-scale image corresponding to the layout image, to obtain a prior straight line corresponding to the intersection line; and determining the straight line on the layout image according to the prior straight line.

Implementation 15. The method according to implementation 14, wherein determining the straight line on the layout image according to the prior straight line comprises:

extending two sides of the prior straight line by a preset number of pixels in a perpendicular direction of the prior straight line separately, and obtaining a reference image block surrounding the prior straight line;

calculating a gradient map of the reference image block;

calculating an inner product of a gradient direction of each pixel in the reference image block and a direction of the prior straight line;

determining target pixels having an inner product greater than a second threshold from the reference image block; and performing straight line fitting on the target pixels in the reference image block, and obtaining the straight line on each layout image.

Implementation 16. The method according to implementation 15, wherein performing straight line fitting on the target pixels in the reference image block comprises: performing straight line fitting on the target pixels in the reference image block using a random sample consistency (RANSAC) method.

Implementation 17. The method according to any one of implementations 1-13, constraining the planes and the straight line in the space according to the plane information of the plurality of layout images, the three-dimensional coordinates of the pixels on the planes, straight line information and the camera pose information, and performing joint optimization comprise:

constructing a plane equation of each plane in the space according to the plane information of the plurality of layout images;

establishing a distance constraint from points on each plane to the plane according to the plane equation of each plane and the three-dimensional coordinates of the pixels on each plane;

establishing an intersection constraint of two intersecting planes according to the plane equations of the planes, the camera pose information of the plurality of layout images and the straight line information, wherein the straight line information comprises a straight line direction, a straight line position, and IDs of the two intersecting planes used for extracting the straight line, and the intersection constraint is a constraint between a projection line of an intersection line of the two intersecting planes in the gray-scale image and the straight line extracted from the two intersecting planes, and the projection line of the intersection line of the two intersecting planes is obtained based on projection according to the camera pose information; and performing joint optimization on the distance constraint from points to the plane and the intersection constraint of the two intersecting planes.

Implementation 18. The method according to implementation 16, wherein a plane equation of a k-th plane is as follows:

$$a_k x + b_k y + c_k z + d_k = 0, \text{ wherein } a_k^2 + b_k^2 + c_k^2 = 1;$$

a distance constraint from points on the kth plane to the plane is as follows:

$$e_{ki}^k = \left(a_k P_{k_i}^w \cdot x + b_k P_{k_i}^w \cdot y + c_k P_{k_i}^w \cdot z + d_k\right)^2;$$

wherein $$P_{k_i}^w$$

is three-dimensional coordinates of an ith point on the kth plane;

for a straight line $L_p$ extracted in a pth frame, an intersection constraint of two intersecting planes k and l used for extracting the straight line $L_p$ is as follows:

$$e_p^{kl} = \left(\pi\left(R_p^w\left(\begin{pmatrix} a_k \\ b_k \\ c_k \end{pmatrix} \times \begin{pmatrix} a_l \\ b_l \\ c_l \end{pmatrix}\right)\right) - \ell_p\right)$$

wherein $$R_p^w$$

represents a rotation matrix of the pth frame relative to a world coordinate system, π represents the projection function of a camera, and $\ell_p$ represents a direction vector of the straight line $L_p$; and the joint optimization is as follows:

$$E = \sum_{i,k} e^k_{k_i} + \sum_{p,k,l} e^{kl}_p,$$

subject to $$\forall k, a_k^2 + b_k^2 + c_k^2 = 1.$$

Implementation 19. An apparatus for generating a spatial layout, comprising:

a first obtaining module configured to obtain depth maps, gray-scale images and camera pose information of a plurality of layout images of a space;

a second obtaining module configured to obtain plane information of each layout image;

a determination module configured to determine three-dimensional coordinates of pixels on a plane of each layout image according to a depth map and camera pose information of each layout image;

a straight line extracting module configured to extract a straight line from a gray-scale image corresponding to each layout image according to the plane information of the layout image, and obtain the straight line of each layout image;

an optimization module configured to constrain and perform joint optimization for the planes and the straight line in the space according to the plane information of the plurality of layout images, the three-dimensional coordinates of the pixels on the planes, information regarding the straight line, and the camera pose information; and a generation module configured to solve the joint optimization with constraints, and generating the spatial layout according to an optimization result.

Implementation 20. An electronic device, comprising:

a memory and a processor, wherein the memory stores a computer program, and the processor is configured to execute the computer program stored in the memory to perform the method according to any one of implementations 1-18.

Implementation 21. A computer-readable storage medium storing a computer program, wherein the computer program causes a computer to perform the method according to any one of implementations 1-18.

Implementation 22. A computer program product comprising a computer program, wherein the computer program, when executed by a processor, implements the method according to any one of implementations 1-18.

The invention claimed is:

1. A method for room layout, comprising:

collecting a current frame RGB image, and acquiring a depth map corresponding to the current frame RGB image and pose information of a head mounted device;

detecting and determining at least one object in the collected current frame RGB image, wherein each of the at least one object corresponds to at least one bounding box, and each of the at least one object is of a plane type or a cuboid type; and associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image, wherein associating the at least one object in the current frame RGB image, the depth image and the pose information with the room layout map corresponding to the previous frame RGB image, and generating the room layout map corresponding to the current frame RGB image, comprise:

for an object of the at least one object, in case that the object is of a plane type, determining a valid box corresponding to the object, and obtaining, based on the valid box, the depth map and the pose information, an updated first room layout map by associating the object with the room layout map corresponding to the previous frame RGB image;

in case that the object is of a cuboid type, projecting, based on points of respective objects of the cuboid type in a world coordinate system in the room layout map corresponding to the previous frame RGB image, 3D bounding boxes of the respective objects of the cuboid type in the room layout map corresponding to the previous frame RGB image into the detected current frame RGB image, and obtaining, based on the bounding boxes of the respective objects of the cuboid type in the at least one object, the projected 3D bounding boxes and the depth map, an updated second room layout map by associating the object with the room layout map corresponding to the previous frame RGB image; and fusing the updated first room layout map and the updated second room layout map, to generate the room layout map corresponding to the current frame RGB image.

2. The method of claim 1, wherein detecting and determining at least one object in the collected current frame RGB image comprises:

detecting and obtaining a bounding box of the at least one object in the current frame RBG image using a real-time fast target detecting method.

3. The method of claim 1, wherein, in case that the object is of the plane type, determining the valid box corresponding to the object, comprises:

in case that the object is of the plane type, determining a bounding box with the largest area in at least one bounding box corresponding to the detected object; and using the bounding box with the largest area as the valid box; and correspondingly, obtaining, based on the valid box, the depth map and the pose information, the updated first room layout map by associating with the room layout map corresponding to the previous frame RGB image, comprises:

obtaining, based on the depth map, a point of the object in the valid box in a camera coordinate system, converting, through the pose information, the point of the object in the valid box in the camera coordinate system into a point in the world coordinate system, and performing plane-fitting for the point of the object in the valid box in the world coordinate system, to obtain a position of a fitted plane;

determining, based on the position of the fitted plane, at least one target plane matching a position of the object from the room layout map corresponding to the previous frame RGB image; and for each of the at least one target plane, fusing, based on the position of the fitted plane and a plane position of each of the at least one target plane, the fitted plane and a plane of each of the at least one target plane, to obtain the updated first room layout map.

4. The method of claim 3, wherein fusing, based on the position of the fitted plane and the plane position of each of the at least one target plane, the fitted plane and each of the at least one target plane, to obtain the updated first room layout map, comprises:

for each of the at least one target plane, comparing, based on the position of the fitted plane and the plane position of the target plane, a normal vector of the fitted plane with a normal vector of the target plane;

in case that a normal vector comparison result is determined to be that the plane normal vectors are consistent, comparing the position of the fitted plane and the plane position of the target plane;

in case that a position comparison result is determined to be that the positions are consistent, merging the point on the fitted plane with the point on the target plane, to obtain a fused plane, and updating, based on the fused plane, the room layout map corresponding to the previous frame RGB image, to obtain the updated first room layout map; and in case that the fitted plane is not consistent with each of the at least one target plane, creating a new plane, and using the created new plane as the updated first room layout map.

5. The method of claim 1, wherein projecting, based on the points of the respective objects of the cuboid type in the world coordinate system in the room layout map corresponding to the previous frame RGB image, 3D bounding boxes of the respective objects of the cuboid type in the room layout map corresponding to the previous frame RGB image into the detected current frame RGB image, comprises:

projecting, based on the points of the objects of the cuboid type in the room layout map corresponding to the previous RGB image in the world coordinate system and the pose information, the 3D bounding boxes into the detected current frame RGB image, obtaining 3D points of the objects of the cuboid type in the room layout map corresponding to the previous frame RGB image in the camera coordinate system, and forming a preset number of bounding boxes; and using the preset number of bounding boxes as projected bounding boxes.

6. The method of claim 5, wherein obtaining, based on the bounding boxes of the respective objects of the cuboid type in the at least one object, the projected 3D bounding boxes and the depth map, the updated second room layout map by associating with the room layout map corresponding to the previous frame RGB image, comprises:

for each object of the cuboid type in the at least one object, in case that the projected bounding box intersects with the bounding box of the object of the cuboid type in the at least one object, performing feature point matching between a point in the intersecting bounding box and a point of the 3D bounding box of the object of the cuboid type in the at least one object;

in case that there exists a matched feature point, converting a point corresponding to the matched feature point in the world coordinate system into a point in the camera coordinate system; in case that a z coordinate value of the point, in the camera coordinate system, corresponding to the matched feature point is consistent with a depth value corresponding to the matched feature point with respect to depth, determining that matching succeeds, merging the point in the intersecting bounding box with a point, in the room layout map, corresponding to the previous frame RGB image, and generating the updated second room layout map;

in case that there does not exist a matched feature point or there is no depth consistency, determining that matching fails, generating a new bounding box based on the point in the intersecting bounding box, updating, based on the new bounding box, the room layout map corresponding to the previous frame RGB map, and obtaining the updated second room layout map.

7. An electronic device, comprising: a processor and a memory;

the memory for storing computer execution instructions;

the processor executing the computer execution instructions stored in the memory to cause the processor to implement a method for room layout comprising:

collecting a current frame RGB image, and acquiring a depth map corresponding to the current frame RGB image and pose information of a head mounted device;

detecting and determining at least one object in the collected current frame RGB image, wherein each of the at least one object corresponds to at least one bounding box, and each of the at least one object is of a plane type or a cuboid type; and associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image, wherein associating the at least one object in the current frame RGB image, the depth image and the pose information with the room layout map corresponding to the previous frame RGB image, and generating the room layout map corresponding to the current frame RGB image, comprise:

for an object of the at least one object, in case that the object is of a plane type, determining a valid box corresponding to the object, and obtaining, based on the valid box, the depth map and the pose information, an updated first room layout map by associating the object with the room layout map corresponding to the previous frame RGB image;

in case that the object is of a cuboid type, projecting, based on points of respective objects of the cuboid type in a world coordinate system in the room layout map corresponding to the previous frame RGB image, 3D bounding boxes of the respective objects of the cuboid type in the room layout map corresponding to the previous frame RGB image into the detected current frame RGB image, and obtaining, based on the bounding boxes of the respective objects of the cuboid type in the at least one object, the projected 3D bounding boxes and the depth map, an updated second room layout map by associating the object with the room layout map corresponding to the previous frame RGB image; and fusing the updated first room layout map and the updated second room layout map, to generate the room layout map corresponding to the current frame RGB image.

8. The electronic device of claim 7, wherein detecting and determining at least one object in the collected current frame RGB image comprises:

detecting and obtaining a bounding box of the at least one object in the current frame RBG image using a real-time fast target detecting method.

9. The electronic device of claim 7, wherein, in case that the object is of the plane type, determining the valid box corresponding to the object, comprises:

in case that the object is of the plane type, determining a bounding box with the largest area in at least one bounding box corresponding to the detected object; and using the bounding box with the largest area as the valid box; and correspondingly, obtaining, based on the valid box, the depth map and the pose information, the updated first room layout map by associating with the room layout map corresponding to the previous frame RGB image, comprises:

obtaining, based on the depth map, a point of the object in the valid box in a camera coordinate system, converting, through the pose information, the point of the object in the valid box in the camera coordinate system into a point in the world coordinate system, and performing plane-fitting for the point of the object in the valid box in the world coordinate system, to obtain a position of a fitted plane;

determining, based on the position of the fitted plane, at least one target plane matching a position of the object from the room layout map corresponding to the previous frame RGB image; and for each of the at least one target plane, fusing, based on the position of the fitted plane and a plane position of each of the at least one target plane, the fitted plane and a plane of each of the at least one target plane, to obtain the updated first room layout map.

10. The electronic device of claim 9, wherein fusing, based on the position of the fitted plane and the plane position of each of the at least one target plane, the fitted plane and each of the at least one target plane, to obtain the updated first room layout map, comprises:

for each of the at least one target plane, comparing, based on the position of the fitted plane and the plane position of the target plane, a normal vector of the fitted plane with a normal vector of the target plane;

in case that a normal vector comparison result is determined to be that the plane normal vectors are consistent, comparing the position of the fitted plane and the plane position of the target plane;

in case that a position comparison result is determined to be that the positions are consistent, merging the point on the fitted plane with the point on the target plane, to obtain a fused plane, and updating, based on the fused plane, the room layout map corresponding to the previous frame RGB image, to obtain the updated first room layout map; and in case that the fitted plane is not consistent with each of the at least one target plane, creating a new plane, and using the created new plane as the updated first room layout map.

11. The electronic device of claim 7, wherein projecting, based on the points of the respective objects of the cuboid type in the world coordinate system in the room layout map corresponding to the previous frame RGB image, 3D bounding boxes of the respective objects of the cuboid type in the room layout map corresponding to the previous frame RGB image into the detected current frame RGB image, comprises:

projecting, based on the points of the objects of the cuboid type in the room layout map corresponding to the previous RGB image in the world coordinate system and the pose information, the 3D bounding boxes into the detected current frame RGB image, obtaining 3D points of the objects of the cuboid type in the room layout map corresponding to the previous frame RGB image in the camera coordinate system, and forming a preset number of bounding boxes; and using the preset number of bounding boxes as projected bounding boxes.

12. The electronic device of claim 11, wherein obtaining, based on the bounding boxes of the respective objects of the cuboid type in the at least one object, the projected 3D bounding boxes and the depth map, the updated second room layout map by associating with the room layout map corresponding to the previous frame RGB image, comprises:

for each object of the cuboid type in the at least one object, in case that the projected bounding box intersects with the bounding box of the object of the cuboid type in the at least one object, performing feature point matching between a point in the intersecting bounding box and a point of the 3D bounding box of the object of the cuboid type in the at least one object;

in case that there exists a matched feature point, converting a point corresponding to the matched feature point in the world coordinate system into a point in the camera coordinate system; in case that a z coordinate value of the point, in the camera coordinate system, corresponding to the matched feature point is consistent with a depth value corresponding to the matched feature point with respect to depth, determining that matching succeeds, merging the point in the intersecting bounding box with a point, in the room layout map, corresponding to the previous frame RGB image, and generating the updated second room layout map;

in case that there does not exist a matched feature point or there is no depth consistency, determining that matching fails, generating a new bounding box based on the point in the intersecting bounding box, updating, based on the new bounding box, the room layout map corresponding to the previous frame RGB map, and obtaining the updated second room layout map.

13. A non-transitory computer readable storage medium having computer execution instructions stored therein which, when executed by a processor, implements a method for room layout comprising:

collecting a current frame RGB image, and acquiring a depth map corresponding to the current frame RGB image and pose information of a head mounted device;

detecting and determining at least one object in the collected current frame RGB image, wherein each of the at least one object corresponds to at least one bounding box, and each of the at least one object is of a plane type or a cuboid type; and associating the at least one object in the current frame RGB image, the depth image and the pose information with a room layout map corresponding to a previous frame RGB image, and generating a room layout map corresponding to the current frame RGB image for enabling a user to calibrate and create a rendering based on the room layout map corresponding to the current frame RGB image, wherein associating the at least one object in the current frame RGB image, the depth image and the pose information with the room layout map corresponding to the previous frame RGB image, and generating the room layout map corresponding to the current frame RGB image, comprise:

for an object of the at least one object, in case that the object is of a plane type, determining a valid box corresponding to the object, and obtaining, based on the valid box, the depth map and the pose information, an updated first room layout map by associating the object with the room layout map corresponding to the previous frame RGB image;

in case that the object is of a cuboid type, projecting, based on points of respective objects of the cuboid type in a world coordinate system in the room layout map corresponding to the previous frame RGB image, 3D bounding boxes of the respective objects of the cuboid type in the room layout map corresponding to the previous frame RGB image into the detected current frame RGB image, and obtaining, based on the bounding boxes of the respective objects of the cuboid type in the at least one object, the projected 3D bounding boxes and the depth map, an updated second room layout map by associating the object with the room layout map corresponding to the previous frame RGB image; and fusing the updated first room layout map and the updated second room layout map, to generate the room layout map corresponding to the current frame RGB image.

14. The non-transitory computer readable storage medium of claim 13, wherein detecting and determining at least one object in the collected current frame RGB image comprises:

detecting and obtaining a bounding box of the at least one object in the current frame RBG image using a real-time fast target detecting method.

15. The non-transitory computer readable storage medium of claim 13, wherein, in case that the object is of the plane type, determining the valid box corresponding to the object, comprises:

in case that the object is of the plane type, determining a bounding box with the largest area in at least one bounding box corresponding to the detected object; and using the bounding box with the largest area as the valid box; and correspondingly, obtaining, based on the valid box, the depth map and the pose information, the updated first room layout map by associating with the room layout map corresponding to the previous frame RGB image, comprises:

obtaining, based on the depth map, a point of the object in the valid box in a camera coordinate system, converting, through the pose information, the point of the object in the valid box in the camera coordinate system into a point in the world coordinate system, and performing plane-fitting for the point of the object in the valid box in the world coordinate system, to obtain a position of a fitted plane;

determining, based on the position of the fitted plane, at least one target plane matching a position of the object from the room layout map corresponding to the previous frame RGB image; and for each of the at least one target plane, fusing, based on the position of the fitted plane and a plane position of each of the at least one target plane, the fitted plane and a plane of each of the at least one target plane, to obtain the updated first room layout map.

16. The non-transitory computer readable storage medium of claim 15, wherein fusing, based on the position of the fitted plane and the plane position of each of the at least one target plane, the fitted plane and each of the at least one target plane, to obtain the updated first room layout map, comprises:

for each of the at least one target plane, comparing, based on the position of the fitted plane and the plane position of the target plane, a normal vector of the fitted plane with a normal vector of the target plane;

in case that a normal vector comparison result is determined to be that the plane normal vectors are consistent, comparing the position of the fitted plane and the plane position of the target plane;

in case that a position comparison result is determined to be that the positions are consistent, merging the point on the fitted plane with the point on the target plane, to obtain a fused plane, and updating, based on the fused plane, the room plane layout map corresponding to the previous frame RGB image, to obtain the updated first room layout map; and in case that the fitted plane is not consistent with each of the at least one target plane, creating a new plane, and using the created new plane as the updated first room layout map.

17. The non-transitory computer readable storage medium of claim 13, wherein projecting, based on the points of the respective objects of the cuboid type in the world coordinate system in the room layout map corresponding to the previous frame RGB image, 3D bounding boxes of the respective objects of the cuboid type in the room layout map corresponding to the previous frame RGB image into the detected current frame RGB image, comprises:

projecting, based on the points of the objects of the cuboid type in the room layout map corresponding to the previous RGB image in the world coordinate system and the pose information, the 3D bounding boxes into the detected current frame RGB image, obtaining 3D points of the objects of the cuboid type in the room layout map corresponding to the previous frame RGB image in the camera coordinate system, and forming a preset number of bounding boxes; and using the preset number of bounding boxes as projected bounding boxes.

* * * * *